US006832081B1

(12) United States Patent
Hiramatsu et al.

(10) Patent No.: US 6,832,081 B1
(45) Date of Patent: Dec. 14, 2004

(54) NONRADIATIVE DIELECTRIC WAVEGUIDE AND A MILLIMETER-WAVE TRANSMITTING/RECEIVING APPARATUS

(75) Inventors: Nobuki Hiramatsu, Seika-cho (JP); Takeshi Okamura, Nara (JP); Kazuki Hayata, Uji (JP); Yoshitake Terashi, Kagoshima (JP); Hironori Kii, Seika-cho (JP); Hiroshi Uchimura, Kagoshima (JP); Akinori Sato, Hayato-cho (JP)

(73) Assignee: Kyocera Corporation, Kyoto (JP)

( * ) Notice: Subject to any disclaimer, the term of this patent is extended or adjusted under 35 U.S.C. 154(b) by 676 days.

(21) Appl. No.: 09/689,547

(22) Filed: Oct. 12, 2000

(30) Foreign Application Priority Data

| | | |
|---|---|---|
| Oct. 13, 1999 | (JP) | 11-291033 |
| Nov. 30, 1999 | (JP) | 11-339887 |
| Dec. 15, 1999 | (JP) | 11-356318 |
| Jan. 20, 2000 | (JP) | 2000-014200 |
| Jan. 26, 2000 | (JP) | 2000-021824 |
| Jan. 31, 2000 | (JP) | 2000-027289 |

(51) Int. Cl.[7] .................. H04B 1/26
(52) U.S. Cl. .................. 455/328; 455/81; 331/117 D; 333/239
(58) Field of Search .................. 455/323, 325, 455/29, 38, 39, 80–81, 326, 327, 328, 330, 307; 333/202, 219, 239, 117 D, 248, 249, 259, 208; 331/21 R, 96, 107, 155

(56) References Cited

U.S. PATENT DOCUMENTS

| | | | | |
|---|---|---|---|---|
| 4,463,330 A | * | 7/1984 | Yoneyama | 333/239 |
| 5,469,128 A | * | 11/1995 | Kawanishi et al. | 333/22 R |
| 5,666,094 A | * | 9/1997 | Kato et al. | 333/248 |
| 5,861,782 A | * | 1/1999 | Saitoh | 333/239 |

(List continued on next page.)

FOREIGN PATENT DOCUMENTS

| | | |
|---|---|---|
| JP | 57-166701 | 10/1982 |
| JP | 63-185101 | 7/1988 |
| JP | 6-260814 | 9/1994 |
| JP | 6-268447 | 9/1994 |
| JP | 8-65015 | 3/1996 |
| JP | 9-186507 | 7/1997 |
| JP | 9-219608 | 8/1997 |
| JP | 10-163712 | 6/1998 |
| JP | 10-297959 | 11/1998 |
| JP | 11-17412 | 1/1999 |

OTHER PUBLICATIONS

"50 GHz band NRD–guide Circulator" by Tsukasa Yoneyama et al.

"Millimeter Wave Integrated Circuits Using Nonradiative Dielectric Waveguide" by Tsukasa Yoneyama, published in the Journal of Electronic Information & Communication Institute, vol. J73–C–I, No. 3, Mar. 1990.

"Loss Reduction of 50GHz Bank NRD Guide Circulator" by Hiroyuki Yoshinaga, et al.

"Nonradiative Dielectric Waveguide for Millimeter–Wave Integrated Circuits" by Tsukasa Yoneyama, et al., published in IEEE Transactions on Microwave Theory and Techniques, vol. MTT–29, No. 11, Nov. 1981.

*Primary Examiner*—Pablo N. Tran
(74) *Attorney, Agent, or Firm*—Hogan & Hartson LLP

(57) ABSTRACT

A NRD guide includes a pair of parallel plate conductors opposed to each other at a spacing equal to or shorter than half the wavelength of a high-frequency signal to be transmitted and having opposing inner surfaces whose arithmetic average roughness Ra satisfies $0.1\ \mu m \leqq Ra \leqq 50\ \mu m$, and a dielectric strip arranged between the pair of parallel plate conductors and held in contact with the respective inner surfaces of the parallel plate conductors. The dielectric strip is strongly secured to the inner surfaces to exhibit an excellent durability. The transmission loss of the high-frequency signal can be effectively suppressed.

21 Claims, 27 Drawing Sheets

U.S. PATENT DOCUMENTS 5,970,401 A * 10/1999 Nishida et al. ............. 455/326
5,990,764 A * 11/1999 Tanizaki et al. ............ 333/202
6,011,983 A * 1/2000 Ishikawa et al. ............ 505/210
6,094,106 A * 7/2000 Kishino et al. ........... 333/22 R
6,163,227 A * 12/2000 Saitoh et al. ........... 331/117 D
6,486,753 B1 * 11/2002 Kim ........................... 333/208
6,514,832 B1 * 2/2003 Nakagawa et al. ......... 438/412
6,515,554 B2 * 2/2003 Ishikawa et al. .......... 333/21 R
6,518,932 B1 * 2/2003 Matsui et al. ............... 343/770
6,585,566 B2 * 7/2003 Takeda ........................ 451/29
6,630,870 B1 * 10/2003 Kii et al. ...................... 331/96

* cited by examiner

NONRADIATIVE DIELECTRIC WAVEGUIDE AND A MILLIMETER-WAVE TRANSMITTING/RECEIVING APPARATUS

BACKGROUND OF THE INVENTION

This invention relates to a nonradiative dielectric waveguide used in a high frequency band of, e.g., millimeter-waves and a millimeter wave transmitting/receiving apparatus using such a nonradiative dielectric waveguide.

A first construction example of a conventional nonradiative dielectric waveguide is described with reference to FIG. 34. In the following, the nonradiative dielectric waveguide is referred to as an NRD guide. The NRD guide shown in FIG. 34 is constructed by providing a dielectric strip 703 between a pair of parallel plate conductors 701, 702 whose spacing is λ/2 or shorter when a wavelength of an electromagnetic wave (high-frequency wave) propagating in the air at an operating frequency is λ, and is based on such an operation principle that the electromagnetic wave transmits along the dielectric strip 703, and radiation of the transmitting wave is suppressed by the blocking effect of the parallel plate conductors 701, 702. In FIG. 34, the upper parallel plate conductor 701 is partly cut away so as to make the inside visible.

The NRD guide according to the first conventional construction example may include a curved dielectric strip 704 between the pair of parallel plate conductors 701 and 702. Such a construction enables an electromagnetic wave to easily be transmitted in a curved manner and has advantages of miniaturization of a millimeter wave integrated circuit and a circuit design with a higher degree of freedom. In FIG. 35, the upper parallel plate conductor 702 is shown in broken line so as to make the inside visible.

There are known two modes, i.e., an LSM (longitudinal section magnetic) mode and an LSE (longitudinal section electric) mode as millimeter wave transmission mode of the NRD guides. The LSM mode having a smaller loss is generally used. Since the parallel plate conductors 701, 702 of the conventional NRD guides need to have a high electric conductivity and an excellent processability, conductor plates formed of Cu, Al, Fe, SUS (stainless steel), Ag, Au, Pt or like metallic material have been used. Alternatively, insulating plates made of ceramics or resin having a conductive layer made of the above metallic material formed on the outer surface have also been used.

Teflon (trademark of polytetrafluoroethylene), polystyrene and like resin material having a relative dielectric constant of 2 to 4 have been used for the dielectric strips 703, 704 due to their good processability. The dielectric strips 703, 704 have been secured to the parallel plate conductors 701, 702 by an adhesive.

However, if the NRD guide is constructed by the dielectric strip formed of the conventionally used Teflon, polystyrene or dielectric material having a relative dielectric constant of 2 to 4 in the first conventional construction example, there is a problem that a steeply curved portion cannot be provided because of a bend loss and a large transmission loss at a joining portion of the dielectric strip. Even if a moderately curved portion could be provided, a radius of curvature of the curved portion would need to be precisely determined. However, there is a restriction in precisely setting the radius of curvature if the dielectric strip is made of Teflon, polystyrene or like material.

Further, a bend loss at the curved portion can be suppressed to a practically negligible level by strictly specifying a curvature of the dielectric strip in conformity with the operating frequency. However, the bend loss increases upon even a slight shift of the operating frequency. For instance, if an attempt is made to reduce a bend loss at and near 60 GHz, a width of its permissible range is only about 1 to 2 GHz. This is because, in the case that the NRD guide is formed using a dielectric material having a relative dielectric constant of 2 to 4, part of the millimeter wave of the LSM mode is converted at a curved portion thereof into that of the LSE mode to increase a loss because distribution curves of the LSM mode and the LSE mode are very approximate to each other.

In the case that a high-frequency device, a high-frequency circuit module or the like is fabricated using the NRD guide having the dielectric strips 703, 704 made of an inorganic compound such as ceramics, it is possible to provide a steeply curved portion at the dielectric strips 703, 704, but not possible to provide a high bending dimensional precision. Thus, it has been difficult to fabricate such a complicated configuration comprised of a plurality of linear and curved portions. There is an additional problem of breaking or damaging the dielectric strips 703, 704 due to a difference in thermal expansion coefficient between the parallel plate conductors 701, 702 and the dielectric strips 703, 704, an impact, and other factors.

Further, it has been difficult to suppress a transmission loss of a high-frequency signal to or below a specified value in any of the NRD guides according the first conventional construction.

Next, a second construction example of the conventional NRD guide is described. The NRD guide of the second construction example is constructed, as disclosed in Japanese Unexamined Patent Publication No. 8-65015, such that a dielectric strip is provided between a pair of parallel plate conductors, two small projections are formed on the dielectric strip, and recesses engageable with the small projections are formed in one of the parallel plate conductors. In the thus constructed NRD guide, the parallel plate conductors and the dielectric strip can be precisely positioned with respect to each other by fitting the small projections into the recesses.

Other construction examples in which the parallel plate conductors and the dielectric strip are precisely positioned with respect to each other include those disclosed in Japanese Unexamined Patent Publication Nos. 6-260824 and 9-64608. Specifically, these publications disclose that a dielectric member is made of a strip section and collars formed on the upper and lower surfaces of the strip section to prevent a displacement of the strip section, and parallel plate conductors are formed by applying plating of, e.g., copper, silver or a silver paste to the upper and lower surfaces of the dielectric member and baking it.

In the NRD guides of this type, resin materials having a relative dielectric constant of 2 to 4 such as Teflon and polystyrene as mentioned above and ceramic materials such as alumina and cordierite are frequently used as the material of the dielectric strips. Since the dielectric strips need to be precisely positioned, the dielectric strips and the parallel plate conductors are adhered by using an epoxy resin or an organic adhesive having a high heat resistance such as a polyimide resin or a BT resin as disclosed in Japanese Unexamined Patent Publication No. 10-163712. In the case that positioning is not sufficiently precise by the above adhesion, the construction disclosed in Japanese Unexamined Patent Publication No. 8-65015 is adopted.

In the second conventional construction example in which the small projections of the dielectric strip are fitted into the recesses of the parallel plate conductor, it is impossible to arrange the dielectric strip unless the positions of the small projections and the recesses agree. Even if the positions of the small projections and the recesses agree, it is difficult to precisely position the dielectric strip if the small projections are too small or the recesses are too large. This disadvantageously increases a transmission loss of a signal in a coupler formed by bringing connecting portions with the respective devices such as diodes, circulators, terminators closer to the dielectric strip.

In the NRD guide in which the dielectric member is comprised of the strip section and the collar portions, it is difficult to process the same with a good dimensional precision, and a separate housing or the like needs to be provided since the parallel plate conductors formed by baking the plating or silver paste have a low strength. The NRD guides in which the adhesive made of an epoxy resin is used have a low reliability when being used in a severe environment because the epoxy resin has a low heat resistance, whereas those in which the adhesive made of a polyimide resin or BT resin is used have a problem of deterioration with time when being exposed to a severe environment.

It has been also difficult to suppress a transmission loss of a high-frequency signal to or below a specified value in any of the NRD guides according the second conventional construction.

Next, a third construction example of the conventional NRD guide is described. The NRD guide of the third construction example is constructed such that a mode suppressor is provided at an end of a dielectric strip provided between a pair of parallel plate conductors by providing a conductive layer inside the dielectric strip. More specifically, an operation mode of the NRD guide is generally an LSM mode. However, the NRD guide is sometimes connected with a circulator, an oscillator or like device in designing a circuit, and an LSE mode occurs at a connecting portion with the circulator, the oscillator or the like device. An LSE mode suppressor is provided between the NRD guide and the other circuit device in order to suppress the transmission of the LSE mode.

In such NRD guides, resin materials having a relative dielectric constant of 2 to 4 such as Teflon and polystyrene are frequently used as the material of the dielectric strips. Known mode suppressors are formed by splitting the dielectric strip into two half pieces, printing a conductive layer of a specified shape on one surface of one half piece, and placing the other piece next to a conductive layer surface of the one half piece where the conductive layer is formed, or securing the conductive layer surface of the one half piece to the other half piece by an adhesive.

Japanese Unexamined Patent Publication No. 63-185101 discloses a mode suppressor obtained by forming a metal plate of a specified shape and integrally molding this metal plate and a dielectric strip made of a polystyrene or like material.

However, in the third conventional construction example, an uncontrollable clearance is formed between the two half pieces of the dielectric strip during production if the two half pieces are arranged side by side and an operating band of the mode suppressor is shifted due to the presence of an area having a different dielectric constant between the two half pieces even if the two pieces are secured by the adhesive. The mode suppressor cannot effectively function in the case of deviating from a frequency band suppressable by the mode suppressor. Further, if, for example, the circulator and the metal plate are displaced from each other due to the displacement of the two half pieces of the dielectric strip, the operating band of the circulator is changed, with the result that the circulator may not properly function.

Further, in the NRD guide disclosed in Japanese Unexamined Patent Publication No. 63-185101 in which the metal plate of a specified shape and the dielectric strip made of, e.g., polystyrene are integrally formed, it is difficult to control a position where the metal plate is formed. If the position of the metal plate is displaced, the function as a mode suppressor is impaired. Further, if the width of the dielectric strip is narrow, it becomes difficult to handle the metal plate, making it impossible to precisely provide the metal plate in a specified position.

If the dielectric strip is made of Teflon, the position of the dielectric strip may be undesirably displaced while being handled since it is difficult to secure Teflon by an adhesive.

It has been also difficult to suppress a transmission loss of a high-frequency signal to or below a specified value in any of the NRD guides according the third conventional construction.

Next, a fourth construction example of the conventional NRD guide is described. Similar to the third conventional construction example, the NRD guide of the fourth construction example is constructed such that a mode suppressor is integrally provided by arranging a conductive layer inside the dielectric strip. Similar to the one shown in FIG. 34, a conventional NRD guide for transmitting high-frequency signals of a microwave and a millimeter wave is constructed by providing a dielectric strip having quadrilateral, e.g., rectangular cross section between a pair of parallel plate conductors opposed to each other at a specified spacing. By setting the spacing between the parallel plate conductors at $\lambda/2$ or shorter when a wavelength of a high-frequency signal is $\lambda$, the high-frequency signal can be transmitted by the dielectric strip while eliminating entrance of noise into the dielectric strip from the outside and radiation of the high-frequency signal to the outside. As described above, the wavelength $\lambda$ is a wavelength in the air (free space) at an operating frequency.

The operation mode of the high-frequency signal (electromagnetic wave) transmitting in the dielectric strip of such an NRD guide is the LSM mode as described above. However, the unnecessary LSE mode occurs at a circulator, a high-frequency oscillating portion and the like which are assembled into the NRD guide. A mode suppressor is provided at an end of the dielectric strip in order to effectively suppress this LSE mode by attenuation.

This conventional mode suppressor is shown in FIGS. 36 and 37. In FIGS. 36 and 37, identified by 705, 706 are parallel plate conductors which are parallelly arranged at a spacing of half the wavelength of a high-frequency signal, by 707 a dielectric strip made of Teflon, polystyrene or like material, and by 708 a mode suppressor provided at the leading end of the dielectric strip 707. The mode suppressor 708 is formed by arranging a strip conductor 709 in the leading end of the dielectric strip 707 for blocking a millimeter wave signal of the LSE mode whose electric field is parallel to a transmission direction of the high-frequency direction in the dielectric strip 707 and also to a plane perpendicular to the principle planes of the parallel plate conductors 705, 706.

Specifically, the mode suppressor 708 is formed by arranging a conductive layer of Cu, Au, Ag or like material along a direction perpendicular to the principle planes of the parallel plate conductors 705, 706 and along a signal transmission direction at a widthwise center position of the dielectric strip 707. In order to eliminate a TEM mode into which the LSE mode is converted at this conductive layer, wide portions (width W1) and narrow portions (width W2) are alternately formed at intervals of L which is ¼ of the wavelength λ of the electromagnetic wave of the TEM mode, i.e., a so-called λ/4 choke pattern is formed (see Japanese Unexamined Patent Publication No. 63-185101).

There has been also proposed another conventional NRD guide in which conductive pins whose dimension along the signal transmission direction is ¼ or shorter than the wavelength between the dielectric strips of a transmission mode are arranged at an interval which is ¼ or shorter than the wavelength between the dielectric strips of the transmission mode in such a manner as to extend in a direction perpendicular to the upper and lower conductive plates in the dielectric strip at a widthwise center position of the dielectric strip, thereby enabling low-cost production of precise NRD guides having a uniformed variation of production characteristics (Japanese Unexamined Patent Publication No. 9-219608).

However, in the fourth conventional construction example having the mode suppressor disclosed in Japanese Unexamined Patent publication No. 63-185101, the TEM mode can be effectively suppressed, but there are cases where the entire more suppressor experiences resonance with unnecessary modes other than the TEM mode, undesirably resulting in insufficient attenuation of the LSE mode and like modes.

Further, since the mode suppressor disclosed in Japanese Unexamined Patent Publication No. 9-219608 is considerably thick: about 1/3 of the width of a block used as the dielectric strip, reflection of the LSM mode which is a transmission mode occurs, with result that a transmission loss is likely to increase.

It has been also difficult to suppress a transmission loss of a high-frequency signal to or below a specified value in any of the NRD guides according the fourth conventional construction.

Next, a fifth construction example of the conventional NRD guide is described. A circulator is incorporated into the NRD guides according to the fifth conventional construction example. A basic construction of the NRD guide incorporating the circulator is, similar to the one shown in FIG. 34, such that a dielectric strip having quadrilateral, e.g., rectangular cross section is arranged between a pair of parallel plate conductors opposed to each other at a specified spacing. By setting the spacing between the parallel plate conductors at λ/2 or shorter when a wavelength of a high-frequency signal is A, the high-frequency signal can be transmitted by the dielectric strip while eliminating entrance of noise into the dielectric strip from the outside and radiation of the high-frequency signal to the outside. As described above, the wavelength λ is a wavelength in the air (free space) at an operating frequency.

The conventional circulator incorporated into such an NRD guide is shown in FIG. 38. In FIG. 38, identified by 710, 711, 712 are dielectric strips made of Teflon, polystyrene or like material, by 713, 714, 715 mode suppressors provided at the leading ends of the respective dielectric strips 710, 711, 712 and formed by providing strip conductors 716, 717, 718 made of a copper foil in the dielectric strips 710, 711, 712 for blocking electromagnetic waves of the LSE mode, and by 719, 720 two ferrite disks which act as a circulator and are connected with the leading ends of the respective mode suppressors 713, 714, 715 and from which the dielectric strips 710, 711, 712 radially extend at an interval of 120°. The strip conductors 716, 717, 718 are formed in a λ/4 choke pattern in order to eliminate the TEM (transverse electromagnetic) mode (see "Millimeter Wave Integrated Circuit Using a NRD guide (By Yoneyama)", pp.87–94 of "Electronic Information Communication Meeting Conference Papers" C-I Vol.J73-C-1 No. 3, March 1990).

In such a construction, the electromagnetic wave having transmitted in the dielectric strip 710 has its wavefront rotated counterclockwise by the ferrite disks 719, 720 and is transmitted to the dielectric strip 711, but is not transmitted to the dielectric strip 712. Likewise, the electromagnetic wave having transmitted in the dielectric strip 711 is transmitted to the dielectric strip 712. In this way, transmission paths of the electromagnetic waves are changed.

In an NRD guide provided with the circulator and the dielectric strips, stepped portions 732, 733, 734 having a height equal to the thickness of the ferrite disks 730, 731 are formed in the upper and lower surfaces at the leading ends of mode suppressors 724, 725, 726, and the two ferrite disks 730, 731 are supported by the mode suppressors 724, 725, 726 by engaging the ferrite disks 730, 731 with the upper and lower stepped portions 732, 733, 734 as shown in FIG. 39, thereby ensuring the concentricity of the ferrite disks 730, 731 with a better repeatability and a higher precision (see Japanese Unexamined Patent Publication No. 9-186507). In FIG. 39, identified by 721, 722, 723 are dielectric strips, and by 727, 728, 729 strip conductors made of a copper foil or the like for constructing the mode suppressors 724, 725, 726.

In the fifth conventional construction example, the circulator for the NRD guide is mainly constructed by the two ferrite disks 719, 720 concentrically arranged while being vertically spaced from each other at a specified distance. In the construction shown in FIG. 38, a cylindrical dielectric spacer 760 for arranging the two ferrite disks at a specified spacing is necessary. In the conventional circulator using the dielectric spacer 760, a pass frequency band is narrowed and frequency varies as a relative dielectric constant changes due to the thickness of the cylindrical dielectric spacer 760. As a result, a center frequency of the pass frequency band has been undesirably shifted.

On the other hand, in the construction shown in FIG. 39, assembling repeatability of the circulator is improved and the upper and lower ferrite disks 730, 731 are free from eccentricity since the stepped portions 732, 733, 734 are formed at the leading ends of the mode suppressors 724, 725, 726. Thus, band characteristics of positive pass frequencies between ports of the respective dielectric strips are equal to each other and take a trapezoidal form symmetrical with respect to a center frequency of the pass band. As a result, flat pass band characteristic and isolation characteristics symmetrical with respect to the center frequency can be obtained.

However, besides the flat pass band characteristic, essential characteristics required for the circulator include the one for reducing reflection of the high-frequency signal at the circulator portion by reducing the transmission loss (insertion loss). This characteristic is not referred to by the prior art.

As a construction for improving a transmission loss, there has been proposed the one in which the leading end of a mode suppressor of a dielectric strip is cut off to form a step and a step-shaped impedance converter is provided, thereby improving an insertion loss and an isolation (see Singakugiho MW83-135, pp 63–66 (by Yoneyama, Sugatani, Nishida), 1984). However, in this proposed construction, a band width of an insertion loss of 1 dB in a band of 50 GHz is about 1.5 GHz, isolation is a minimum of 24 dB and a maximum of 30 dB in this band. The width of the band where the insertion loss and the isolation are improved is narrow and, therefore, effects of the improvement are insufficient. Further, it is difficult to finely process the dielectric strip to narrow its width stepwise, thereby standing as a hindrance to mass-productivity.

It has been also difficult to suppress a transmission loss of a high-frequency signal to or below a specified value in any of the NRD guides according the fifth conventional construction.

Next, a sixth construction example of the conventional NRD guide is described. In the NRD guide according to the sixth conventional construction example, a waveguide is connected with a dielectric strip. As described above, the use of the NRD guide constructed by tightly holding the dielectric strip by the pair of parallel plate conductors as one type of the transmission strip of the high-frequency signal is known. In the case that this NRD guide is assembled on a circuit board, it is essential in designing a circuit to connect it with an other transmission strip for a high-frequency signal, an antenna or the like. In such a case, it is important to connect them without deteriorating transmission characteristics.

As a construction for connecting the NRD guide with an other high-frequency transmission strip, a construction for connecting it with a micro-strip has been proposed. A general construction thereof is shown in FIG. 40. In the construction shown in FIG. 40, a dielectric strip 743 is arranged between a pair of parallel plate conductors in an NRD guide. A slot 744 is formed in one parallel plate conductor 741, and the NRD guide and a micro-strip are electromagnetically connected via the slot 744 by placing a dielectric substrate 746 having a center conductor 745 formed on its outer surface on the parallel plate conductor 741 such that the slot 744 and a rear end of the center conductor 745 have a specified positional relationship.

Although unillustrated, there is also known, as a construction for connecting a dielectric strip of an NRD guide and a waveguide, a construction in which an input port or output port of the dielectric strip is tapered and one end of the waveguide in the form of a rectangular horn is arranged in proximity to the tapered portion.

However, in the type of the sixth conventional construction example in which the end of the dielectric strip is tapered as described above when the dielectric strip of the NRD guide and the waveguide are connected, the length of the tapered portion needs to be longer than twice the wavelength of a high-frequency signal. This is disadvantageous in miniaturizing the millimeter wave integrated circuit.

The construction shown in FIG. 40 is advantageous in terms of miniaturization. However, in the connecting construction using the micro-strip, a transmission loss itself increases when the frequency of the high-frequency signal lies in a millimeter band at or above 30 GHz. This connecting construction is not suitable for the circuit board whose signal frequency is 30 GHz or longer.

It has been also difficult to suppress a transmission loss of a high-frequency signal to or below a specified value in any of the NRD guides according the sixth conventional construction.

SUMMARY OF THE INVENTION

It is an object of the present invention to provide an excellent NRD guide and a millimeter wave transmitting/receiving apparatus which are free from the problems residing in the prior art.

According to an aspect of the invention, a NRD guide comprises a pair of parallel plate conductors opposed to each other at a spacing equal to or shorter than half the wavelength of a high-frequency signal to be transmitted and having opposing inner surfaces whose arithmetic average roughness Ra satisfies 0.1 $\mu$m≦Ra≦50 $\mu$m, and a dielectric strip arranged between the pair of parallel plate conductors while being held in contact with the respective inner surfaces of the parallel plate conductors.

With this construction, since the parallel plate conductors are formed such that the arithmetic average roughness Ra of their inner surfaces satisfies 0.1 $\mu$m≦Ra≦50 $\mu$m, the inner surfaces have a suitable unevenness, and the dielectric strip is strongly secured to the inner surfaces by the anchor effect to exhibit an excellent durability. Further, current paths on the inner surfaces can be shortened to reduce a surface resistance, with the result that a transmission loss of the high-frequency signal can be effectively suppressed.

According to another aspect of the invention, a millimeter wave transmitting/receiving apparatus comprises: a pair of parallel plate conductors opposed to each other at a spacing equal to or shorter than half the wavelength of a high-frequency signal to be transmitted; a circulator made of two ferromagnetic plates provided between the pair of parallel plate conductors and opposed to each other in the same direction as the pair of parallel plate conductors are spaced apart; a first dielectric strip arranged between the pair of parallel plate conductors; a millimeter wave signal oscillator provided at one end of the first dielectric strip for outputting a millimeter wave signal to be transmitted; a second dielectric strip connected with the one end of the first dielectric strip and radially arranged with respect to the circulator between the pair of parallel plate conductors; a third dielectric strip radially arranged with respect to the circulator between the pair of parallel plate conductors and having a transmitting/receiving antenna at its leading end; a fourth dielectric strip radially arranged with respect to the circulator between the pair of parallel plate conductors; first, second, third and fourth mode suppressors arranged between the one end of the first dielectric strip and the millimeter wave signal oscillator and between the second, third and fourth dielectric strips and the circulator, and formed by arranging a plurality of conductive layers at specified intervals in a plane parallel to a transmission direction of a high-frequency signal inside the ends of the respective dielectric strips; and a mixer for mixing part of the millimeter wave signal outputted from the millimeter wave signal oscillator and a radio wave received by the transmitting/receiving antenna to generate an intermediate-frequency signal by coupling an intermediate position of the first dielectric strip and that of the fourth dielectric strip to each other.

With this construction, the electromagnetic waves of the LSE mode or the like which is an unnecessary mode can be effectively attenuated, and the transmission loss of the electromagnetic waves of the LSM mode or the like which is a transmission mode is reduced. Further, since part of the transmitted wave is introduced to the mixer via the circulator to a reduced degree, an excellent transmission characteristic of the millimeter wave signal is obtained and noise of the received wave is reduced to increase a detection distance in the case that this millimeter wave transmitting/receiving apparatus is applied to a millimeter wave radar or the like.

According to still another aspect of the invention, a millimeter wave transmitting/receiving apparatus comprises: a pair of parallel plate conductors opposed to each other at a spacing equal to or shorter than half the wavelength of a high-frequency signal to be transmitted; a circulator made of two ferromagnetic plates provided between the pair of parallel plate conductors and opposed to each other in the same direction as the pair of parallel plate conductors are spaced apart; a first dielectric strip radially arranged with respect to the circulator between the pair of parallel plate conductors; a millimeter wave signal oscillator provided at one end of the first dielectric strip for outputting a millimeter wave signal to be transmitted; a second dielectric strip radially arranged with respect to the circulator between the pair of parallel plate conductors and having a transmitting antenna at its leading end; a third dielectric strip radially arranged with respect to the circulator between the pair of parallel plate conductors; first, second, third and fourth mode suppressors arranged between one end of the first dielectric strip and the millimeter wave signal oscillator and between the first, second and third dielectric strips and the circulator, and formed by arranging a plurality of conductive layers at specified intervals in a plane parallel to a transmission direction of a high-frequency signal inside the ends of the respective dielectric strips; a fourth dielectric strip having one end connected with the first or second dielectric strip between the pair of parallel plate conductors for transmitting part of the millimeter wave signal outputted from the millimeter wave signal oscillator; a fifth dielectric strip arranged between the pair of parallel plate conductors and having a receiving antenna at its leading end; and a mixer for mixing part of the millimeter wave signal outputted from the millimeter wave signal oscillator and a radio wave received by the receiving antenna to generate an intermediate-frequency signal by coupling an intermediate position of the fourth dielectric strip and that of the fifth dielectric strip to each other.

With this construction, the electromagnetic waves of the LSE mode or the like which is an unnecessary mode can be effectively attenuated, and the transmission loss of the electromagnetic waves of the LSM mode or the like is reduced. Further, the millimeter wave signal received by the transmitting antenna is not introduced to the millimeter wave signal oscillator. Accordingly, an excellent transmission characteristic of the millimeter wave signal is obtained and noise caused by oscillation is reduced to increase a detection distance in the case that this millimeter wave transmitting/receiving apparatus is applied to a millimeter wave radar module.

According to yet still another aspect of the invention, a millimeter wave transmitting/receiving apparatus comprises: a pair of parallel plate conductors opposed to each other at a spacing equal to or shorter than half the wavelength of a millimeter wave signal to be transmitted; a circulator made of two ferromagnetic plates provided between the pair of parallel plate conductors and opposed to each other in the same direction as the pair of parallel plate conductors being spaced apart; a first dielectric strip radially arranged with respect to the circulator between the pair of parallel plate conductors; a millimeter wave signal oscillator provided at one end of the second dielectric strip for outputting the millimeter wave signal to be transmitted; a second dielectric strip radially arranged with respect to the circulator between the pair of parallel plate conductors, and having a transmitting/receiving antenna at it leading end; a third dielectric strip radially arranged with respect to the circulator between the pair of parallel plate conductors; a fourth dielectric strip radially arranged with respect to the circulator between the pair of parallel plate conductors, and having one end connected with the first dielectric strip; first, second and third mode suppressors arranged between the first, second and third dielectric strips and the circulator for suppressing electromagnetic waves of unnecessary modes; first, second and third impedance matching members arranged at the end faces of the first, second and third mode suppressors toward the circulator and having a relative dielectric constant different from that of the first, second and third dielectric strips; and a mixer for mixing part of the millimeter wave signal outputted from the millimeter wave signal oscillator and having transmitted in the fourth dielectric strip and a radio wave received by the transmitting/receiving antenna to generate an intermediate-frequency signal and transmitted in the third dielectric strip by coupling an intermediate position of the third dielectric strip and that of the fourth dielectric strip to each other.

With this construction, the transmission loss and isolation characteristic of the millimeter wave signal in a high-frequency band having a wide range are further improved, with the result that a detection distance can be increased in the case that this millimeter wave transmitting/receiving apparatus is applied to a millimeter wave radar or the like.

According to further aspect of the invention, a millimeter wave transmitting/receiving apparatus comprises: a pair of parallel plate conductors opposed to each other at a spacing equal to or shorter than half the wavelength of a millimeter wave signal to be transmitted; a circulator made of two ferromagnetic plates provided between the pair of parallel plate conductors and opposed to each other in the same direction as the pair of parallel plate conductors are spaced apart; a first dielectric strip radially arranged with respect to the circulator between the pair of parallel plate conductors; a millimeter wave signal oscillator provided at one end of the first dielectric strip for outputting the millimeter wave signal to be transmitted; a second dielectric strip radially arranged with respect to the circulator between the pair of parallel plate conductors and having a transmitting antenna at its leading end; a third dielectric strip radially arranged with respect to the circulator between the pair of parallel plate conductors; first, second and third mode suppressors arranged between the first, second, and third dielectric strips and the circulator for suppressing electromagnetic waves of unnecessary modes; first, second and third impedance matching members arranged at the end faces of the first, second and third mode suppressors toward the circulator and having a relative dielectric constant different from that of the second, third and fourth dielectric strips; a fourth dielectric strip having one end connected with the first dielectric strip between the pair of parallel plate conductors for transmitting part of the millimeter wave signal outputted from the millimeter wave signal oscillator; a fifth dielectric strip arranged between the pair of parallel plate conductors and having a receiving antenna at its leading end; and a mixer for mixing part of the millimeter wave signal outputted from the millimeter wave signal oscillator -and a radio wave received by the receiving antenna to generate an intermediate-frequency signal by coupling an intermediate position of the fourth dielectric strip and that of the fifth dielectric strip to each other.

With this construction, the transmission loss and isolation characteristic of the millimeter-wave signal in a high-frequency band having a wide range are further improved. Further, the millimeter wave signal to be transmitted is not introduced to the mixer via the circulator. Accordingly, noise of the received signal is reduced to increase a detection distance, and an excellent transmission characteristic of the millimeter wave signal further increases the detection distance of a millimeter wave radar in the case that this millimeter wave transmitting/receiving apparatus is applied to a millimeter wave radar module.

According to still further aspect of the invention, a millimeter wave transmitting/receiving apparatus comprises: a pair of parallel plate conductors opposed to each other at a spacing equal to or shorter than half the wavelength of a millimeter wave signal to be transmitted; a circulator made of two ferromagnetic plates provided between the pair of parallel plate conductors and opposed to each other in the same direction as the pair of parallel plate conductors being spaced apart; a first dielectric strip radially arranged with respect to the circulator between the pair of parallel plate conductors; a millimeter wave signal oscillator provided at one end of the first dielectric strip for outputting the millimeter wave signal to be transmitted; a second dielectric strip radially arranged with respect to the circulator between the pair of parallel plate conductors; a third dielectric strip radially arranged with respect to the circulator between the pair of parallel plate conductors; a fourth dielectric strip radially arranged with respect to the circulator between the pair of parallel plate conductors; a metallic waveguide having an open termination at one end connected with an opening formed in at least one of the pair of parallel plate conductors in a position corresponding to where the electric field of a standing wave of LSM mode transmitting in the third dielectric strip is at maximum while having an open termination at the other end provided with a transmitting/receiving antenna; a mixer for mixing part of the millimeter wave signal from the millimeter wave signal oscillator having transmitted in the fourth dielectric strip and a radio wave having transmitted in the third dielectric strip and received by the transmitting/receiving antenna to generate an intermediate-frequency signal by coupling an intermediate position of the third dielectric strip and that of the fourth dielectric strip to each other.

With this construction, an excellent transmission characteristic of the millimeter wave signal can be obtained, which in turn increases a detection distance of a millimeter wave radar.

According to yet further aspect of the invention, a millimeter wave transmitting/receiving apparatus, comprising: a pair of parallel plate conductors opposed to each other at a spacing equal to or shorter than half the wavelength of a millimeter wave signal to be transmitted; a circulator made of two ferromagnetic plates provided between the pair of parallel plate conductors and opposed to each other in the same direction as the pair of parallel plate conductors being spaced apart; a first dielectric strip radially arranged with respect to the circulator between the pair of parallel plate conductors; a millimeter wave signal oscillator provided at one end of the second dielectric strip for outputting the millimeter wave signal to be transmitted; a second dielectric strip radially arranged with respect to the circulator between the pair of parallel plate conductors; a third dielectric strip radially arranged with respect to the circulator between the pair of parallel plate conductors; a fourth dielectric strip having one end connected with the first dielectric strip between the pair of parallel plate conductors for transmitting part of the millimeter wave signal outputted from the millimeter wave signal oscillator; a fifth dielectric strip arranged between the pair of parallel plate conductors; a first metallic waveguide having an open termination at one end connected with an opening formed in at least one of the pair of parallel plate conductors in a position corresponding to where the electric field of a standing wave of LSM mode transmitting in the second dielectric strip is at maximum while having an open termination at the other end provided with a transmitting antenna; a second metallic waveguide having an open termination at one end connected with an opening formed in at least one of the pair of parallel plate conductors in a position corresponding to where the electric field of a standing wave of LSM mode transmitting in the fifth dielectric strip is at maximum while having an open termination at the other end provided with a receiving antenna; and a mixer for mixing part of the millimeter wave signal outputted from the millimeter wave signal oscillator and a radio wave received by the receiving antenna to generate an intermediate-frequency signal by coupling an intermediate position of the fourth dielectric strip and that of the fifth dielectric strip to each other.

With this construction, the millimeter wave signal to be transmitted is not introduced to the mixer via the circulator. As a result, noise of the received signal is reduced to increase a detection distance, and an excellent transmission characteristic of the millimeter wave signal further increases the detection distance of a millimeter wave.

These and other objects, features and advantages of the present invention will become more apparent upon a reading of the following detailed description and accompanying drawings.

DETAILED DESCRIPTION OF THE PREFERRED EMBODIMENTS OF THE INVENTION

Figure 1:
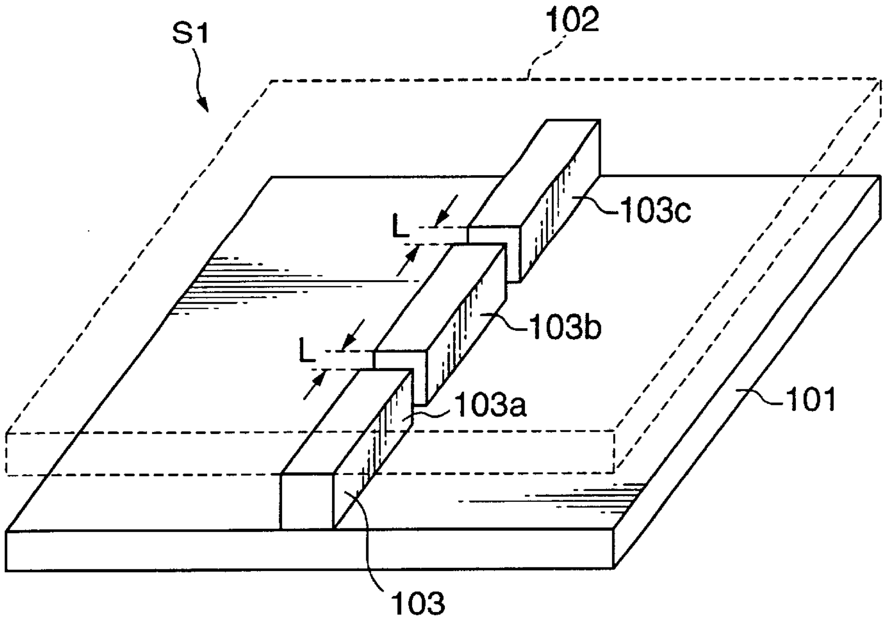
FIG. 1 is a perspective view showing an inside of a NRD guide according to a first embodiment of the invention.

FIG. 1 is a perspective view showing a NRD guide (hereinafter, "NRD guide") according to a first embodiment of the invention. An NRD guide S1 according to the first embodiment is mainly designed to solve the problems in the prior art. In FIG. 1, identified by 101, 102 are a pair of parallel plate conductors vertically opposed to each other at a spacing which is equal to or shorter than half the wavelength of a high-frequency signal to be transmitted. Identified by 103 is a dielectric strip secured between the pair of parallel plate conductors 101, 102 by an adhesive and is comprised of three strip sections 103*a*, 103*b*, 103*c*. These three strip sections 103*a*, 103*b*, 103*c* are arranged such that ends faces thereof substantially perpendicular to a high-frequency signal transmission direction are opposed to each other at a spacing L which is equal to or shorter than ⅛ of the wavelength of the high-frequency signal. The end faces of the strip sections 103*a*, 103*b*, 103*c* may be substantially perpendicular to the high-frequency signal, and may not necessarily be perfectly perpendicular thereto. Further, these end faces may not be flat, but may be curved to a certain degree.

The respective parallel plate conductors 101, 102 are formed of conductive plates made of, e.g., Cu, Al, Fe, SUS (Stainless Steel), Ag, Au, Pt since they need to have a high electric conductivity and an excellent processability. Alternatively, they may be formed of insulating plates made of ceramics, resin or like material having a conductive layer made of the above metallic materials formed on its outer surface. Further, the surfaces (inner surfaces) of the parallel plate conductors 101, 102 facing the dielectric strip 103 are ground so that an arithmetic average roughness Ra thereof satisfies $0.1\ \mu m \leqq Ra \leqq 50\ \mu m$.

This arithmetic average roughness Ra is defined by Japanese Industrial Standards (JIS) B0601-1994. Specifically, the arithmetic average roughness Ra is a value obtained by following equation (1) when a surface is extracted by a reference length L from a roughness curve in its average line, and the roughness curve is expressed by y=f(x) by taking an X-axis in a direction of an average line of the extracted section and a Y-axis in a direction of longitudinal magnification, and is expressed in micrometer ($\mu$m). Here, the roughness curve refers to a curve obtained by removing surface swelling components longer than a predetermined wavelength from a section curve which is an outline appearing at a cut end when a surface of an object (object surface) is cut by a plane perpendicular to the object surface by a phase-compensating high-pass filter. [Equation 1]

$$Ra = (1/L)\int_0^L |f(x)|dx \qquad (1)$$

The arithmetic average roughness Ra is set in the above numerical range as a result of various trials and errors. Specifically, a lower limit of the range of the arithmetic average roughness Ra is set at 0.1 $\mu$m because it was found out to be difficult to strongly hold the dielectric strip 103 secured to the parallel plate conductors 101, 102 by the adhesive or the like over a long time, making the dielectric strip 103 easy to peel off from the parallel plate conductors 101, 102 as time passes (i.e., poor durability) if Ra is smaller than 0.1 $\mu$m. The lower limit of the arithmetic average roughness Ra needs to be 0.1 $\mu$m since the adhesive is strongly secured to the inner surfaces by the anchor effect if the inner surfaces have a suitable unevenness.

Further, an upper limit of the arithmetic average roughness Ra is set at 50 $\mu$m for the following reason. Currents created in the parallel plate conductors 101, 102 by the high-frequency signal are concentrated on the inner surface of the parallel plate conductors 101, 102 due to the skin effect. If the arithmetic average roughness Ra is larger than 50$\mu$m, it was found out that current paths on the inner surface became longer to increase a surface resistance, with the result that a transmission loss of the high-frequency signal is increased to increase a transmission loss. Thus, the upper limit of the arithmetic average roughness Ra needs to be 50$\mu$m in order to effectively suppress the transmission loss. The arithmetic average roughness Ra satisfies preferably 0.3 $\mu m \leqq Ra \leqq 25$ $\mu$m, and more preferably 0.4 $\mu m \leqq Ra \leqq 10$ $\mu$m.

The dielectric strip 103 is made of ceramics containing a multiple oxide of Ag, Al, Si as a main component. This ceramics preferably has a relative dielectric constant of 4.5 to 8. The range of the relative dielectric constant is set as above for the following reason. In the case of the relative dielectric constant below 4.5, electromagnetic waves of the LSM mode have a larger tendency to be converted into those of the LSE mode as described above. Further, if the relative dielectric constant exceeds 8, the width of the dielectric strip 103 needs to be very narrow when being used at a frequency of 50 GHz or higher, which makes processing difficult to thereby degrade shape precision and presents a problem in strength.

The spacing L between the strip sections **103*a*, 103*b*, 103*c* of the dielectric strip 103 is set equal to or shorter than $\lambda/8$ ($\lambda$: wavelength of the high-frequency signal). This is because the transmission loss of the high-frequency signal increases if the spacing L is longer than $\lambda/8$. The spacing L is desirably set equal to or shorter than $\lambda/16$ in the case the number of the strip sections 103*a*, 103*b*, 103*c*** increases or a lower transmission loss is required.

Ceramics containing a multiple oxide of Mg, Al, Si as a main component and having a Q-value of 1000 or larger at an operating frequency of 50 to 90 GHz is preferably used as a material of the dielectric strip 103 of the NRD guide S1 according to the first embodiment. This is to realize a sufficiently low transmission loss for the dielectric strip which has been used at a frequency range of 50 to 90 GHz included in the microwave band and millimeter wave band in recent years.

The material of the dielectric strip 103 for realizing such a characteristic contains a multiple oxide of Mg, Al, Si as a main component, which multiple oxide satisfies: x=10 to 40 mole percent, y=10 to 40 mole percent, z=20 to 80 mole percent when a mole ratio composition formula thereof is expressed by $xMgO.yAl_2O_3.zSiO_2$.

A composition of the main component of the ceramics (dielectric ceramic composition) as the material of the dielectric strip 103 according to the first embodiment is limited to the above range for the following reason. Specifically, x representing mole percent of the MgO is set at 10 to 40 mole percent because satisfactory sintered matters cannot be obtained if x is below 10 mole percent and the relative dielectric constant increases if x exceeds 40 mole percent. It is particularly desirable to set x at 15 to 35 mole percent since the Q-value is 2000 or larger at 60 GHz.

Further, y representing mole percent of the $Al_2O_3$ is set at 10 to 40 mole percent because satisfactory sintered matters cannot be obtained if y is below 10 mole percent and the relative dielectric constant increases if y exceeds 40 mole percent. It is desirable to set y at 17 to 35 mole percent since the Q-value is 2000 or larger at 60 GHz.

Furthermore, z representing mole percent of the $SiO_2$ is set at 20 to 80 mole percent because the relative dielectric constant increases if z is below 20 mole percent and satisfactory sintered matters cannot be obtained, and no satisfactory sintered manner can be obtained and the Q-value decreases if z exceeds 80 mole percent. It is desirable to set z at 30 to 65 mole percent since the Q-value is 2000 or larger at 60 GHz.

x, y, z representing mole percent of MgO, $Al_2O_3$, $SiO_2$ can be specified by an analytical method such as an EPMA (electron probe micro analysis) method or an XRD (X-ray diffraction) method.

The ceramics (dielectric ceramic composition) for the dielectric strip 103 used in the first embodiment may be precipitated into cordierite ($2MgO.2Al_2O_3.5SiO_2$) as a main crystal phase and mullite ($3Al_2O_3.2SiO_2$), spinel ($MgO.Al_2O_3$), protoenstatite (one kind of sturtite containing magnesium metasilicate ($MgO.SiO_2$) as a main component), clinoenstatite (one kind of sturtite containing magnesium silicate ($MgO.SiO_2$) as a main component), forsterite ($2MgO.SiO_2$), cristobalite (one kind of silicate ($SiO_2$)), tridymite (one kind of silicate ($SiO_2$), sapphirine (one kind of silicate of Mg, Al), etc. as other crystal phases. However, precipitation phases differ depending on the composition. It should be noted that the dielectric ceramic composition of the first embodiment may be a crystal phase comprised only of cordierite.

The dielectric ceramic composition for the dielectric strip 103 used in the first embodiment is produced as follows. For example, a $MgCO_3$ powder, an $Al_2O_3$ powder and a $SiO_2$ powder are used as a raw material powder, the weights thereof are measured to have a specified weight ratio, and these powders are dried after being mixed in a wet process. After being provisionally burnt at 1100 to 1300° C. in the air, this mixture is crushed into powder. The obtained powder is molded by adding a suitable amount of a resin binder, and the molded matter is sintered at 1300 to 1450° C. in the air to obtain the dielectric ceramic composition.

The respective elements of Mg. Al, S1 contained in the raw material powder may be inorganic compounds such as oxides, carbonates or acetates or organic compounds such as organic metals provided that they become oxides by sintering.

The main component of the dielectric ceramic composition used in the first embodiment contains the multiple oxide of Mg, Al, Si as a main component and may contain impurities of the crushed balls and raw material powder in addition to the above elements within such a range as not to impair the characteristic that the Q-value is 1000 or larger at 50 to 90 GHz or may contain other components for the purpose of controlling a sintering temperature range and improving a mechanical characteristic. For example, compounds of rare-earth elements, oxides of Ba, Sr, Ca, Ni, Co. In, Ga, Ti, etc. and nonoxides such as nitrides including silicon nitride may be contained. A single or plurality of kinds of these compounds may be contained.

The NRD guide of the first embodiment is used in a wireless LAN, a millimeter wave radar installed in an automotive vehicle, etc. For example, a millimeter wave is projected to an obstacle and other automotive vehicles present around an automotive vehicle, the reflected wave is combined with the original millimeter wave to obtain a beat signal (intermediate-frequency signal), and distances to the obstacle and other automotive vehicles and their moving speeds are measured by analyzing this beat signal.

Since the dielectric strip 103 is comprised of a plurality of strip sections 103*a*, 103*b*, 103*c* in the first embodiment as described above, it can be easily formed by linear section(s) and curved section(s) even if it has a complicated shape formed and is unlikely to be influenced by a stress created from a difference in thermal expansion between the parallel plate conductors 101, 102 and the dielectric strip 103 resulting from an atmospheric temperature change and a stress created by an external impact. Accordingly, NRD guides which have a higher degree of freedom and are small and inexpensive can be constructed. Further, since the dielectric strip 103 made of ceramics having a lower relative dielectric constant than a conventionally used aluminaceramics or like material is used, conversion of electromagnetic waves of the LSM mode into those of the LSE mode can be reduced and a loss of the high-frequency signal ca n b e suppressed.

This embodiment is not limited to the above, an d may be modified.

EXAMPLE 1

The NRD guide S1 of FIG. 1 was constructed as follows. As a material for the dielectric strip 103, various compositions of ceramics containing the multiple oxide of Mg, Al, Si as a main component were prepared. Relative dielectric constants and Q-values of these compositions at a frequency of 60 GHz are shown in TABLE-1.

TABLE 1

| | COMPOSITION | | | ADDITIVE (weight percent) | | DIELECTRIC CONSTANT | Q-VALUE (at 60 GHz) |
|---|---|---|---|---|---|---|---|
| | MgO | $Al_2O_3$ | $SiO_2$ | | | | |
| 1 | 5 | 55 | 40 | $Yb_2O_3$ | 10 | 6.8 | 520 |
| 2 | 10 | 10 | 80 | $Yb_2O_3$ | 10 | 4.8 | 1400 |
| 3 | 10 | 30 | 60 | $Yb_2O_3$ | 15 | 5.8 | 1820 |
| 4 | 10 | 40 | 50 | $Yb_2O_3$ | 0.1 | 5.8 | 1850 |
| 5 | 15 | 35 | 50 | $Yb_2O_3$ | 5 | 5.6 | 2121 |
| 6 | 17.5 | 17.5 | 65 | $Yb_2O_3$ | 5 | 4.8 | 2040 |
| 7 | 20 | 40 | 40 | $Yb_2O_3$ | 5 | 5.6 | 1010 |
| 8 | 22.2 | 22.2 | 55.6 | — | — | 4.7 | 2810 |
| 9 | 25 | 17 | 58 | $Yb_2O_3$ | 10 | 5.1 | 2490 |
| 10 | 25 | 27 | 48 | $Yb_2O_3$ | 10 | 5.6 | 2770 |
| 11 | 25.5 | 30 | 44.5 | $Yb_2O_3$ | 10 | 5.8 | 2120 |
| 12 | 30 | 10 | 60 | $Yb_2O_3$ | 5 | 5.2 | 1500 |
| 13 | 30 | 30 | 40 | $Yb_2O_3$ | 5 | 5.6 | 2500 |
| 14 | 35 | 20 | 45 | $Yb_2O_3$ | 10 | 6.0 | 2060 |
| 15 | 35 | 35 | 30 | $Yb_2O_3$ | 0.1 | 5.8 | 2080 |
| 16 | 40 | 10 | 50 | $Yb_2O_3$ | 10 | 5.8 | 1990 |
| 17 | 40 | 20 | 40 | $Yb_2O_3$ | 5 | 5.5 | 1020 |
| 18 | 40 | 40 | 20 | $Yb_2O_3$ | 10 | 6.0 | 1470 |
| 19 | 40 | 50 | 10 | $Yb_2O_3$ | 5 | 7.9 | 520 |
| 20 | 58 | 10 | 32 | $Yb_2O_3$ | 5 | 7.5 | 1250 |
| 21 | 22.2 | 22.2 | 55.6 | $Yb_2O_3$ | 0.1 | 4.8 | 2910 |
| 22 | 22.2 | 22.2 | 55.6 | $Yb_2O_3$ | 1 | 4.8 | 2670 |
| 23 | 22.2 | 22.2 | 55.6 | $Yb_2O_3$ | 5 | 4.8 | 2750 |
| 24 | 22.2 | 22.2 | 55.6 | $Yb_2O_3$ | 7 | 4.9 | 3010 |
| 25 | 22.2 | 22.2 | 55.6 | $Yb_2O_3$ | 10 | 5.0 | 3010 |
| 26 | 22.2 | 22.2 | 55.6 | $Yb_2O_3$ | 15 | 5.4 | 2100 |
| 27 | 22.2 | 22.2 | 55.6 | $Y_2O_3$ | 10 | 5.0 | 2900 |
| 28 | 22.2 | 22.2 | 55.6 | $La_2O_3$ | 10 | 5.0 | 2930 |
| 29 | 22.2 | 22.2 | 55.6 | $Nd_2O_3$ | 10 | 5.0 | 2870 |
| 30 | 22.2 | 22.2 | 55.6 | $Er_2O_3$ | 10 | 5.0 | 2910 |
| 31 | 22.2 | 22.2 | 55.6 | $Lu_2O_3$ | 10 | 5.0 | 2990 |
| 32 | 22.2 | 22.2 | 55.6 | $Sc_2O_3$ | 10 | 5.0 | 2790 |
| 33 | 22.2 | 22.2 | 55.6 | BaO | 10 | 4.9 | 2500 |
| 34 | 22.2 | 22.2 | 55.6 | SrO | 10 | 4.9 | 2890 |
| 35 | 22.2 | 22.2 | 55.6 | CaO | 10 | 4.9 | 2470 |
| 36 | 22.2 | 22.2 | 55.6 | NiO | 10 | 5.0 | 2880 |
| 37 | 22.2 | 22.2 | 55.6 | CoO | 10 | 5.0 | 2790 |
| 38 | 22.2 | 22.2 | 55.6 | $In_2O_3$ | 10 | 5.0 | 2960 |
| 39 | 22.2 | 22.2 | 55.6 | $GaO_2$ | 10 | 5.0 | 2850 |
| 40 | 22.2 | 22.2 | 55.6 | $TiO_2$ | 10 | 5.0 | 2760 |
| 41 | 22.2 | 22.2 | 55.6 | $Si_3O_4$ | 10 | 4.9 | 2840 |

Figure 2:
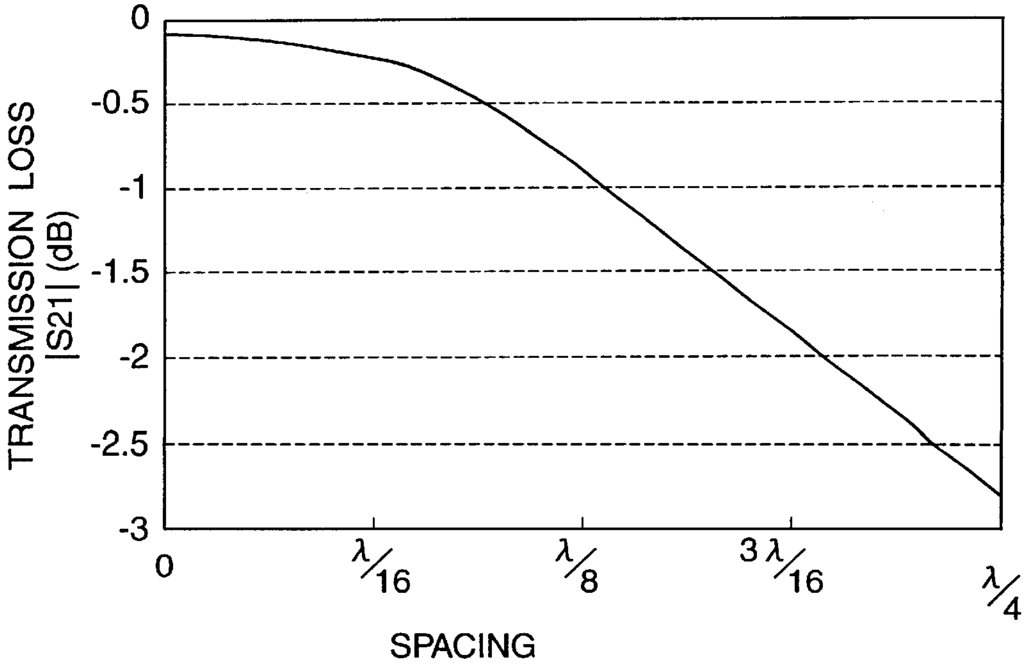
FIG. 2 is a graph showing an attenuation of a high-frequency signal in relation to a spacing between strip sections of the NRD guide shown in FIG. 1.

As a pair of parallel plate conductors 101, 102, two copper plates of 80 mm (longitudinal dimension)×80 mm (lateral dimension)×2 mm (thickness) were arranged at a spacing of 1.8 mm, and the dielectric strip 103 made of cordierite ceramics of No. 2 of TABLE-1 was arranged between the copper plates. The dielectric strip 103 had a rectangular cross section having a height of about 1.8 mm and a width of 0.8 mm, and the three strip sections 103*a*, 103*b*, 103*c* were aligned at the spacing of L. A measurement result of a frequency characteristic of the NRD guide S1 is shown in FIG. 2. FIG. 2 is a graph showing a transmission loss (|S21|) in relation to the spacing L at a frequency of 77 GHz. An insertion loss by the dielectric strip 103 was 1 dB or below when the spacing L between the strip sections 103*a*, 103*b*, 103*c* was λ/8 or shorter.

Since the parallel plate conductors are formed so that the arithmetic average roughness Ra of their inner surfaces satisfies 0.1 $\mu$m≦Ra≦50 $\mu$m as described above, the NRD guide S1 according to the first embodiment has an excellent durability and can effectively suppress the transmission loss of the high-frequency signal because the dielectric strip is strongly secured to the inner surfaces of the parallel plate conductors by the adhesive.

Preferably, the end faces of a plurality of strip sections are opposed to each other at a spacing equal to or shorter than ⅛ of the wavelength of the high-frequency signal to be transmitted. This can reduce conversion of electromagnetic waves of the LSM mode into those of the LSE mode and enables an easy fabrication of the dielectric strip having a complicated shape formed by linear and curved portions. Further, the dielectric strip can be made unlikely to be influenced by a stress created from a difference in thermal expansion between the parallel plate conductors 101, 102 and the dielectric strip 103 resulting from an atmospheric temperature change and a stress created by an external impact. Accordingly, NRD guides which have a higher degree of freedom and are small and inexpensive can be constructed. Furthermore, since the dielectric strip can be miniaturized by providing a sharply curved portion, the entire NRD guide can be miniaturized. Even if a supporting jig for the dielectric strip, a circuit board, and the like are made of a resin material and are provided in vicinity of the dielectric strip, the dielectric strip is unlikely to be influenced thereby.

Preferably, the dielectric strip is made of ceramics containing the multiple oxide of Mg, Al, Si as a main component and has a Q-value of 1000 or larger at a measurement frequency of 50 to 90 GHz. This can reduce conversion of electromagnetic waves of the LSM mode into those of the LSE mode and suppress the transmission loss of the high-frequency signal.

Figure 3:
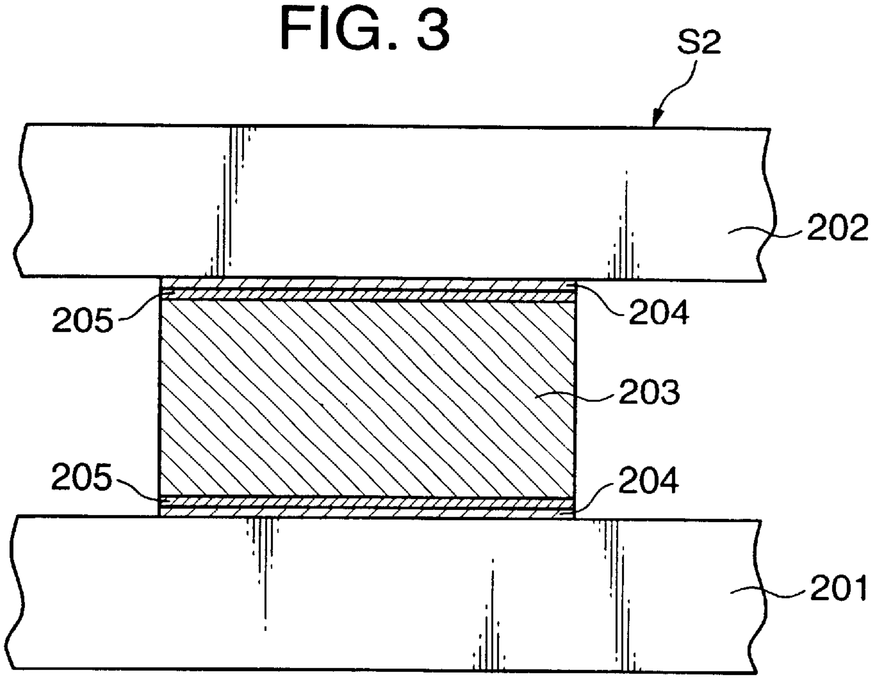
FIG. 3 is a schematic section showing a NRD guide according to a second embodiment of the invention.

FIG. 3 is a schematic section showing an NRD guide according to a second embodiment of the invention. An NRD guide S2 according to the second embodiment is mainly designed to solve the problems in the prior art. In FIG. 3, the NRD guide S2 is constructed by arranging a dielectric strip 203 between a pair of parallel plate conductors 201, 202 vertically opposed to each other at a spacing which is equal to or shorter than half the wavelength of a high-frequency signal to be transmitted. It should be noted that the wavelength here is a wavelength in the air (free space) at an operating frequency. In the construction of FIG. 3, the parallel plate conductors 201, 202 and the dielectric strip 203 are joined using a solder 204.

The respective parallel plate conductors 201, 202 are formed of conductive plates made of, e.g., Cu, Al, Fe, SUS (Stainless Steel), Ag, Au, Pt since they need to have a high electric conductivity and an excellent processability. Alternatively, they may be formed of insulating plates made of ceramics, resin or like material having a conductive layer made of the above metallic materials formed on its outer surface. Further, the surfaces (inner surfaces) of the parallel plate conductors 201, 202 facing the dielectric strip 203 are ground so that an arithmetic average roughness Ra thereof satisfies $0.1\ \mu m \leqq Ra \leqq 50\ \mu m$.

This arithmetic average roughness Ra is the same as the one defined in the first embodiment, and the range thereof is set as above for the same reason mentioned in the first embodiment. The arithmetic average roughness Ra satisfies preferably $0.3\ \mu m \leqq Ra \leqq 25\ \mu m$, and more preferably $0.4\ \mu m \leqq Ra \leqq 10\ \mu m$.

Figure 4:
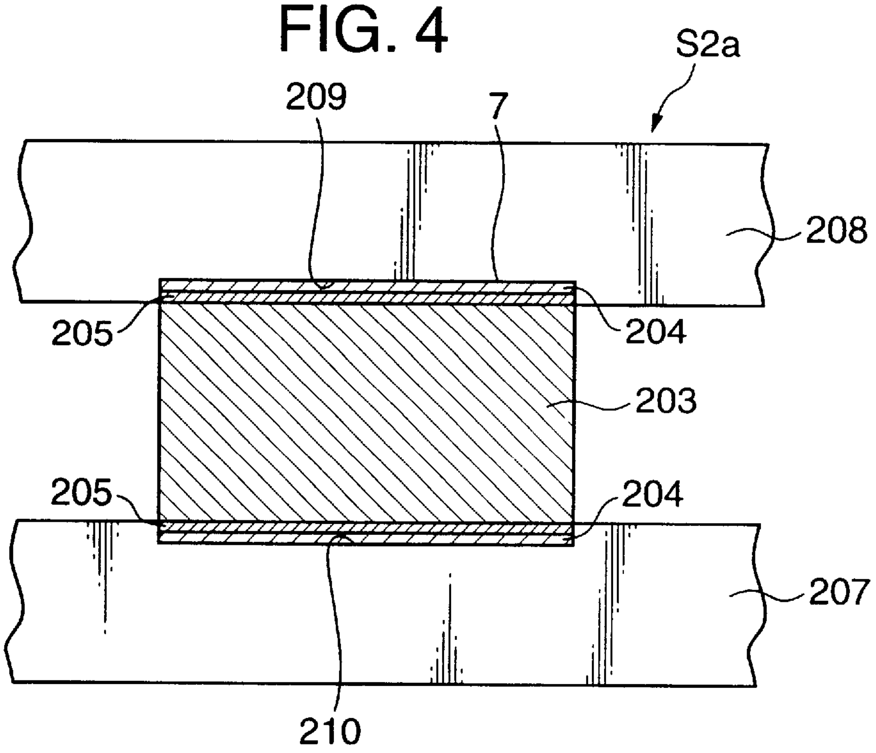
FIG. 4 is a schematic section showing another construction of the NRD guide according to the second embodiment of the invention.

The parallel plate conductors 201, 202 may be in the formed of simple flat plates, but may also be formed with grooves (recesses) in positions facing the dielectric strip 203 like parallel plate conductors 207, 208 of FIG. 4 to be described later.

On the other hand, the dielectric strip 203 may be made of a resin dielectric material such as Teflon, polystyrene or glass epoxy or ceramic such as cordierite, alumina, glass ceramics or forsterite. However, in view of heat resistance required when being secured by the solder 204, the dielectric strip 203 is desirably made of ceramics or a glass.

In view of a dielectric characteristic, processability, strength, miniaturization and reliability, the dielectric strip 203 is desirably made of cordierite ceramics. Further, it is desirable to contain at least one kind of element selected from Y, La, Ce, Pr, Nd, Sm, Eu, Dy, Ho, Er, Tm, Yb, Lu in the cordierite ceramics. Content of such an element can improve electric characteristics such as a Q-value and transmit signals with a low transmission loss.

In the case that metallic layers 205 to be described later are formed on the outer surfaces of the dielectric strip 203 by deposition, the dielectric strip 203 is desirably made of glass ceramics which can be simultaneously sintered with Cu, Ag or like metal having a low resistance. Further, the glass ceramics is desirably such that at least one kind of $SiO_2$ crystal phases, spinel type crystal phases such as $MgAl_2O_4$, $ZnAl_2O_4$, diopside type oxide crystal phases such as $Ca(Mg, Al)(Si, Al)_2O_6$, and other similar crystal phases such as $Ca_2MgSi_2O_7$ (akermanite), $CaMgSiO_4$ (monticellite), $Ca_3MgSi_2O_8$ (merwinite), ilmenite type crystal phases such as $MgTiO_3$, $SrTiO_3$, $BaTiO_3$, $CaTiO_3$, $(Mg, Zn)TiO_3$, willemite type crystal phases such as $Zn_2SiO_4$, $MgSiO_3$, $3Al_2O_3.2SiO_2$, and $Mg_2Al_4Si_5O_{18}$ having a small dielectric loss is precipitated therefrom. It is desirable that the glass ceramics contains a silica having a small dielectric loss as a main component beside the above crystal phases.

In order to enhance the strength of the dielectric strip 203, reduce the dielectric constant and dielectric loss thereof and adjust a thermal expansion coefficient thereof, ZnO, $Al_2O_3$, cordierite, $MgAl_2O_4$, MgO, $TiO_2$, $ZrO_2$, $CaZrO_3$ and the like may be dispersed as a filler in the glass ceramics in addition to the aforementioned crystal phases.

An essential feature of the second embodiment lies in that the parallel plate conductors 201, 202 (or 207, 208) and the dielectric strip 203 are joined using the solder 204. This enables precise positioning of the dielectric strip 203, thereby reducing the transmission loss of the signal in the NRD guide due to a displacement of the dielectric strip 203 and enabling realization of NRD guides having high heat resistance, durability and reliability.

The solder 204 desirably contains at least one kind of element selected from a group of Au, Ag, Ti, Sn, Pb.

Particularly, a Au-Sn solder, a Pb-Sn solder, a Ag-Ti solder material, a Ag solder material can be used. It is most desirable to contain a Au-Sn solder (durability temperature of up to 320° C.) as a main component. Further, in order to prevent deterioration of the signal transmission characteristic in the NRD guide S2, a maximum thickness (height) of the solder 204 is desirably 1 mm or smaller, preferably 0.5 mm or smaller and desirably has a smooth surface state.

In order to enhance adhesion between the dielectric strip 203 and the solder 204, it is desirable to provide the metallic layers 205 integrally formed with the dielectric strip 203 between the dielectric strip 203 and the solder 204. The metallic layers 205 are desirably formed of metallic foils in order to enhance precision of the width of the dielectric strip 203, prevent the dielectric strip 203 from warping due to sintering and enhance smoothness of their phase boundaries with the dielectric strip 203. Further, plating of Au/Ni or Au or like metal may be applied to the outer surfaces of the metallic layers 205.

Although the parallel plate conductors 201, 202 are in the formed of simple flat plates in the NRD guide S2 of FIG. 3, the second embodiment is not limited thereto. As in an NRD guide S2*a* shown in FIG. 4, grooves (recesses) 209, 210 may be formed in positions of the facing surfaces of the parallel plate conductors 207, 208, the solder 204 and the metallic layers 205 may be filled in the grooves 209, 210 to a specified depth, and the dielectric strip 203 may be secured to the outer surface of the solder 204.

In such a case, the NRD guide S2*a* may be formed such that the outer surfaces of the dielectric strip 203 lie in the same planes as the opening planes of the grooves 209, 210 in the parallel plate conductors 207, 208 (i.e., construction shown in FIG. 4) or such that the dielectric strip 203 is buried in the grooves 209, 210 to a specified depth.

Although the NRD guide S2 of FIG. 3 is constructed such that the solder 204 is provided on the both surfaces of the dielectric strip 203 in contact with the parallel plate conductors 201, 202, the second embodiment is not limited thereto. The solder 204 may be provided only on one outer surface.

Next, a method for fabricating the NRD guide S2 is described with respect to an exemplary case where the dielectric strip 203 is made of cordierite ceramics. First, a $MgCO_3$ powder (purity of 99percent or higher), an $Al_2O_3$ powder (purity of 99percent or higher) and a $SiO_2$ powder (purity of 99percent or higher) are measured to obtain a cordierite composition, and mixed. A powder (purity of 99percent or higher) of an oxide, carbonate, nitride or the like of at least one kind of element selected from Y, La, Ce, Pr, Nd, Sm, Eu, Dy, Ho, Er, Tm, Yb, Lu is added to the mixed powder. In this way, a sintering temperature range is extended to make a resulting sintered material denser.

After being provisionally burnt at 1100 to 1300° C. in the air if necessary, this mixture is crushed into powder, a suitable amount of an organic binder is added to the crushed powder and a strip-shaped molded matter is formed by a press molding method, a CIP molding method, a doctor blade method, a tape molding method such as a rolling method, an excluding method, an injection molding method or like known molding method. Thereafter, the molded matter is treated to remove the binder therefrom at a specified temperature in the air, sintered at 1300 to 1500° C. in the air, and has its outer surface ground if necessary. As a result, strip-shaped ceramics, i.e., the dielectric strip can be obtained.

If necessary, a metallic paste containing W (tungsten), Mo (molybdenum), Cu, Ag, Pt, Au, or like metal as a main component and obtained by adding a specified organic binder, a solvent, etc. to a metal powder and kneading the resulting mixture is prepared for the dielectric strip, applied to the upper and lower surfaces of the dielectric strip by a known printing method such as a screen printing method or a gravure printing method in such a manner as to have a thickness of, e.g., 5 to 30 $\mu$m, and is baked at a temperature at or below 1200° C.

After the dielectric strip coated with the metallic layers is cut into a specified shape or has its metallic layers ground, it is placed in a specified position of the parallel plate conductor or held in a specified position between the parallel plate conductors, and the aforementioned solder is heated to about 240 to 350° C. to be melted, and is solidified to join the dielectric strip and the parallel plate conductors. As a result, the NRD guide can be fabricated. In the case that the metallic layers are formed on the outer surfaces of the dielectric strip, they are joined with the parallel plate conductors using the solder. In order to control the spacing between the parallel plate conductors to a specified value, the parallel plate conductors may be pressurized during adhesion by the solder 204.

A method for forming the metallic layers is not limited to the aforementioned so-called pressure film method. For instance, a method for applying a metallic paste to the outer surface of the molded matter and simultaneously sintering them, a method for forming a metallic layer of, e.g., Ni/Cr, Au/Cr, Ag/Cu/Cr, Cu/Ti, Ni/Ti or Pt/Ti on the outer surface of the dielectric strip by a thin film forming method such as a deposition method, a spattering method, or a CVD method, and a method for, after forming a metal foil on the outer surface of a transfer film made of a resin, transferring the metal foil onto the outer surface of the molded matter may also be applicable. It should be noted that Ni/Cr, Au/Cr, Ag/Cu/Cr, Cu/Ti, Ni/Ti or Pt/Ti means Cr layer formed on Ni layer, Cr layer formed on Au layer, Cr layer formed on Cu layer formed on Ag layer, Ti layer formed on Cu layer, Ti layer formed on Ni layer, or Ti layer formed on Pt layer.

Next, an exemplary case where the dielectric strip is made of glass ceramics is described. First, after a specified organic binder, a solvent, etc. are added and mixed with ceramics powder for forming the aforementioned filler and/or a glass powder containing Si, Al, Mg, Zn, B, Ca or the like, a bar-shaped or sheet-shaped matter is molded of this mixture by a press molding method, a CIP (Cold Isostatic Press) molding method, a doctor blade method, a tape molding method such as a rolling method, an excluding method, an injection molding method or like known molding method.

Further, a metallic layer having a thickness of 5 to 30 $\mu$m is formed on the bar-shaped or sheet-shaped molded matter by the aforementioned method. At this time, if the method for transferring the metallic layer formed of a metal foil of Cu, Ag or like metal onto the outer surface of the molded matter using the transfer film is used, shrinkage of the molded matter in widthwise direction can be suppressed to improve dimensional precision, a time for grinding can be shortened, and the molded matter is prevented from warping during sintering. As a result, dielectric strips having a high dimensional precision can be mass-produced.

After being treated to remove the binder, the molded matter coated with the metallic layer is sintered at 800 to 1050° C., preferably at 830 to 950° C. to obtain the dielectric strip integrally formed with the metallic layer. The NRD guide can be fabricated by arranging the thus obtained dielectric strip in a specified position between the parallel plate conductors using the solder similar to the above.

The NRD guide constructed as above can be suitably used in a high-frequency band at or above 50 GHz, preferably at or above 60 GHz, and more preferably at or above 70 GHz.

EXAMPLE 2

A $MgCO_3$ powder (purity of 99percent or higher), an $Al_2O_3$ powder (purity of 99percent or higher) and a $SiO_2$ powder (purity of 99percent or higher) were measured and mixed. After being provisionally burnt at 1200° C. for 2 hours in the air, this mixture was crushed, and granulates were produced by adding a suitable amount of binder. These granulates were press-molded at a pressure of 100 MPa to form a molded matter having a diameter of 12 mm and a thickness of 8 mm. After being treated to remove the binder at a specified temperature, the molded matter was sintered at 1455° C. for 2 hours.

A specified processing was applied to the thus obtained sintered matter, and the dielectric constant and dielectric loss of the sintered matter at 60 GHz were measured by a dielectric resonator method using a network analyzer and a synthesized sweeper. The measured dielectric constant and dielectric loss were 4.8, $2\times10^{-4}$, respectively.

A molded matter was formed using the above granulates, and treated to remove the binder at a specified temperature.

Thereafter, the molded matter was sintered at 1455° C. for 2 hours. After the sintered matter was cut to form a dielectric strip of 1.8 mm (height)×0.8 mm (width)×100 mm (length), Pt/Ti metallic thin films were formed on the upper and lower surfaces of the dielectric strip by forming a titanium film having a thickness of 50 μm and a platinum film having a thickness of 50 μm thereon by spattering.

The dielectric strip was arranged in a specified position between two parallel plate conductors made of copper and having a longitudinal dimension of 80 mm, a lateral dimension of 80 mm and a thickness of 2 mm. Spheres of a solder containing a Au-Sn alloy were provided between the metallic thin films of the dielectric strip and the parallel plate conductors and heated at 320° C. to form the NRD guide. As a result of a microscopic observation, the solder had a maximum thickness of 0.1 mm and a smooth surface.

The transmission loss of the obtained NRD guide at 76.5 GHz measured by a network analyzer was 1 dB. The transmission loss thereof was similarly measured after a heat cycle of −45 to 125° C. was applied to it 1000 times. The measurement result was 1 dB, and no adhesion problem such as peeling was found by visual observation.

EXAMPLE 3

Glass ceramics material was prepared by adding ceramics filler having an average particle diameter of 2 μm to a glass having an average particle diameter of 2 μm and a composition as defined below.

Glass: (44 weight percent of $SiO_2$, 29 weight percent of $Al_2O_3$, 11 weight percent of MgO, 7 weight percent of ZnO, 9 weight percent of $B_2O_3$)

Ceramic filler: 15 weight percent of $SiO_2$, 10 weight percent of ZnO in relative to 75 weight percent of glass.

A molded matter having a diameter of 12 mm and a thickness of 8 mm was formed by adding a suitable amount of binder to the mixed powder and press-molding the resulting powder at a pressure of 100 MPa, and was treated to remove the binder at a specified temperature. Thereafter, the molded matter was sintered at 1455° C. for 2 hours to form glass ceramics. The dielectric constant and dielectric loss of the sintered matter at 60 GHz were similarly measured. The measured dielectric constant and dielectric loss were 4.8, $8\times10^{-4}$, respectively.

After a slurry was produced by adding an organic binder and a solvent to the mixed powder and mixing them, a sheet-shaped molded matter was formed by the doctor blade method.

On the other hand, after a transfer film coated with a copper foil was placed such that the copper foil is adhered to the outer surface of the sheet-shaped molded matter and was pressed at 40° C. and 100 MPa, it is peeled off to obtain the molded matter having a metallic layer made of the copper foil formed on its outer surface.

After a treatment was made to remove the binder from the molded matter coated with the copper foil, the molded matter was sintered at 950° C. and gold plating was applied to the outer surface of the copper foil. Thereafter, the gold-plated sintered matter was cut and ground to fabricate a dielectric strip integrally formed with the metallic layer. The metallic layer of the dielectric strip is connected in the same specified position of the parallel plate conductors as in Example 2 using a solder, which was then melted and solidified to secure the dielectric strip to the parallel plate conductors as in Example 2, thereby fabricating an NRD guide. The solder had a maximum thickness of 0.1 mm and a smooth surface.

The obtained NRD guide was estimated substantially in the similar manner as in Example 2. The estimation result showed that a transmission loss was 2 dB, a transmission loss after application of a heat cycle was 2 dB and no adhesion problem such as peeling was found by visual observation.

EXAMPLE 4

A groove having a width of 0.8 mm, a depth of 0.2 mm and a length of 100 mm was formed in a position of each parallel plate conductor of Example 2 facing the dielectric strip, and the solder of Example 2 was placed in the grooves. The dielectric strip of Example 2 having a height of 1.8 mm was placed on the solder, and an NRD guide was fabricated as in Example 2 except that the parallel plate was formed with the groove.

The transmission loss of the obtained NRD guide was measured substantially in the similar manner as in Example 2. The measurement result showed that a transmission loss was 1 dB, a transmission loss after application of a heat cycle as in Example 2 was 1 dB and no adhesion problem such as peeling was found by visual observation.

(Comparative Example 1)

An NRD guide was fabricated as in Example 2 except that a BT resin was used instead of the solder of Example 2 and estimated. Although a transmission loss was as low as 1 dB, peeling was found between the adhesive and the dielectric strip by visual observation after application of a heat cycle.

(Comparative Example 2)

An NRD guide was fabricated as in Example 4 except that the solder was not used. The depths of the grooves were adjusted such that the spacing between the parallel plate conductors was equal to the one of Example 3. A result of an estimation made as in Example 2 showed that a transmission loss was too high to be measured and displacement had occurred during assembling.

Since the parallel plate conductors are formed so that the arithmetic average roughness Ra of their inner surfaces satisfies $0.1\ \mu m \leqq Ra \leqq 50\ \mu m$ as described above, the NRD guides S2, S2*a* according to the second embodiment of the invention have an excellent durability and can effectively suppress the transmission loss of the high-frequency signal because the dielectric strip is strongly secured to the inner surfaces of the parallel plate conductors by the solder.

Further, since the parallel plate conductors and the dielectric strip are joined using the solder in the NRD guides S2, S2*a*, the dielectric strip can be precisely positioned. As a result, the transmission loss of the signal can be reduced and excellent heat resistance, durability and reliability can be ensured.

In the case that the dielectric strip 203 of the NRD guide S2, S2*a* is made of, e.g., ceramics, it may be comprised of a plurality of strip sections as in the first embodiment shown in FIG. 1 and the end faces of the respective strip sections may be opposed to each other at a spacing equal to or shorter than ⅛ of the wavelength of the high-frequency signal to be transmitted. This can reduce conversion of electromagnetic waves of the LSM mode into those of the LSE mode and enables an easy fabrication of a dielectric strip having a complicated shape formed by linear and curved portions. In other words, if the dielectric strip 203 is formed by a plurality of strip sections, a bend loss can be reduced even if the dielectric strip 203 includes a curved portion.

Figure 5:
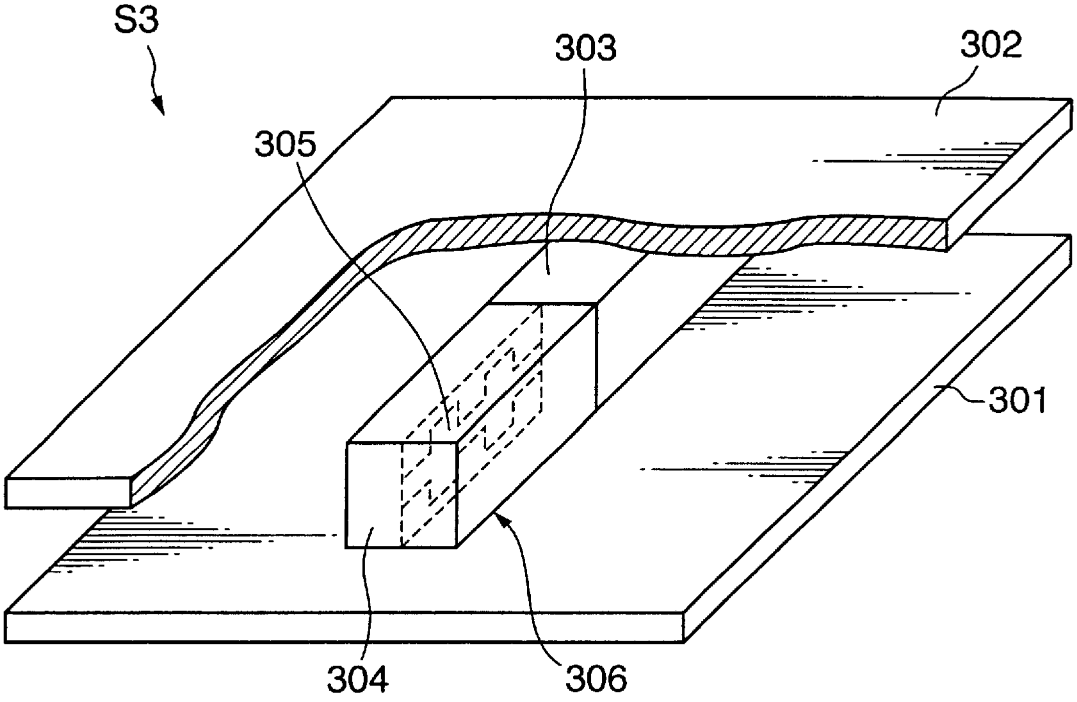
FIG. 5 is a perspective view showing an inside of a NRD guide according to a third embodiment of the invention.

FIG. 5 is a schematic section showing an NRD guide according to a third embodiment of the invention. An NRD guide S3 according to the third embodiment is mainly designed to solve the problems in the prior art. In FIG. 5, the NRD guide S3 is constructed by arranging a dielectric strip 303 as a waveguide strip and a dielectric strip 304 as a suppressor strip forming a mode suppressor between a pair of parallel plate conductors 301, 302 vertically opposed to each other at a spacing which is equal to or shorter than half the wavelength of a high-frequency signal to be transmitted. It should be noted that the wavelength here is a wavelength in the air (free space) at an operating frequency.

The respective parallel plate conductors 301, 302 are formed of conductive plates made of, e.g., Cu. Al, Fe, SUS (Stainless Steel), Ag. Au, Pt since they need to have a high electric conductivity and an excellent processability. Alternatively, they may be formed of insulating plates made of ceramics, resin or like material having a conductive layer made of the above metallic materials formed on its outer surface. Further, the surfaces (inner surfaces) of the parallel plate conductors 301, 302 facing the dielectric strips 303, 304 are ground so that an arithmetic average roughness Ra thereof satisfies 0.1 $\mu$m≦Ra≦50 $\mu$m.

This arithmetic average roughness Ra is the same as the one defined in the first embodiment, and the range thereof is set as above for the same reason mentioned in the first embodiment. The arithmetic average roughness Ra satisfies preferably 0.3 $\mu$m≦Ra≦25 $\mu$m, and more preferably 0.4 $\mu$m≦Ra≦10 $\mu$m.

The dielectric strip 303 as a waveguide strip may be made of a resin dielectric material such as Teflon, polystyrene or glass epoxy or ceramic such as cordierite, alumina, glass ceramics or forsterite. However, in view of a dielectric characteristic, processability, strength, miniaturization, reliability, etc., the dielectric strip 303 is desirably made of cordierite ceramics. By containing at least one kind of element selected from Y, La, Ce, Pr, Nd, Sm, Eu, Dy, Ho, Er, Tm, Yb, Lu in the cordierite ceramics, electric characteristics such as a Q-value can be improved and signals can be transmitted with a low transmission loss.

The dielectric strip 304 as a suppressor strip forming a mode suppressor is made of ceramics and is continuously arranged at one end of the dielectric strip 303. In the following description, the dielectric strip 304 is referred to as ceramics dielectric strip 304. The ceramic dielectric strip 304 may be spaced apart from one end of the dielectric strip 303 by a specified distance.

A conductive layer 305 of a specified pattern is so formed inside, particularly at the center of the ceramic dielectric strip 304 as to extend perpendicularly to the parallel plate conductors 301, 302. A mode suppressor (hereinafter, merely "suppressor") 306 for the NRD guide is formed by the ceramic dielectric strip 304 and the conductive layer 305.

Although the conductive layer 305 is arranged to extend perpendicularly to the parallel plate conductors 301, 302 to form the suppressor for suppressing transmission of the LSE mode in FIG. 5, the third embodiment is not limited thereto. For example, the suppressor may suppress transmission of the LSM mode by arranging the conductive layer 305 parallel to the parallel plate conductors 301, 302.

An essential feature of the third embodiment lies in that the ceramic dielectric strip 304 and the conductive layer 305 forming the suppressor 306 are integrally formed by simultaneously sintering. This eliminates a possibility of creating a portion having a different dielectric constant such as a clearance between the ceramic dielectric strip 304 and the conductive layer 305 and can improve the dimensional precision of the suppressor 306 and the precision of positioning of the conductive layer 305. Therefore, an NRD guide which stably operates within an operation band while being only slightly variable from the one as designed can be realized.

Cordierite, alumina, glass ceramics, forsterite or like material can be used as the ceramic dielectric strip 304. Since the conductive layer 305 is desirably made of a low-resistance metal such as copper, silver or gold, the ceramic dielectric strip 304 is desirably made of glass ceramics which enables simultaneous sintering in the case that a low-resistance metal is used. Further the glass ceramics is desirably such that at least one kind of $SiO_2$ crystal phases, spinel type crystal phases such as $MgAl_2O_4$, $ZnAl_2O_4$, diopside type oxide crystal phases such as Ca(Mg, Al)(Si, $Al)_2O_6$, and other similar crystal phases such as $Ca_2MgSi_2O_7$ (akermanite), $CaMgSiO_4$ (monticellite), $Ca_3MgSi_2O_8$ (merwinite), ilmenite type crystal phases such as $MgTiO_3$, $SrTiO_3$, $BaTiO_3$, $CaTiO_3$ and (Mg, Zn)$TiO_3$, willemite type crystal phases such as $Zn_2SiO_4$, $MgSiO_3$, $3Al_2O_3.2SiO_2$ and $Mg_2Al_4Si_5O_{18}$ having a small dielectric loss is precipitated therefrom. It is also desirable that the glass ceramics contains a silica having a small dielectric loss as a main component beside the above crystal phases.

Further, ZnO, $Al_2O_3$, $MgAl_2O_4$, MgO, $TiO_2$, $ZrO_2$, $CaZrO_3$ and the like may be dispersed as a filler in the glass ceramics in addition to the aforementioned crystal phases.

It is also desirable that the dielectric constant of the ceramic dielectric strip 304 approximates to that of the dielectric strip 303, particularly a difference thereof lies ±1. For example, if the dielectric strip 303 is made of cordierite ceramics having a dielectric constant of 4.8, the ceramic dielectric strip 304 is optimally made of glass ceramics containing a silica glass phase or a $ZnAl_2O_4$ or $MgSiO_3$ crystal phase or like crystal phase and having a dielectric constant of 4.7 to 4.9.

Figure 6:
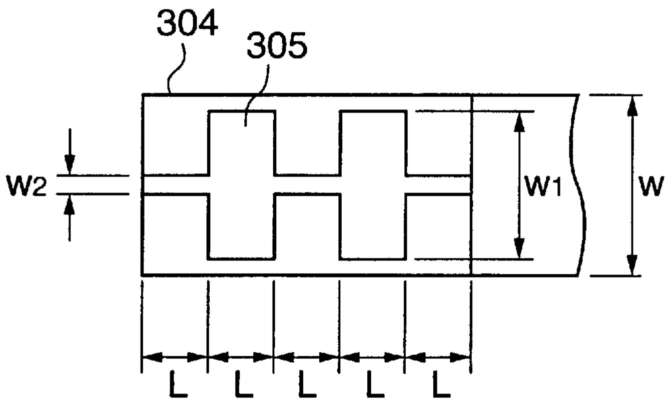
FIG. 6 is a diagram showing an example of a pattern of a conductive layer in a mode suppressor used in the NRD guide shown in FIG. 5.

The conductive layer 305 is arranged in a transmission direction of a signal along the longitudinal center of the ceramic dielectric strip 304, and a pattern in which two different sections having widths W1, W2 (W1>W2) and a length L which is ¼ of the wavelength of a TEM wave are repeated as shown in FIG. 6 can be suitably adopted as the shape of the conductive layer 305. It should be noted that W denotes a width of the ceramic dielectric strip 304.

An other end of the suppressor 306 is connected with a device such as a circulator, an oscillator or a mode converter (none of these devices is shown) where the LSE mode is created or may be connected with a bent dielectric strip of NRD guide if necessary.

Next, a method for fabricating the suppressor 306 is described with respect to an exemplary case where the dielectric strip 303 as a waveguide strip is made of cordierite ceramics and the ceramic dielectric strip 304 as a suppressor strip is made of glass ceramics. First, the dielectric strip 303 is fabricated, for example, by the following method. A $MgCO_3$ powder (purity of 99percent or higher), an $Al_2O_3$ powder (purity of 99percent or higher) and a $SiO_2$ powder (purity of 99percent or higher) are measured to obtain a cordierite composition, and mixed. A powder (purity of 99percent or higher) of an oxide, carbonate, nitride or the like of at least one kind of element selected from Y. La, Ce, Pr, Nd, Sm, Eu, Dy, Ho, Er, Tm, Yb, Lu is added to the mixed powder. In this way, a sintering temperature range is extended to make a resulting sintered material denser.

After being provisionally burnt at 1100 to 1300° C. in the air if necessary, this mixture is crushed into powder, a suitable amount of an organic binder is added to the crushed powder and a strip-shaped molded matter is formed, for example, by a press molding method, a CIP molding method, a doctor blade method, a tape molding method such as a rolling method, an excluding method, an injection molding method or like known molding method. Thereafter, the molded matter is treated to remove the binder therefrom at a specified temperature in the air, sintered at 1300 to 1500° C. in the air, and has its outer surface ground if necessary. As a result, the dielectric strip 303 can be obtained.

Next, a method for fabricating the suppressor 306 is described. First, after a specified organic binder, a solvent, etc. are added and mixed with ceramics powder and/or a glass powder containing Si, Al, Mg, Zn, B, Ca or the like for forming the aforementioned filler, a column-shaped or sheet-shaped matter is molded of this mixture, for example, by a press molding method, a CIP molding method, a doctor blade method, a tape molding method such as a rolling method, an excluding method, an injection molding method or like known molding method.

On the other hand, a conductive paste obtained by mixing and kneading a specified organic binder, a solvent and the like with a conductive powder is prepared and applied to the outer surface of the molded matter by a known printing method such as a screen printing method or a gravure printing method in such a manner as to have a thickness of, e.g., 5 to 30 μm.

An other molded matter is formed similar to the above molded matter and is so placed as to cover a pattern forming surface of the molded matter to which the conductive paste was applied, thereby obtaining a laminated matter. The laminated matter can also be obtained by a known multiple layer method of ceramics green sheet. Thereafter, the laminated matter is cut or ground into a specified shape after being sintered at a specified temperature. In this way, the ceramic dielectric strip having a conductive layer inside, i.e., the suppressor 306 can be obtained.

A method for forming the conductive layer is not limited to the aforementioned printing method. For example, if it is formed by a thin film method such as a deposition method, a spattering method or a CVD method using a mask of a specified pattern, the dimensional precision of the conductive layer pattern can be improved. Alternatively, a method for etching a metal foil in a specified pattern after forming it on a transfer sheet made of a resin, and transferring the metal foil pattern onto the outer surface of the molded matter may also be applied. According to this method, there can be formed a conductive layer pattern which is hardly subject to any change in the dimensions of the conductive layer even by sintering of the molded matter and also having a high dimensional precision.

By arranging the thus obtained ceramic dielectric strip, for example, in a position continuous with or spaced apart by a specified distance from the dielectric strip between the pair of parallel plate conductors, an NRD guide having excellent characteristics can be easily obtained.

In the case that the ceramic dielectric strip is made of a cordirite ceramics or aluminaceramics, the conductive layer may be formed of a high-melting point metal such as tungsten (W), molybdenum (Mo) or of a metal obtained by adding a high-melting point metal such as tungsten (W), molybdenum (Mo) to copper (Cu). The suppressor made of such a material can be suitably used in a high-frequency band above 50 GHz, particularly above 60 GHz, and further above 70 GHz.

EXAMPLE 5

A $MgCO_3$ powder (purity of 99percent or higher), an $Al_2O_3$ powder (purity of 99percent or higher) and a $SiO_2$ powder (purity of 99percent or higher) were measured and mixed. After being provisionally burnt at 1200° C. for 2 hours in the air, this mixture was crushed, and granulates were produced by adding a suitable amount of binder. These granulates were press-molded at a pressure of 100 MPa to form a molded matter having a diameter of 12 mm and a thickness of 8 mm. After being treated to remove the binder at a specified temperature, the molded matter was sintered at 1455° C. for 2 hours.

The dielectric constant and dielectric loss of the obtained sintered matter at 60 GHz were measured by a dielectric resonator method using a network analyzer and a synthesized sweeper. The measurement result is shown in TABLE-2.

A molded matter having a width of 3 mm, a thickness of 2 mm and a length of 120 mm was formed using the above granulates, and treated to remove the binder at a specified temperature. Thereafter, the molded matter was sintered at 1455° C. for 2 hours, thereby forming a waveguide strip.

On the other hand, materials of glass ceramics A, B were prepared by adding ceramics filler having an average particle diameter of 1.5 to 2.5 μm to a glass having an average particle diameter of 1.5 to 2.5 μm and a composition as defined below.

Glass Ceramics A

Glass: 44 weight percent of $SiO_2$, 29 weight percent of $Al_2O_3$, 11 weight percent of MgO, 7 weight percent of ZnO, 9 weight percent of $B_2O_3$ Ceramic filler: 15 weight percent of $SiO_2$, 10 weight percent of ZnO in relative to 75 weight percent of glass Glass Ceramics B Glass: 44 weight percent of $SiO_2$, 29 weight percent of $Al_2O_3$, 11 weight percent of MgO, 7 weight percent of ZnO, 9 weight percent of $B_2O_3$ Ceramic filler: 25 weight percent of ZnO in relative to 75 weight percent of glass A molded matter having a diameter of 12 mm and a thickness of 8 mm was formed by adding a suitable amount of binder to the mixed powder and press-molding the resulting powder at a pressure of 100 MPa, and was treated to remove the binder at a specified temperature. Thereafter, the molded matter was sintered at 850 to 1000° C. for 2 hours to form the glass ceramics A, B. The dielectric constant and dielectric loss of the glass ceramics A, B at 60 GHz were measured in a manner similar to the above. The measurement result is shown in TABLE-2.

After a slurry was produced by adding an organic binder and a solvent to the mixed powder and mixing them, a sheet was formed by the doctor blade method. Thereafter, a conductive layer of a specified pattern as shown in FIG. 6 having an attenuation characteristic of 30 dB or higher at 76.5 GHz was formed on the outer surface of the sheet by a technique listed in TABLE-2, and an other sheet formed as above was placed on the outer surface of the former sheet.

After being sintered at 850 to 1000° C. in a nonoxiding atmosphere, the obtained laminated matter was cut into a specified shape, thereby forming the suppressor strip.

The obtained waveguide strip was cut to a height of 1.8 mm, a width of 1 mm and a length of 100 mm, whereas the obtained suppressor strip was cut to a height of 1.8 mm, a width of 1 mm and a length of 10 mm. They were arranged between parallel plate conductors made of two copper plates having a longitudinal dimension of 100 mm, a lateral dimension of 100 mm and a thickness of 8 mm, electromagnetic waves excited in the LSM mode were inserted into the suppressor after being converted into those of the LSE mode. An output strength (transmission loss at 76.5 GHz) of the LSE mode outputted from the suppressor was measured by a network analyzer to obtain an attenuation characteristic of the LSE mode. The result is shown in TABLE-2.

EXAMPLE 6

An NRD guide was formed as in Example 5 except that the dielectric strip was made of glass ceramics used for the suppressor strip of Example 5 (sample No. 5) and the suppressor strip is made of cordierite ceramics used for the waveguide strip in Example 5 and the conductive layer therein was formed of tungsten (W) (sample No. 6), and estimated. The result is shown in TABLE-2.

(Comparative Example 3)

An NRD guide was fabricated as in Example 5 except that two sintered matters having substantially the same shape which would be obtained by vertically dividing the suppressor strip made of cordierite ceramics of the sample No. 6 of Example 6 were formed, and were so arranged in parallel to each other as to cover a copper conductive layer formed on one outer surface of one sintered matter by deposition or were adhered to each other by a polyvinyl alcohol adhesive, and estimated (samples No. 7, 8). In this case, the conductive layer was arranged to be located in the middle. The result is shown in TABLE-2.

(Comparative Example 4)

An NRD guide was fabricated similar to the sample No. 8 except that the suppressor strip of the sample No. 8 of Comparative Example 3 was made of a glass-epoxy resin composite material and half pieces were adhered by an adhesive, and estimated (sample No. 9). The result is shown in TABLE-2.

transmission loss of high-frequency signals because the dielectric strip is strongly secured to the inner surfaces of the parallel plate conductors.

Further, since the suppressor is obtained by integrally forming the ceramic dielectric strip and the conductive layer by simultaneous sintering in the NRD guide S3, the dimensional precision of the suppressor and the precision of positioning of the conductive layer can be improved and the suppressor can be easily formed and have a stable function.

In the case that the dielectric strip 303 of the NRD guide S3 is made of, e.g., ceramics, it may be comprised of a plurality of strip sections as in the first embodiment shown in FIG. 1 and the end faces of the respective strip sections may be opposed to each other at a spacing equal to or shorter than ⅛ of the wavelength of the high-frequency signal to be transmitted. This can reduce conversion of electromagnetic waves of the LSM mode into those of the LSE mode and enables an easy fabrication of a dielectric strip having even a complicated shape formed by linear and curved portions. In other words, if the dielectric strip 303 is formed by a plurality of strip sections, a bend loss can be reduced even if the dielectric strip 303 includes a curved portion.

Figure 7:
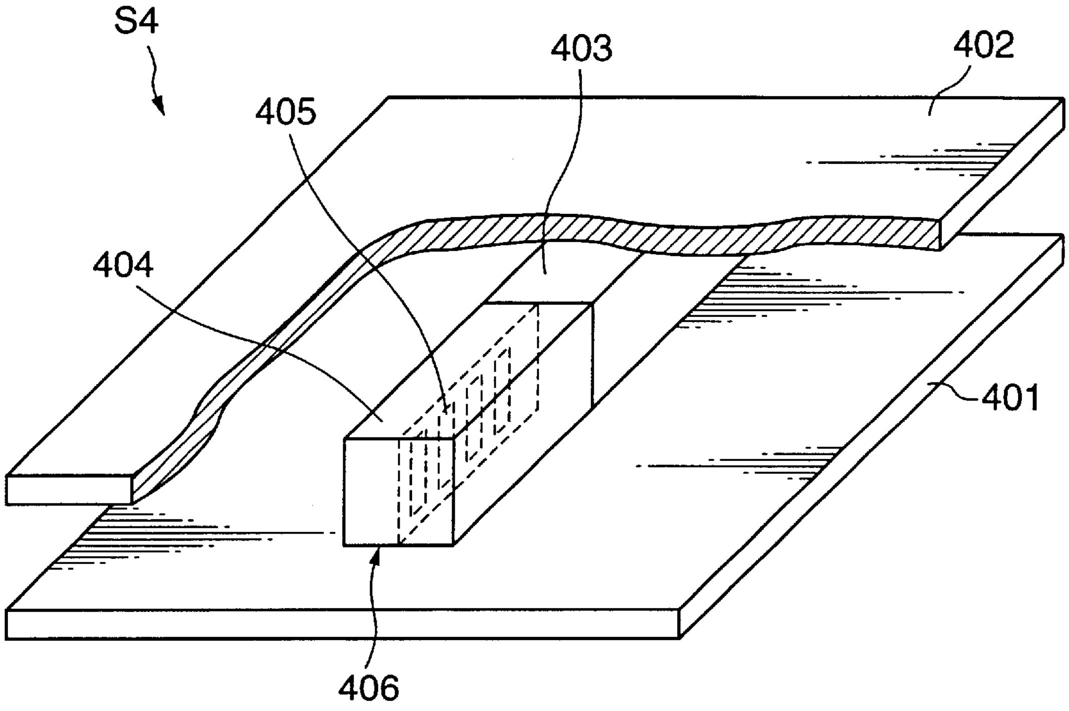
FIG. 7 is a perspective view partly cut away and partly in section showing an inside of a NRD guide according to a fourth embodiment of the invention.

FIG. 7 is a schematic perspective view partly cut away and partly in section showing an NRD guide according to a fourth embodiment of the invention. An NRD guide S4 according to the fourth embodiment is mainly designed to solve the problems in the prior art. In FIG. 7, the NRD guide S4 is constructed by arranging a dielectric strip 403 as a waveguide strip and a dielectric strip 404 as a suppressor strip forming a suppressor between a pair of parallel plate conductors 401, 402 vertically opposed to each other at a spacing which is equal to or shorter than half the wavelength of a high-frequency signal to be transmitted. It should be noted that the wavelength here is a wavelength in the air (free space) at an operating frequency.

The respective parallel plate conductors 401, 402 are formed of conductive plates made of, e.g., Cu, Al, Fe, SUS (Stainless Steel), Ag, Au, Pt, brass (Cu-Zn alloy) since they need to have a high electric conductivity and an excellent processability. Alternatively, they may be formed of insulating plates made of ceramics, resin or like material having a conductive layer made of the above metallic materials formed on its outer surface. Further, the surfaces (inner surfaces) of the parallel plate conductors 401, 402 facing the dielectric strips 403, 404 are ground so that an arithmetic average roughness Ra thereof satisfies 0.1 μm≦Ra≦50 μm.

TABLE 2

| | NRD Guide Strip | | | Suppressor Strip | | | Conductive Layer | | Suppressor | LSE Mode |
|---|---|---|---|---|---|---|---|---|---|---|
| | Material | D.C. | D.L. | Material | D.C. | D.L. | Material | F.M. | F.M. | A.C. (dB) |
| 1 | Cordierite | 4.8 | 3.6 × 10⁻⁴ | Glass Ceramics A | 4.8 | 8 × 10⁻⁴ | Cu | Printing | Simultaneous Sintering | 30 |
| 2 | Cordierite | 4.8 | 3.6 × 10⁻⁴ | Glass Ceramics A | 4.8 | 8 × 10⁻⁴ | Cu | Deposition | Simultaneous Sintering | 35 |
| 3 | Cordierite | 4.8 | 3.6 × 10⁻⁴ | Glass Ceramics A | 4.8 | 8 × 10⁻⁴ | Cu | Transfer | Simultaneous Sintering | 35 |
| 4 | Cordierite | 4.8 | 3.6 × 10⁻⁴ | Glass Ceramics B | 5.5 | 9.5 × 10⁻⁴ | Cu | Deposition | Simultaneous Sintering | 28 |
| 5 | Glass Ceramics A | 4.8 | 8 × 10⁻⁴ | Glass Ceramics A | 4.8 | 8 × 10⁻⁴ | Cu | Deposition | Simultaneous Sintering | 32 |
| 6 | Cordierite | 4.8 | 3.6 × 10⁻⁴ | Cordierite | 4.8 | 3.6 × 10⁻⁴ | W | Printing | Simultaneous Sintering | 25 |
| *7 | Cordierite | 4.8 | 3.6 × 10⁻⁴ | Cordierite | 4.8 | 3.6 × 10⁻⁴ | Cu | Deposition | Parallel Arrangement | 8 |
| *8 | Cordierite | 4.8 | 3.6 × 10⁻⁴ | Cordierite | 4.8 | 3.6 × 10⁻⁴ | Cu | Deposition | With Adhesive | 13 |
| *9 | Cordierite | 4.8 | 3.6 × 10⁻⁴ | Glass-Epoxy | 4.8 | 100 × 10⁻⁴ | Cu | Deposition | With Adhesive | 15 |

As is clear from the results shown in TABLE-2, the suppressors formed by arranging the two sintered half pieces in parallel to each other (sample No. 7) or adhering them by the adhesive (samples Nos. 8 and 9) had a low performance as a suppressor: a LSE mode attenuation characteristic of 10 dB or lower because of a clearance formed between the two sintered half pieces or the adhesive therebetween. Further, a microscopic observation confirmed the presence of air bubbles in the adhesive.

Contrary to this, the inventive suppressors (samples Nos. 1 to 6) integrally formed by simultaneous sintering showed a satisfactory suppressor characteristic: a LSE mode attenuation characteristic of 25 dB or higher.

Since the parallel plate conductors are formed so that the arithmetic average roughness Ra of their inner surfaces satisfies 0.1 μm≦Ra≦50 μm as described above, the NRD guide S3 according to the third embodiment of the invention has an excellent durability and can effectively suppress the This arithmetic average roughness Ra is the same as the one defined in the first embodiment, and the range thereof is set as above for the same reason mentioned in the first embodiment. The arithmetic average roughness Ra satisfies preferably 0.3 $\mu m \leqq Ra \leqq 25$ $\mu m$, and more preferably 0.4 $\mu m \leqq Ra \leqq 10$ $\mu m$.

The dielectric strip 403 as a waveguide strip may be made of a resin dielectric material such as Teflon, polystyrene or glass epoxy or a cordierite ($2MgO.2Al_2O_3.5SiO_2$) ceramics, alumina ($Al_2O_3$) ceramics, glass ceramics or forsterite ($2MgO.SiO_2$) ceramics or like ceramics having a low dielectric constant. This is because these materials can suppress a transmission loss in a high-frequency band. Particularly in view of a dielectric characteristic, processability, strength, miniaturization, reliability, etc., the dielectric strip 403 is desirably made of cordierite ceramics. By containing at least one kind of element selected from Y, La, Ce, Pr, Nd, Sm, Eu, Dy, Ho, Er, Tm, Yb, Lu in the cordierite ceramics, electric characteristics such as a Q-value can be improved and signals can be transmitted with a low transmission loss.

The dielectric strip 404 as a suppressor strip forming a suppressor is made of, e.g., the same material as the dielectric strip 303, and is continuously arranged at one end of the dielectric strip 403. The ceramic dielectric strip 404 may be spaced apart from one end of the dielectric strip 403 by a specified distance. Conductive layers 405 of a specified pattern to be described later are formed inside, particularly at the center of the ceramic dielectric strip 404, and a suppressor 406 for the NRD guide is formed by the ceramic dielectric strip 404 and the conductive layer 405.

The conductive layers 405 are made of Cu, Al, Fe, SUS (stainless steel), Ag, Au, Pt or like material having a high electric conductivity, and is arranged substantially in a widthwise middle position of the dielectric strip 404 in a plane perpendicular to the principle planes of the parallel plate conductors 401, 402 and parallel to a transmission direction of high-frequency signals. Although the suppressor for suppressing transmission of the LSE mode is constructed in this manner, the present invention is not limited thereto. For example, a suppressor for suppressing transmission of the LSE mode may be formed by arranging the conductive layers 405 parallel to the parallel plate conductors 401, 402.

Each conductive layer 405 has a vertically long rectangular shape, and a plurality of conductive layers 405 are arranged in the transmission direction of the high-frequency signal. The conductive layers 405 may take any other shape such as a square, circle or ellipse, but are preferably vertically symmetrical. The number of the conductive layers 405 (suppressing stages) is preferably between 3 and 10 in order to effectively attenuate unnecessary modes. If the number of the conductive layers 405 exceeds 10, the suppressor 406 becomes too long, thereby making the NRD guide larger and making the transmission loss of the high-frequency signal likely to increase.

A dimension b (see FIG. 8) of each conductive layer 405 in the transmission direction of the high-frequency signal is preferably ½ or less of the wavelength of a TEM mode electromagnetic wave of the high-frequency signal, and the thickness thereof is preferably 0.1 mm or smaller. If the dimension b of the conductive layer 405 exceeds half the wavelength of the TEM mode electromagnetic wave of the high-frequency signal, it becomes difficult to suppress the TEM mode by attenuation. A lower limit of the dimension b of the conductive layer 405 is not particularly limited, but is preferably 0.1 mm or longer for a practical reason. If the thickness of the conductive layer 405 exceeds 0.1 mm, the electromagnetic waves of the LSE mode are likely to be reflected, thereby increasing their transmission loss. More preferably, the thickness of the conductive layer 405 is 0.05 $\mu m$ or larger. If it is below 0.05 $\mu m$, it is difficult to form the conductive layer 405 into a specified shape. An interval d (see FIG. 8) between adjacent conductive layers 405 is desirably ¼ or shorter of the wavelength of the LSM mode in terms of transmission characteristic, but the suppressor 406 is usable even if the interval d exceeds ¼ of the wavelength of the LSM mode.

The conductive layers 405 forming the suppressor 406 are formed by a method for applying a metallic paste containing metallic particles of, e.g., Cu by printing and sintering the applied metallic paste or an other known thin film forming method such as a deposition method, a spattering method or a CVD method. Alternatively, the conductive layers 405 may be formed of thin conductive plates and adhered to the inner surfaces of half pieces of the dielectric strip 404 divided in a direction normal to the transmission direction of the high-frequency signal or may be inserted into a groove formed in the dielectric strip 404. The thus formed dielectric strip 404 may be placed on the parallel plate conductor 401 while being positioned with respect to the dielectric strip 403 or may be placed on the parallel plate conductor 401 after being adhered to the dielectric strip 403 by an adhesive.

In the NRD guide in which the conductive layers 405 are formed of thin conductive plates and inserted into the groove formed in the dielectric strip 404, the dielectric strips 403, 404 may be integrally formed without being separated. In other words, in either construction of the NRD guide, it is sufficient to form a suppressor by providing a plurality of conductor layers at specified intervals (repeating intervals) along the transmission direction of the high-frequency signal in a plane parallel to the transmission direction of the high-frequency signal inside the end of the dielectric strip provided between the pair of parallel plate conductors.

The suppressor 406 of the NRD guide S4 according to the fourth embodiment is provided at a side of the dielectric strip 403 toward a mode converting device such as a circulator or an oscillator at which side unnecessary modes including the LSE mode are likely to be created. The high-frequency band in the present invention corresponds to a microwave band and a millimeter wave band ranging from in the order of 10 to in the order to 100 GHz, and the NRD guide S4 according to the fourth embodiment is suitably used in a high-frequency band, for example, above 30 GHz, particularly above 50 GHz, and further above 70 GHz.

The NRD guide S4 according to the fourth embodiment is used in a wireless LAN or a millimeter wave radar installed in an automotive vehicle with a high-frequency diode such as a Gunn diode incorporated thereinto as a high frequency generating device. In such a millimeter wave radar, a millimeter wave is projected to an obstacle and other automotive vehicles present around an automotive vehicle in which this radar is installed, the reflected wave is combined with the original millimeter wave to obtain a beat signal (intermediate-frequency signal), and distances to the obstacle and other automotive vehicles and their moving speeds are measured by analyzing this beat signal.

The NRD guide S4 according to the fourth embodiment can effectively attenuate unnecessary modes by suppressing the resonance thereof since being provided with the suppressor 406 at one end of the dielectric strip. Further, reflection by the conductive layer of the LSM mode which is one of the transmission modes is unlikely to occur in the NRD guide S4. Thus, the transmission loss of the LSM mode can be reduced.

In the case that the dielectric strip 403 of the NRD guide S4 is made of, e.g., ceramics, it may be comprised of a plurality of strip sections as in the first embodiment shown in FIG. 1 and the end faces of the respective strip sections may be opposed to each other at a spacing equal to or shorter than λ/8 (λ is a wavelength of a high-frequency signal to be transmitted). This can reduce conversion of electromagnetic waves of the LSM mode into those of the LSE mode and enables an easy fabrication of a dielectric strip having even a complicated shape formed by linear and curved portions. In other words, if the dielectric strip 403 is formed by a plurality of strip sections, a bend loss can be reduced even if the dielectric strip 403 includes a curved portion.

Figure 10A:
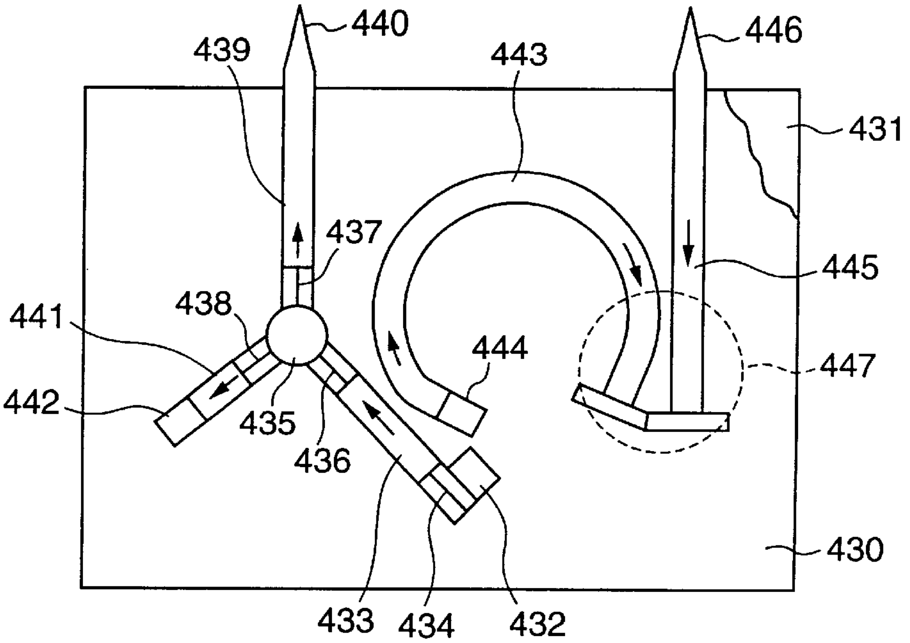
FIG. 10A is a plan view of a millimeter wave radar module in which the NRD guide shown in FIG. 7 is used.
Figure 11:
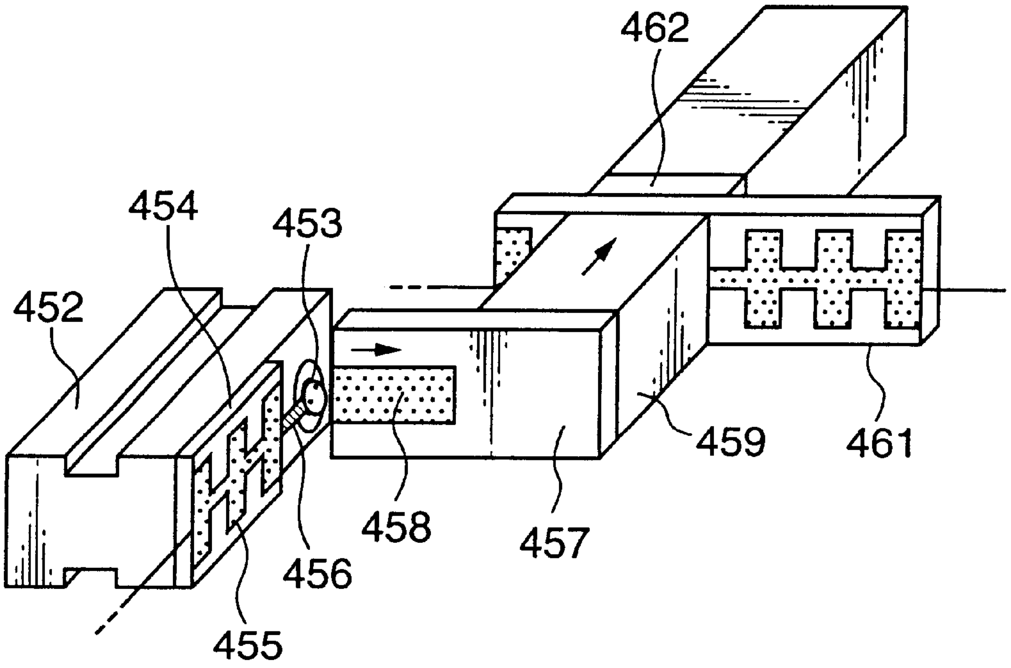
FIG. 11 is a perspective view showing a millimeter wave signal oscillator of voltage control type used in the millimeter wave radar modules shown in FIG. 9A or 10.
Figure 12:
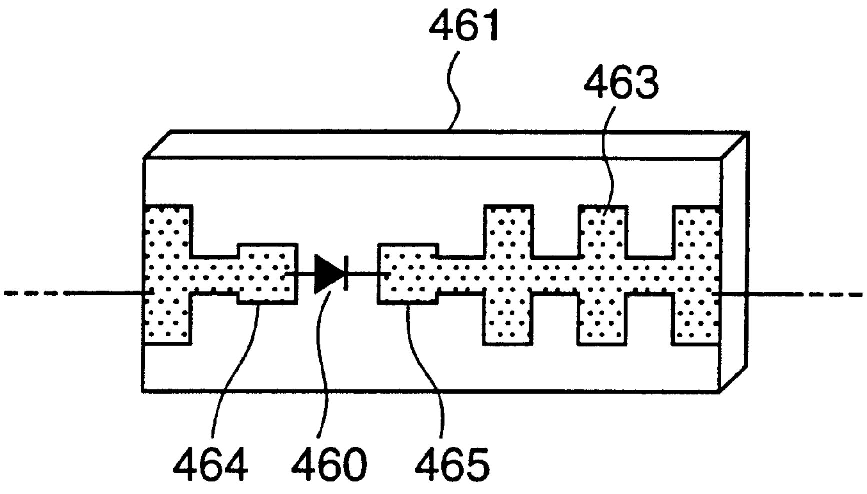
FIG. 12 is a perspective view of a circuit board on which a varactor diode is provided for the millimeter wave signal oscillator shown in FIG. 11.

A millimeter wave radar module as a millimeter wave transmitting/receiving apparatus to which the NRD guide S4 is applied is described below. FIGS. 9 to 12 show millimeter wave radar modules according to the embodiment of the invention, wherein FIG. 9A is a plan view of a millimeter wave radar module having an integrated transmitting/receiving antenna, FIG. 10A is a plan view of a millimeter wave radar module having independent transmitting antenna and receiving antenna, FIG. 11 is a perspective view showing a millimeter wave signal oscillator, and FIG. 12 is a perspective view of a circuit board on which a variable-capacitance diode (varactor diode) for the millimeter wave signal oscillator is provided.

Figure 9A:
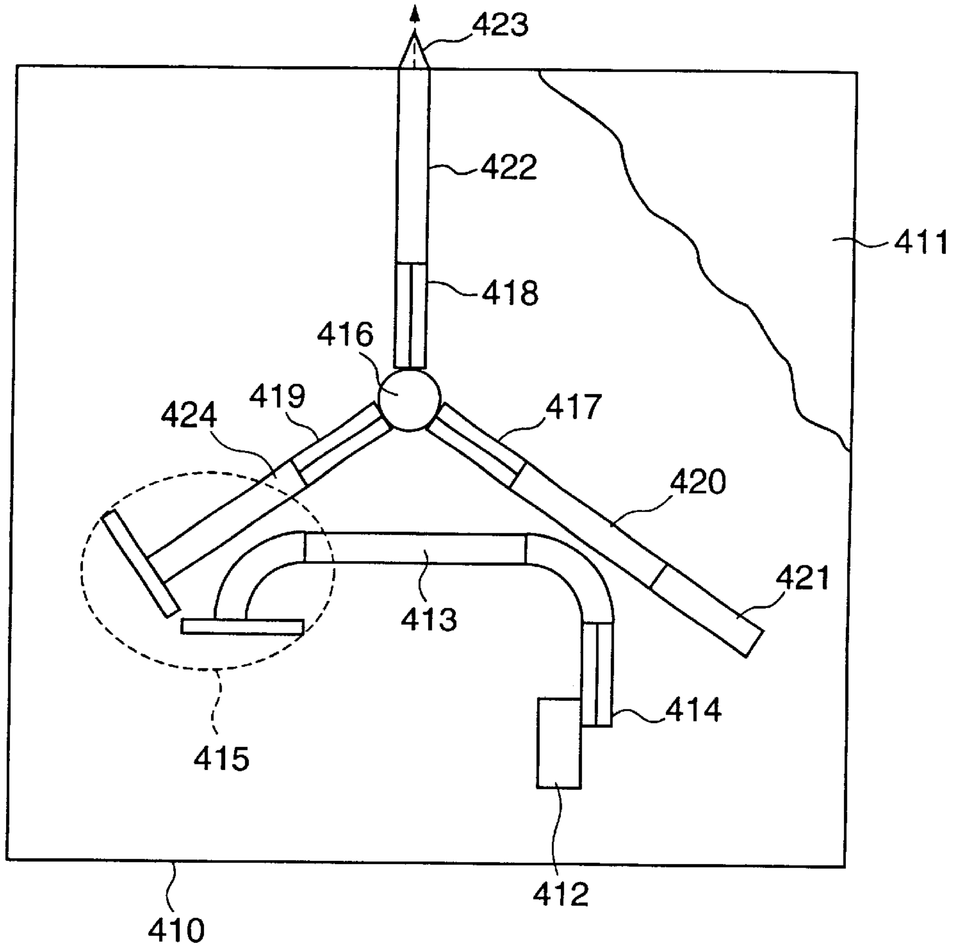
FIG. 9A is a plan view of a millimeter wave radar module in which the NRD guide shown in FIG. 7 is used.

Identified by 410, 411 in FIG. 9A are a pair of vertically arranged parallel plate conductors which are constructed similar to the parallel plate conductors 401, 402 shown in FIG. 7. Various devices to be described later are inserted between the pair of parallel plate conductors 410, 411. It should be noted that the upper parallel plate conductor 411 is partly cut away in order to make an entire construction visible. Identified by 412 is a millimeter wave oscillator of voltage control type which is provided at one end of a first dielectric strip 413 to be described later. The millimeter wave signal oscillator 412 outputs a frequency-modulated millimeter wave signal to be transmitted by cyclically controlling a bias voltage of the variable-capacitance diode disposed in vicinity of the high-frequency diode (high-frequency generating device) to have a triangular wave, a sine wave or other wave such that a bias voltage applying direction coincides with a direction of an electric field of a high-frequency signal.

The first dielectric strip 413 is formed similar to the dielectric strip 403 shown in FIG. 7 and is adapted to transmit the millimeter wave signal obtained by modulating the high-frequency signal outputted from the high-frequency diode such as a Gunn diode as a high-frequency generating device. A first suppressor 414 formed similar to the suppressor 406 shown in FIG. 7 is connected with one end of the dielectric strip 413. In other words, the NRD guide S4 is substantially constructed by arranging the first suppressor 414 at one end of the dielectric strip 413 provided between the pair of parallel plate conductors 410, 411.

The first dielectric strip 413 has one end thereof connected with the millimeter wave signal oscillator 412 via the first suppressor 414 and the other end thereof connected with a mixer 415. Identified by 416 is a circulator made of two ferrite disks which are ferromagnetic plates vertically opposed to each other and having first, second and third connecting portions (none of them is shown) each having one end thereof connected with a corresponding one of second, third and fourth suppressors 417, 418, 419 formed similar to the suppressor 406 shown in FIG. 7. In other words, the second suppressor 417 is connected with the first connecting portion of the circulator 416, the third suppressor 418 is connected with the second connecting portion thereof and the fourth suppressor 419 is connected with the third connecting portion thereof.

Figure 9B:
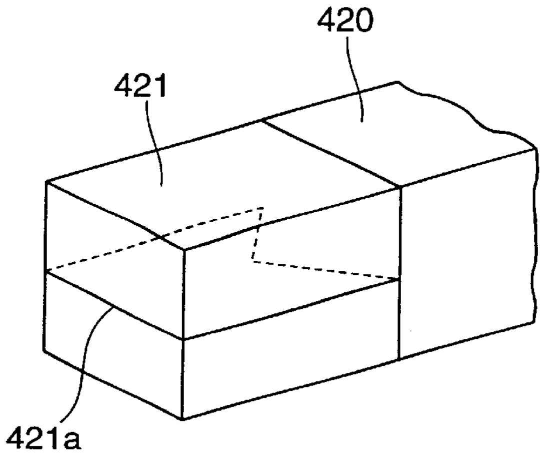
FIG. 9B is a perspective view of a nonreflective termination in the millimeter wave radar module shown in FIG. 9A.

Identified by 420 is a second dielectric strip having one end thereof connected with the other end of the second suppressor 417. The second dielectric strip 420 is adapted to transmit a millimeter wave signal and is formed similar to the dielectric strip 403 shown in FIG. 7. In other words, the NRD guide S4 is substantially constructed by arranging the second suppressor 417 at one end of the second dielectric strip 420 provided between the pair of parallel plate conductors 410, 411. Identified by 421 is a nonreflective termination (terminator) provided at the other end of the second dielectric strip 420. The nonreflective termination 421 is provided with a resistance film 421*a* therein, as shown in FIG. 9B. The resistance film 421*a* is formed along a plane separating the nonreflective termination 421 into an upper half and a lower half and parallel with the pair of parallel plate conductors 410, 411. Further, the resistance film 421*a* may be formed on side surfaces or end surface of the nonreflective termination 421. The resistance film 421*a* is made of an NiCr alloy or resin containing conductive particles such as carbon particles. The nonreflective termination 421 provided with the resistance film 421*a* may be integrally formed with the second dielectric strip 420 by simultaneous sintering.

Identified by 422 is a third dielectric strip having one end thereof connected with the other end of the third suppressor 418. The third dielectric strip 422 is adapted to transmit a millimeter wave signal and is formed similar to the dielectric strip 403 shown in FIG. 7. In other words, the NRD guide S4 is substantially constructed by arranging the third suppressor 418 at one end of the third dielectric strip 422 provided between the pair of parallel plate conductors 410, 411. The leading end of the third dielectric strip 422 is tapered to form a transmitting/receiving antenna 423.

Identified by 424 is a fourth dielectric strip having one end thereof connected with the other end of the fourth suppressor 419. The fourth dielectric strip 424 is formed similar to the dielectric strip 403 shown in FIG. 7. In other words, the NRD guide S4 is substantially constructed by arranging the fourth suppressor 419 at one end of the fourth dielectric strip 424 provided between the pair of parallel plate conductors 410, 411. The fourth dielectric strip 424 transmits a radio wave received by the transmitting/receiving antenna 423 and outputted from the third connecting portion of the circulator 416 via the third dielectric strip 422 to the mixer 415.

Here, part of the millimeter wave signal outputted from the millimeter wave signal oscillator 412 is transmitted to the circulator 416 by arranging one end of the first dielectric strip 413 toward the millimeter wave signal oscillator 412 and one end of the second dielectric strip 420 close to each other for electromagnetic coupling or joining one end of the first dielectric strip 413 with one end of the second dielectric strip 420.

The mixer 415 mixes part of the millimeter wave signal outputted from the millimeter wave signal oscillator 412 with the received wave to generate an intermediate-frequency signal by electromagnetically coupling an intermediate position of the first dielectric strip 413 and that of the fourth dielectric strip 424 by bringing them closer to each other or joining them.

In the construction of FIG. 9A, a pulsated millimeter wave signal can be oscillated by providing a switch constructed similar to the one shown in FIG. 12 in an intermediate position of the first dielectric strip 413. A switch shown in FIG. 12 is constructed such that a second choke-type bias supply strip 463 is formed on one principle plane of a circuit board 461 and a PIN diode or Schottky barrier diode of beam lead type is mounted in an intermediate position of the strip 463 by soldering.

Another embodiment of the millimeter wave radar module as an inventive millimeter wave transmitting/receiving apparatus to which the NRD guide S4 is applied is of the type shown in FIG. 10A having independent transmitting antenna and receiving antenna. Identified by 430, 431 in FIG. 10A are a pair of vertically arranged parallel plate conductors which are constructed similar to the parallel plate conductors 401, 402 shown in FIG. 7. It should be noted that the upper parallel plate conductor 431 is partly cut away in order to make an entire construction visible.

Identified by 432 is a millimeter wave oscillator of voltage control type which is provided at one end of a first dielectric strip 433 to be described later. The millimeter wave signal oscillator 432 outputs a frequency-modulated millimeter wave signal to be transmitted by cyclically controlling a bias voltage of the variable-capacitance diode disposed in vicinity of the high-frequency diode (high-frequency generating device) to have a triangular wave, a sine wave or other wave such that a bias voltage applying direction coincides with a direction of an electric field of a high-frequency signal.

The first dielectric strip 433 is formed similar to the dielectric strip 403 shown in FIG. 7 and is adapted to transmit the millimeter wave signal obtained by modulating the high-frequency signal outputted from the high-frequency diode such as a Gunn diode as a high-frequency generating device. A first suppressor 434 formed similar to the suppressor 406 shown in FIG. 7 is connected with the other end of the dielectric strip 433. In other words, the NRD guide S4 is substantially constructed by arranging the first suppressor 434 at one end of the first dielectric strip 433 provided between the pair of parallel plate conductors 430, 431.

The first dielectric strip 433 has one end thereof connected with the millimeter wave signal oscillator 432 via the first suppressor 434 and the other end thereof connected with a second suppressor 436 to be described later. Identified by 435 is a circulator made of two ferrite disks which are ferromagnetic plates vertically opposed to each other and having first, second and third connecting portions (none of them is shown) each having one end thereof connected with a corresponding one of second, third and fourth suppressors 436, 437, 438 formed similar to the suppressor 406 shown in FIG. 7. In other words, the second suppressor 436 is connected with the first connecting portion of the circulator 435, the third suppressor 437 is connected with the second connecting portion thereof and the fourth suppressor 438 is connected with the third connecting portion thereof.

Identified by 439 is a second dielectric strip having one end thereof connected with the other end of the second suppressor 437. The second dielectric strip 439 is adapted to transmit a millimeter wave signal and is formed similar to the dielectric strip 403 shown in FIG. 7. In other words, the NRD guide S4 is substantially constructed by arranging the second suppressor 437 at one end of the second dielectric strip 439 provided between the pair of parallel plate conductors 430, 431. The leading end of the second dielectric strip 439 is tapered to form a transmitting antenna 440.

Identified by 441 is a third dielectric strip having one end thereof connected with the other end of the fourth suppressor 438. The third dielectric strip 441 is adapted to transmit a millimeter wave signal and is formed similar to the dielectric strip 403 shown in FIG. 7. In other words, the NRD guide S4 is substantially constructed by arranging the fourth suppressor 438 at one end of the third dielectric strip 441 provided between the pair of parallel plate conductors 430, 431. A nonreflective termination 442 for attenuating the millimeter wave signal received by the transmitting antenna 440 is provided at the leading end of the third dielectric strip 441.

Identified by 443 is a fourth dielectric strip for transmitting part of the millimeter wave signal to a mixer 447 by arranging one end thereof in vicinity of the first dielectric strip 433 for electromagnetic coupling or joining one end thereof with the first dielectric strip 433. Identified by 444 is a nonreflective termination provided at one end of the fourth dielectric strip 443 opposite from the mixer 447 to be described later. Identified by 445 is a fifth dielectric strip which is formed at its leading end with a receiving antenna 446 by, e.g., tapering and is adapted to transmit a radio wave received by this receiving antenna 446 to the mixer 447. The mixer 447 mixes part of the millimeter wave signal with the received wave to generate an intermediate-frequency signal by electromagnetically coupling an intermediate position of the fourth dielectric strip 443 and that of the fifth dielectric strip 445 by bringing them closer to each other or joining them.

Figure 10B:
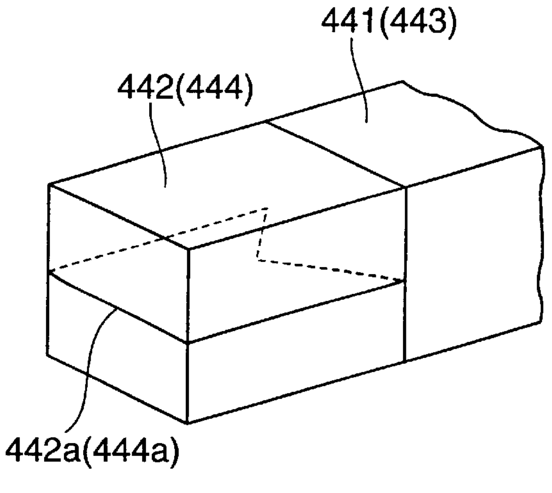
FIG. 10B is a perspective view of a nonreflective termination in the millimeter wave radar module shown in FIG. 10A.

The nonreflective termination 442 (444) is provided with a resistance film 442*a* (444*a*) therein, as shown in FIG. 10B. The resistance film 442*a* (444*a*) is formed along a plane separating the nonreflective termination 442 (444) into an upper half and a lower half and parallel with the pair of parallel plate conductors 430, 431. Further, the resistance film may be formed on side surfaces or end surface of the nonreflective termination 442 (444). The resistance film 442*a* (444*a*) is made of an NiCr alloy or resin containing conductive particles such as carbon particles. The nonreflective termination 442 (444) provided with the resistance film 442*a* (444*a*) may be integrally formed with the third dielectric strip 441 (443) by simultaneous sintering.

In the construction of FIG. 10A, the fourth dielectric strip 443 may be coupled by arranging one end thereof in vicinity of the second dielectric strip 439 for electromagnetic coupling or joining one end thereof with the second dielectric strip 439, so that part of the millimeter wave signal can be transmitted to the mixer 447.

The millimeter wave signal oscillators 412, 432 used in the millimeter wave radar module shown in FIGS. 9 and 10 are shown in FIGS. 11 and 12. Identified by 452 in FIGS. 11 and 12 is a metallic member such as a metallic block for mounting a Gunn diode 453. The Gunn diode 453 is one type of the high-frequency diodes for oscillating a millimeter wave signal and is mounted on one side surface of the metallic member 452. Identified by 454 is a circuit board on which a choke-type bias supply strip 455, functioning as a low-pass filter, is formed to supply a bias voltage to the Gunn diode 453 and prevent leak of a high-frequency signal. Identified by 456 is a strip conductor such as a metallic foil ribbon for connecting the choke-type bias supply strip 455 and an upper conductor of the Gunn diode 453.

Identified by 457 is a metal strip resonator formed by providing a metal strip 458 for resonance on a dielectric substrate, and by 459 a dielectric waveguide for leading the high-frequency signal resonated by the metal strip 457 to the outside of the millimeter wave signal oscillator. A circuit board 461 carrying a varactor diode 460 which is used for frequency modulation and is one type of the variable-capacitance diodes is provided in an intermediate position of the dielectric waveguide 459. A bias voltage applying direction of the varactor diode 460 is a direction (direction of electric field) perpendicular to the transmission direction of the high-frequency signal and parallel to the principle planes of the parallel plate conductors 430, 431. Further, the bias voltage applying direction of the varactor diode 460 coincides with a direction of an electric field of a high-frequency signal of the $LSM_{01}$ mode transmitting in the dielectric waveguide 459, so that the bias voltage is controlled to change an electrostatic capacitance of the varactor diode 460 by electromagnetically coupling the high-frequency signal and the varactor diode 460, thereby controlling the frequency of the high-frequency signal. Identified by 462 is a dielectric plate having a high relative dielectric constant used for the impedance matching between the varactor diode 460 and the dielectric waveguide 459.

As shown in FIG. 12, the second choke-type bias supply strip 463 having the varactor diode 460 of beam lead type mounted in its intermediate position is formed on one principle plane of the circuit board 461. Further, connection electrodes 464, 465 are formed at portions of the second chock-type bias supply strip 463 connected with the varactor diode 460.

In this construction, the high-frequency signal oscillated by the Gunn diode 453 is led to the dielectric waveguide 459 via the metal strip resonator 457. Subsequently, part of the high-frequency signal is reflected by the varactor diode 460 to return to the Gunn diode 453. This reflection signal changes as the electrostatic capacitance of the varactor diode 460 changes, thereby changing an oscillating frequency.

FMCW (frequency modulation continuous waves) system, pulse system or like system is applicable to the millimeter wave radar module shown in FIGS. 9 and 10. In the case of the FMCW system, an operation principle is as follows. An input signal representing a change of voltage amplitude with time in the form of a triangular wave, sine wave or other wave is inputted to a MODIN terminal for modulated signal input of the millimeter wave signal oscillator, and an output signal thereof is frequency-modulated so that deviation of an output frequency of the millimeter wave signal oscillator is represented by a triangular wave, sine wave or other wave. In the case that the output signal (transmitted wave) is radiated via the transmitting/receiving antenna 423 or the transmitting antenna 440, a reflected wave (received wave) returns with a time lag resulting from a time required for the radio wave to propagate back and forth if a target is present in front of the transmitting/receiving antenna 423 or the transmitting antenna 440. At this time, a frequency difference between the transmitted wave and the received wave is outputted to an IFOUT terminal at the output side of the mixer 415 or 447.

A distance to the target can be calculated in accordance with following equation by analyzing a frequency component of the output frequency of the IFOUT terminal or the like:

$$Fif=4R\cdot fm\cdot \Delta f/c$$

(Fif: IF (intermediate frequency) output frequency, R: distance, fm: modulating frequency, Δf: frequency deviation range, c: velocity of light).

In the millimeter wave signal oscillators 412, 432 of the millimeter wave radar modules according to the embodiment of the invention, the choke-type bias supply strip 455 and the strip conductor 456 are made of, e.g., Cu, Al, Au, Ag, W, Ti, Ni, Cr, Pd, Pt. Particularly, Cu, Ag are preferable because of a satisfactory electric conductivity, a small transmission loss and a large oscillation output.

The strip conductor 456 is electromagnetically coupled to the metallic member 452 at a specified spacing from the outer surface of the metallic member 452 and bridges the choke-type bias supply strip 455 and the Gunn diode 453. More specifically, one end of the strip conductor 456 is connected with one end of the choke-type bias supply strip 455 by, e.g., soldering, the other end thereof is connected with an upper conductor of the Gunn diode 453 by, e.g., soldering, and an intermediate portion thereof extends in the air.

The metallic member 452 is sufficient to be a metallic conductor since it also acts as an electric ground for the Gunn diode 453, and the material therefor is not particularly restricted provided that it is a metallic (including alloys) conductor. The metallic member 452 may be made of, e.g., brass (Cu-Zn alloy), Al, Cu, SUS (stainless steel), Ag, Au, Pt. Alternatively, the metallic member 452 may be a metallic block entirely made of a metal, ceramics or plastic block having its outer surfaces entirely or partly coated with metal plating, or an insulating substrate having its outer surfaces entirely or partly coated with a conductive resin material.

The millimeter wave radar module as a millimeter wave transmitting/receiving apparatus according to the embodiment of the invention can effectively attenuate electromagnetic waves of unnecessary modes such as LSE mode and TEM mode and reduce the transmission loss of the LSM mode. Therefore, in the case that the millimeter wave transmitting/receiving apparatus is applied to the millimeter wave radar or the like, a detection distance can be increased (type of FIG. 9A). Further, this millimeter wave radar module can effectively attenuate electromagnetic waves of unnecessary modes such as LSE mode and TEM mode and reduce the transmission loss of the LSM mode, and the millimeter wave signal to be transmitted is not introduced to the mixer via the circulator. Therefore, in the case that the millimeter wave transmitting/receiving apparatus is applied to the millimeter wave radar or the like, this can bring about better transmission characteristics of the millimeter wave signal, reduced noise of the received signal, and an extended detection distance (type of FIG. 10A).

Examples of the NRD guide S4 provided with the suppressor is described below.

EXAMPLE 7

The suppressor 406 shown in FIG. 7 and 8 was formed as follows. A mixed powder was prepared by adding 15 weight parts of $SiO_2$ and 10 weight parts of ZnO to 75 weight parts of glass having an average particle diameter of 1.5 to 2.5 μm and containing 44 weight percent of $SiO_2$, 29 weight percent of $Al_2O_3$, 11 weight percent of MgO, 7 weight percent of ZnO and 9 weight percent of $B_2O_3$, and adding ceramics filler having an average particle diameter of 1.5 to 2.5 μm to the mixture. After a slurry was prepared by adding and mixing an organic binder and a solvent to and with the mixed powder, a sheet was formed of the resulting mixed powder by the doctor blade method.

Figure 8:
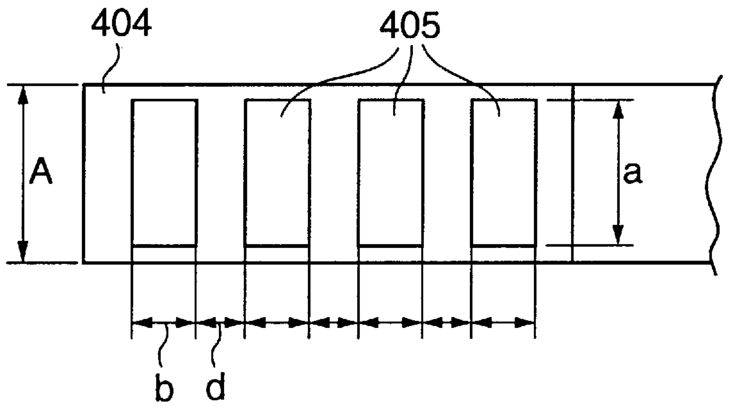
FIG. 8 is a diagram showing an example of a pattern of conductive layers in a mode suppressor used in the NRD guide shown in FIG. 7.

A Cu paste was applied to one outer surface of the sheet by the screen printing method such that four conductive layers having dimensions: a=1.5 mm, b=0.48 mm, d=0.40 mm and a thickness of 10 μm were formed in such a pattern as shown in FIG. 8. A sheet formed in a manner similar to the above sheet was placed on the above sheet. The obtained laminated matter was cut to a height (thickness) of 1.8 mm and a length of 3.5 mm to form a suppressor 406 after being sintered at 850 to 1000° C. in a nonoxiding atmosphere.

Two aluminum plates having a thickness of 6 mm as the parallel plate conductors 401, 402 are arranged at a spacing of 1.8 mm, and the dielectric strip 403 having a rectangular cross section of 1.8 mm (height)×0.8 mm (width) and made of cordierite ceramics having a relative dielectric constant of 4.8 and the suppressor 406 connected with an end of the dielectric strip 403 were placed between the aluminum plates.

An LSE mode attenuation characteristic of the suppressor 406 was estimated. At this time, an NRD guide for converting electromagnetic waves excited in the LSM mode into those of the LSE mode or those of the LSM mode, e.g., the one constructed such that electromagnetic waves of the LSM mode are converted into those of the LSE mode by connecting a dielectric strip with an end of an other dielectric strip transmitting the electromagnetic waves of the LSM mode at a right angle to the transmission direction, and the converted electromagnetic waves of the LSE mode are converted back to those of the LSM mode by connecting a still other dielectric strip with the other end of the other dielectric strip at a right angle to the transmission direction was fabricated. The suppressor 406 was inserted in a portion where the electromagnetic waves of the LSE mode were transmitted, and a transmission characteristic at 75 to 85 GHz was measured using a network analyzer. The measurement result is shown in FIG. 13.

Figure 13:
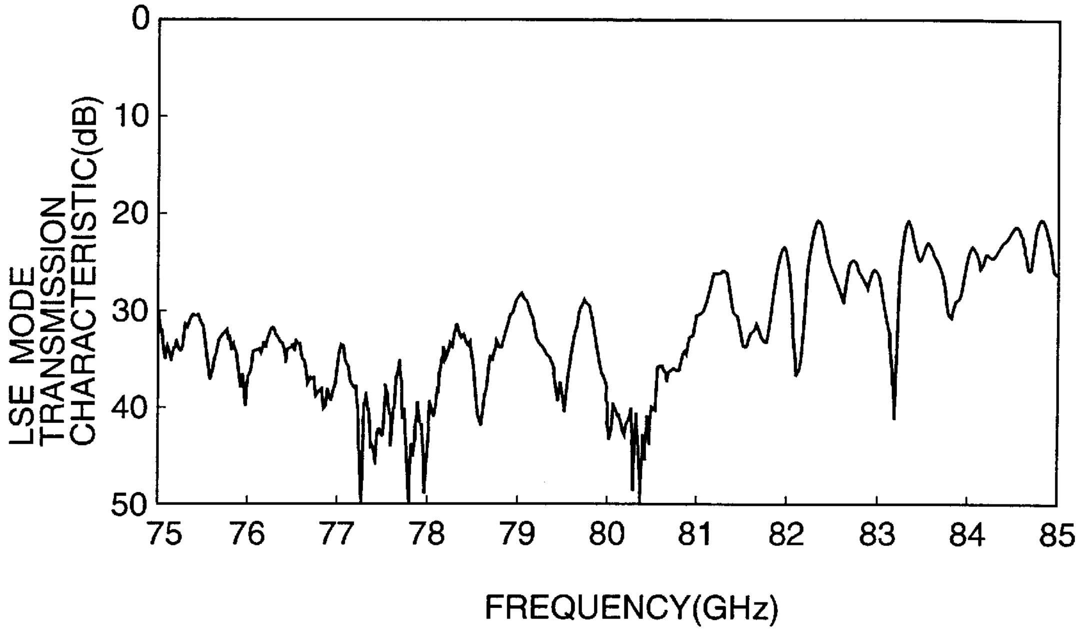
FIG. 13 is a graph showing a measurement result of a transmission characteristic of an LSE mode for a mode suppressor used in the NRD guide shown in FIG. 7.

As is clear from FIG. 13, an attenuation characteristic of about 30 dB or higher was obtained in a frequency range of about 75 to 80 GHz, and an attenuation characteristic of about 20 dB or higher was obtained in a frequency range of about 80 to 85 GHz. As a whole, the attenuation characteristic was at maximum about 50 dB and at minimum about 20 dB. An excellent characteristic was obtained in a frequency band wider than an actual operating frequency band at present of 76 to 77 GHz.

(Comparative Example 5)

Figure 37:
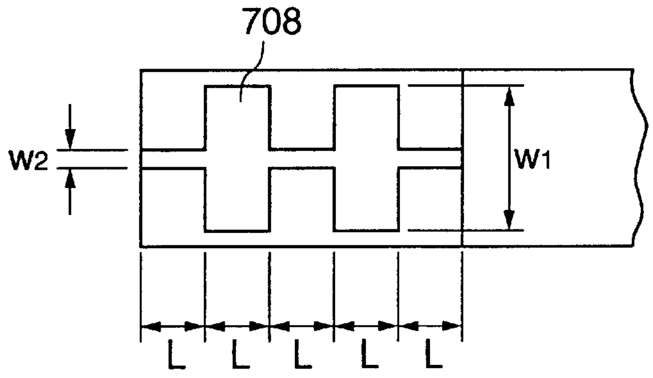
PRIOR ART FIG. 37
FIG. 37 is a side view showing a pattern of a conductive layer for a mode suppressor in the conventional NRD guide shown in FIG. 36.
Figure 38:
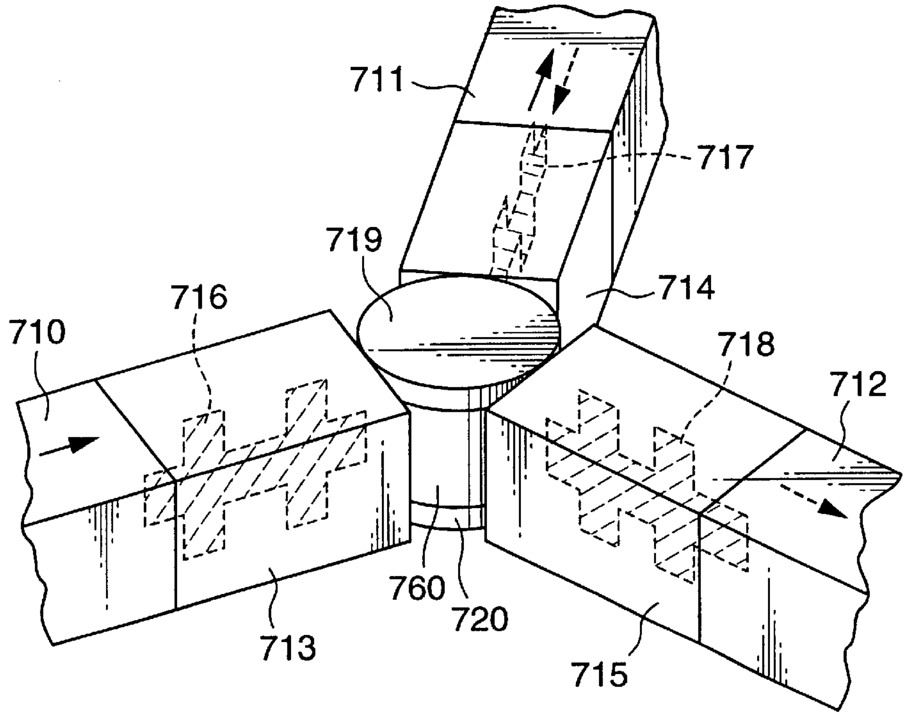
PRIOR ART FIG. 38
FIG. 38 is a perspective view showing an essential portion of yet still another conventional NRD guide.

An NRD guide similar to Example 7 was fabricated except that a conductive layer of a conventional pattern shown in FIG. 37 was formed. The formed pattern was: L=0.5 mm, w1=1.5 mm, w2=0.2 mm, thickness=10 $\mu$m in FIG. 37. A result of a measurement conducted as in Example 7 is shown in FIG. 14.

Figure 14:
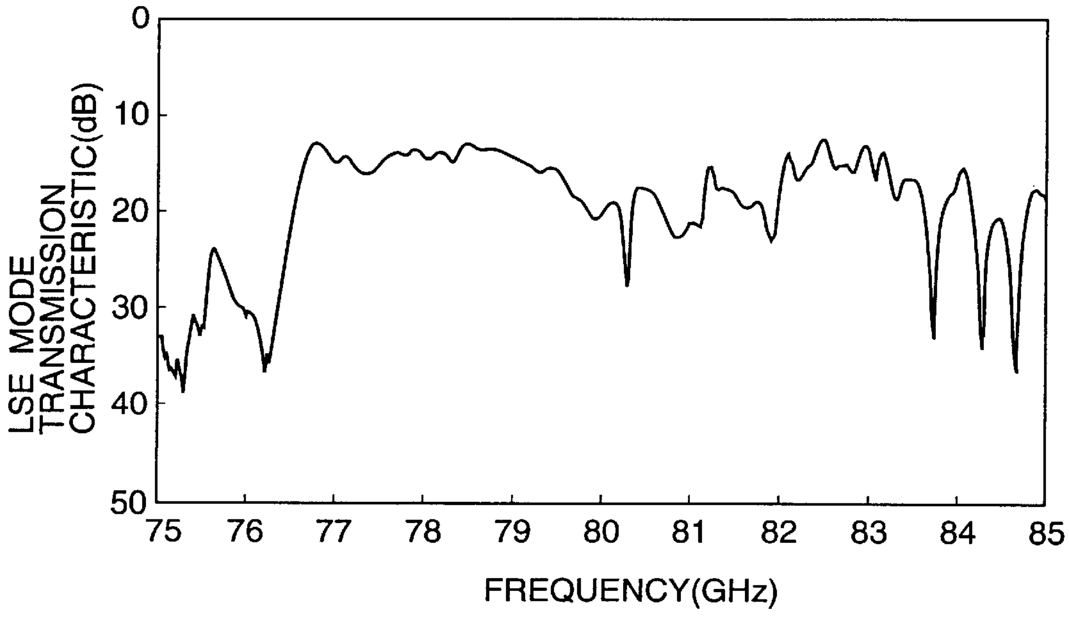
FIG. 14 a graph showing a measurement result of a transmission characteristic of the LSE mode for a conventional mode suppressor for comparison.

As is clear from FIG. 14, an attenuation characteristic of about 24 to 40 dB was obtained in a frequency range of about 75 to 76 GHz, an attenuation characteristic of about 13 to 28 dB was obtained in a frequency range of about 76 to 83 GHz, and an attenuation characteristic of about 15 to 36 dB was obtained in a frequency range of about 83 to 85 GHz. As a whole, the attenuation characteristic was at maximum about 40 dB and at minimum about 13 dB.

Example 7 had better attenuation characteristic than Comparative Example 5 over a wide range.

Since the parallel plate conductors are formed so that the arithmetic average roughness Ra of their inner surfaces satisfies 0.1 $\mu$m≦Ra≦50 $\mu$m as described above, the NRD guide S4 according to the fourth embodiment of the invention has an excellent durability and can effectively suppress the transmission loss of high-frequency signals because the dielectric strip is strongly secured to the inner surfaces of the parallel plate conductors.

Further, since the suppressor formed by a plurality of conductive layers provided at specified intervals substantially in a widthwise middle position of the dielectric strip in a plane perpendicular to the principle planes of the parallel plate conductors and parallel to the transmission direction of the high-frequency signal is formed at the end of the dielectric strip in the NRD guide S4, electromagnetic waves of unnecessary modes do not resonate. As a result, electromagnetic waves of the LSE mode which is an unnecessary mode can be effectively attenuated. Since the conductive layers are thinner as compared with conductive pins, reflection by the conductive layers of the LSM mode which is a transmission mode are unlikely to occur, with the result that the transmission loss thereof can be reduced.

Preferably, a dimension of each conductive layer in the transmission direction is half the wavelength of the TEM electromagnetic waves of the high-frequency signal and the thickness thereof is 0.1 mm or smaller. With such conductive layers, the electromagnetic waves of the LSE mode which is an unnecessary mode can be effectively attenuated, and the transmission loss by the conductive layers of the LSM mode can be significantly reduced.

Further, in the millimeter wave transmitting/receiving apparatus to which the NRD guide S4 is applied, the electromagnetic waves of the LSE mode which is an unnecessary mode can be effectively attenuated and the transmission loss of the electromagnetic waves of the LSM mode which is a transmission mode can be reduced by providing the suppressor similar to the above at the end of the dielectric strip. The millimeter wave signal to be transmitted is introduced to the mixer via the circulator to a smaller degree. As a result, if the millimeter wave transmitting/receiving apparatus is applied to a millimeter wave radar or the like, this can bring about better transmission characteristics of the millimeter wave signal, reduced noise of the received signal, and an extended detection distance.

In the millimeter wave transmitting/receiving apparatus to which the NRD guide S4 is applied and in which the transmitting antenna and the receiving antenna are independently provided, the electromagnetic waves of the LSE mode which is an unnecessary mode can be effectively attenuated and the transmission loss of the electromagnetic waves of the LSM mode which is a transmission mode can be reduced by providing the suppressor similar to the above at the end of the dielectric strip. Further, the millimeter wave signal received by the transmitting antenna is not introduced to the millimeter wave signal oscillator. Therefore, if the millimeter wave transmitting/receiving apparatus is applied to a millimeter wave radar module or the like, this can bring about better transmission characteristics of the millimeter wave signal, reduced oscillation noise, and an extended detection distance.

Figure 15:
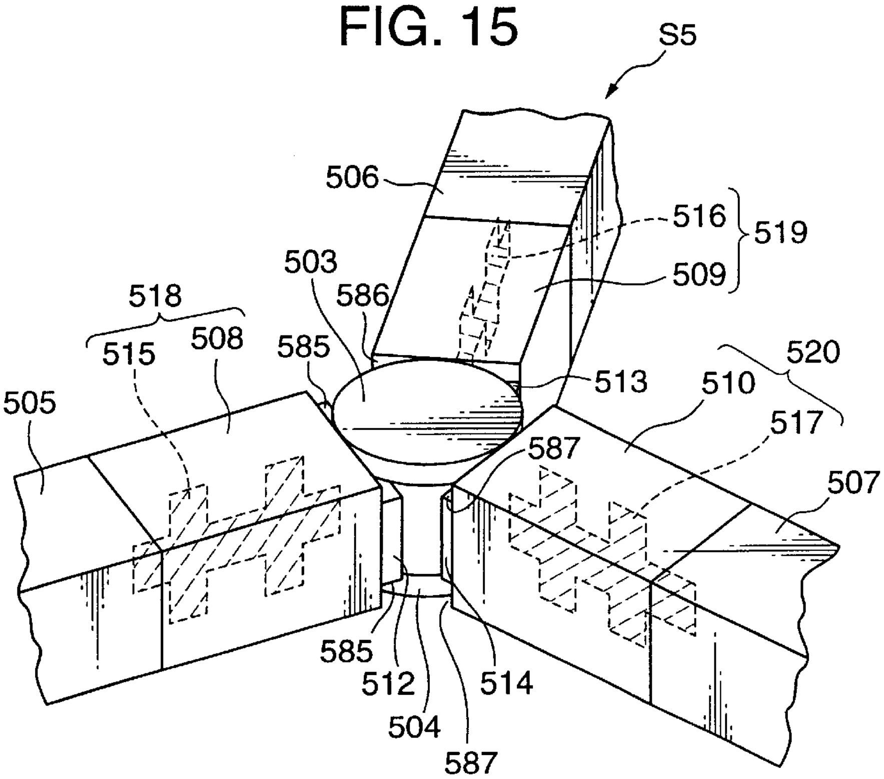
FIG. 15 is a perspective view showing an internal construction of an essential portion of a NRD guide according to a fifth embodiment of the invention.
Figure 16:
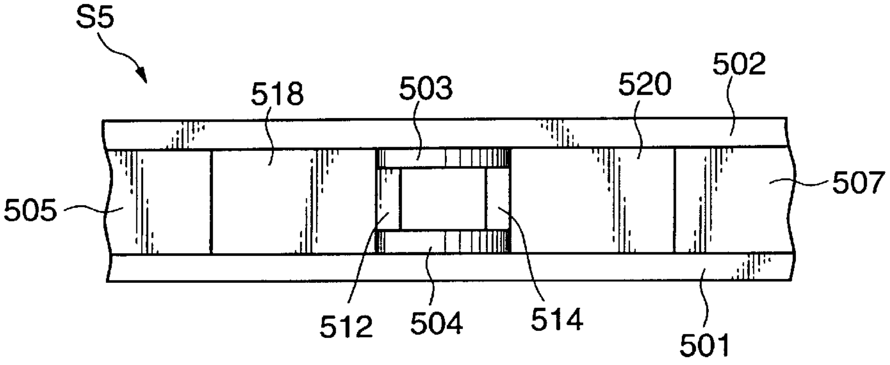
FIG. 16 is a side view showing an essential portion of the NRD guide shown in FIG. 15.

FIGS. 15 and 16 show an NRD guide according to a fifth embodiment of the invention. FIG. 15 is a perspective view showing an essential portion of the internal construction of the NRD guide and FIG. 16 is a side view thereof. An NRD guide S5 according to the fifth embodiment is mainly designed to solve the problems in the prior art.

In FIGS. 15 and 16, the NRD guide S5 is comprised of a pair of parallel plate conductors 501, 502 vertically opposed to each other at a spacing which is equal to or shorter than half the wavelength of a high-frequency signal to be transmitted, two ferrite disks 503, 504 which are ferromagnetic plates vertically opposed to each other to construct a circulator between the pair of parallel plate conductors 501, 502, three dielectric strips 505, 506, 507 which are waveguide strips radially arranged around the ferrite disks 503, 504 at intervals of 120° C., and three dielectric strips 508, 509, 510 which are suppressor strips for constructing suppressors to block electromagnetic waves of the LSE mode and arranged between the ferrite disks 503, 504 and the dielectric strips 505, 506, 507. It should be noted that the wavelength here is a wavelength in the air (free space) at an operating frequency.

The respective parallel plate conductors 501, 502 are formed of conductive plates made of, e.g., Cu, Al, Fe, Ag, Au, Pt, SUS (Stainless Steel), brass (Cu-Zn alloy) since they need to have a high electric conductivity and an excellent processability. Alternatively, they may be formed of insulating plates made of ceramics, resin or like material having a conductive layer made of the above metallic materials formed on its outer surface. Further, the surfaces (inner surfaces) of the parallel plate conductors 501, 502 facing the dielectric strips 505 to 507, 508 to 510 are ground so that an arithmetic average roughness Ra thereof satisfies 0.1 $\mu$m≦Ra≦50 $\mu$m.

This arithmetic average roughness Ra is the same as the one defined in the first embodiment, and the range thereof is set as above for the same reason mentioned in the first embodiment. The arithmetic average roughness Ra satisfies preferably 0.3 $\mu$m≦Ra≦25 $\mu$m, and more preferably 0.4 $\mu$m≦Ra≦10 $\mu$m.

The ferrite disks 503, 504 have an identical shape and are concentrically opposed to each other with their principle planes held in contact with the inner surfaces of the parallel plate conductors 501, 502. Depending on cases, they may be spaced apart from the inner surfaces of the parallel plate conductors 501, 502 by a specified distance. In this embodiment, the principle planes of the two ferrite disks 503, 504 are in flush with those of the suppressors 518 to 520, realizing a construction preferable in reducing a transmission loss of a high-frequency signal.

The thickness of the ferrite disks 503, 504 are preferably 0.15 to 0.30 mm if a ferrite having a relative dielectric constant of 13 is used in a band of 77 GHz used for an automotive millimeter wave radar. If the thickness is below 0.15 mm, it is difficult to handle the ferrite disks 503, 504 due to their reduced strength. If the thickness exceeds 0.30 mm, the diameter of the ferrite disks 503, 504 needs to be decreased in order to prevent a shift of a pass band. A decreased diameter leads to a deteriorated isolation of the circulator.

The diameter of the ferrite disks 503, 504 is preferably 1 to 3 mm. The isolation of the circulator is deteriorated if the diameter is below 1 mm, whereas the thickness of the ferrite disks 503, 504 needs to be below 0.15 mm in order to prevent a shift of a pass band, making it difficult to handle the ferrite disks 503, 504, if the diameter exceeds 3 mm.

Right polygonal ferrite plates may be used instead of the ferrite disks 503, 504. In this case, if the number of the dielectric strips to be connected is n (n is an integer of 2 or larger), the plan shape of the ferrite plates is a right polygon having m sides (m is an integer of 3 or larger, and m=n+1). The ferrite disks 503, 504 function as a circulator by providing a magnet, an electromagnet or the like for applying a d.c. (direct current) magnetic field of about 355500 A/m to the principle planes of the ferrite disks 503, 504 from the outside of the parallel plate conductors 501, 502.

The dielectric strips 505 to 507 as waveguide strips may be made of a resin dielectric material such as Teflon, polystyrene or glass epoxy or a cordierite ($2MgO.2Al_2O_3.5SiO_2$) ceramics, alumina ($Al_2O_3$) ceramics, glass ceramics or forsterite ($2MgO.SiO_2$) ceramics or like ceramics having a lower relative dielectric constant. This is because these materials can suppress a transmission loss in a high-frequency band. Particularly in view of a dielectric characteristic, processability, strength, miniaturization, reliability, etc., the dielectric strips 505 to 507 are desirably made of cordierite ceramics.

The dielectric strips 508 to 510 as suppressor strips forming suppressors are made of, for example, the same material as the dielectric strips 505 to 507 and are arranged continuously with one ends of the dielectric strips 505 to 507. Further, impedance matching members 512, 513, 514 are provided on the end faces of the dielectric strips 508 to 510. The dielectric strips 508 to 510 may be spaced apart from the one ends of the dielectric strips 505 to 507 by a specified distance. Strip conductors 515, 516, 517 made of copper foils or the like are formed inside, particularly at the centers of the dielectric strips 508 to 510.

These strip conductors 515, 516, 517 are arranged in a plane perpendicular to the principle planes of the parallel plate conductors 501, 502 and parallel to the transmission direction of the high-frequency signal, and adapted to block electromagnetic waves of the LSE mode whose electric field propagates in a direction (longitudinal direction in FIGS. 15, 16) perpendicular to the principle planes of the parallel plate conductors 501, 502. A λ/4 choke pattern is applied to the strip conductors 515, 516, 517 in order to remove the TEM mode. Suppressors for an NRD guide 518, 519, 520 are formed by the corresponding dielectric strips 508 to 510 and strip conductors 515, 516, 517.

In the NRD guide S5 thus constructed, an electromagnetic wave having transmitted along the dielectric strip 505 are transmitted to the dielectric strip 506 after its wavefront is rotated counterclockwise, but not transmitted to the dielectric strip 507. Likewise, an electromagnetic wave having transmitted along the dielectric strip 506 is transmitted to the dielectric strip 507. In this way, transmission paths of the electromagnetic waves are changed. It should be appreciated that the rotating direction of the wavefront of the high-frequency signal is reversed if S-pole and N-pole of the d.c. (direct current) magnetic field applied substantially perpendicularly to the principle planes of the ferrite disks 503, 504 are reversed.

Although three dielectric strips 505 to 507 are arranged such that the directions of transmission paths are spaced at even intervals of 120° in the NRD guide S5, two dielectric strips may be arranged while being spaced apart by 120°. In such a case, the high-frequency signal has its transmission path changed only in one direction. The above NRD guide S5 can convert the transmission path of the high-frequency signal in three directions: from the dielectric strip 505 to the dielectric strip 506, from the dielectric strip 506 to the dielectric strip 507 and from dielectric strip 507 to the dielectric strip 505. Alternatively, four dielectric strips may be arranged while being spaced apart at even intervals of 90° or six dielectric strips may be arranged while being spaced apart at even intervals of 60°.

Figure 22:
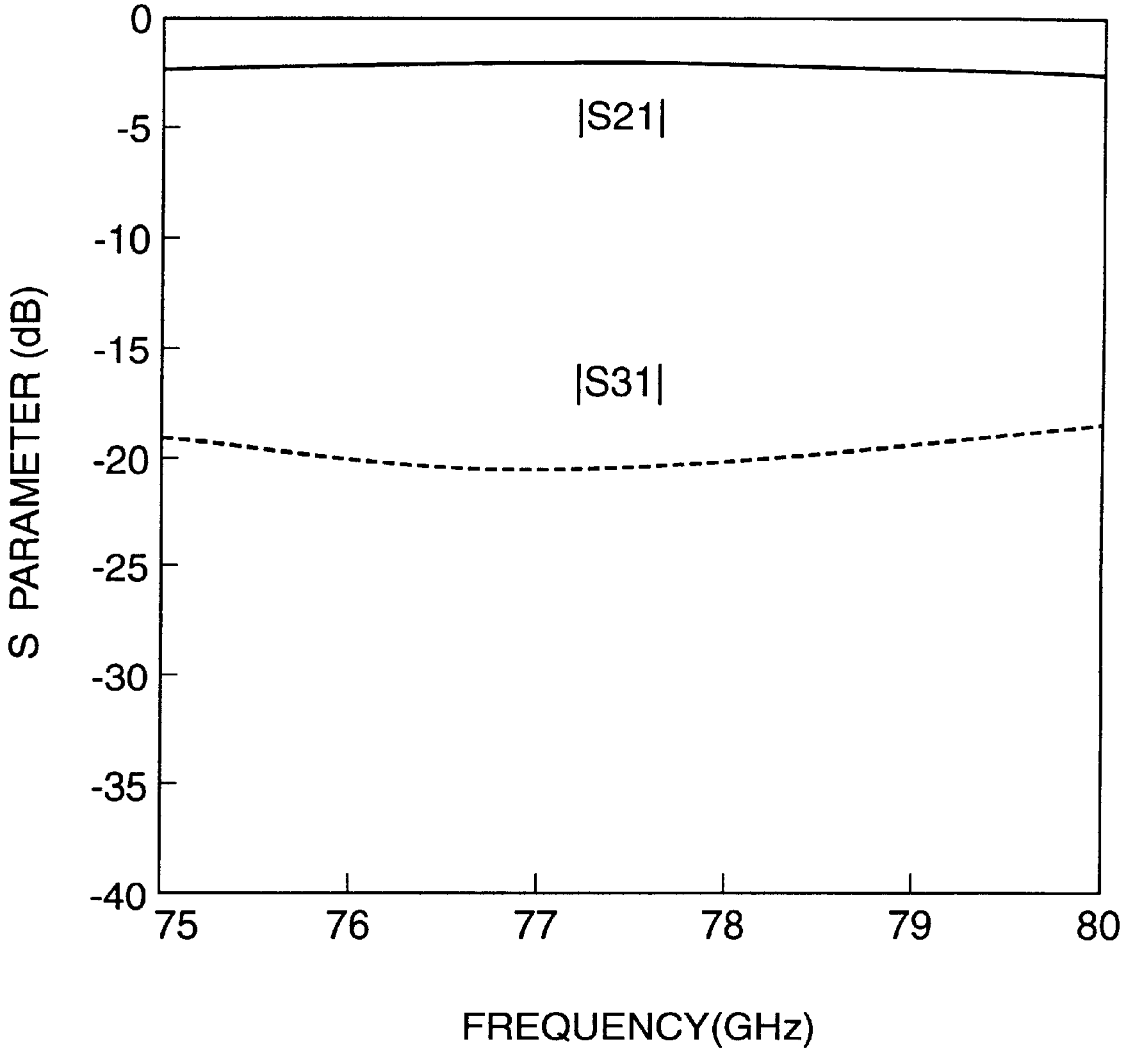
PRIOR ART FIG. 22
FIG. 22 is a graph showing measurement results of the transmission characteristic |S21| and the isolation |S31| of the high-frequency signal for a conventional NRD guide shown in FIG. 39.

The impedance matching members 512 to 514 have a relative dielectric constant different from that of the dielectric strips 505 to 510 and preferably satisfies $-10 \leqq \in r2 - \in r1 \leqq 20$ ($\in r2 \neq \in r1$) if ∈r1, ∈r2 denote the relative dielectric constant of the dielectric strips 505 to 510 and that of the impedance matching members 512 to 514, respectively. If $\in r2 - \in r1 \leqq -10$, it is difficult to handle the impedance matching members 512 to 514 because the width of the transmission paths thereof is reduced. Thus, positioning precision thereof is reduced and the transmission loss is likely to vary from product to product. If $20 < \in r2 - \in r1$, the dimension of the impedance matching members 512 to 514 in the transmission direction needs to be shortened for impedance matching, making it difficult to handle them and reducing their geometric precision. As a result, the transmission loss is likely to vary from product to product. If $\in r2 = \in r1$, it is difficult to match impedances since reflection of the high-frequency signal is large as shown in FIG. 22.

The thickness of the impedance matching members 512 to 514 in the transmission direction is preferably 0.05 to 0.5 mm. If the thickness is below 0.05 mm, it is difficult to handle them and their geometric precision is reduced, making the transmission loss likely to vary from product to product. If the thickness exceeds 0.5 mm, an isolation characteristic is deteriorated.

The impedance matching members 512 to 514 are preferably made of an aluminaceramics having a relatively high relative dielectric constant of about 9.7, a forsterite ($2MgO.SiO_2$) ceramics having a relative dielectric constant of 7, a spinel ($MgO.Al_2O_3$) ceramics having a relative dielectric constant of about 8, a mullite ($3Al_2O_3.2SiO_2$), a silicon nitride ($Si_3N_4$) ceramics, or like ceramics. This is because these materials have a small dielectric loss and an excellent strength.

The impedance matching members 512 to 514 define stepped portions 585 to 587 in positions corresponding to the upper and lower surfaces of the dielectric strips 508 to 510 (or suppressors 518 to 520). A spacing between the upper and lower stepped portions 585 to 587 is set substantially equal to a spacing between the two ferrite disks 503, 504. The impedance matching members 512 to 514 are connected with the two ferrite disks 503, 504 by arranging the ferrite disks 503, 504 to hold the impedance matching members 512 to 514 at the stepped portions 585 to 587. In this case, the two ferrite disks 503, 504 can be highly concentrically held by the impedance matching members 512, 514 and it is not necessary to provide a positioning member such as a dielectric spacer between them. However, the connecting construction of the ferrite disks 503, 504 and the impedance matching members 512 to 514 is not limited to the above. In FIGS. 15 and 16 the impedance matching members 512 to 514 are in the form of a flat plate, thereby defining two step portions 585 (586, 587) for each of the dielectric strips 508 to 510. However, it may be appreciated to provide an impedance matching member in the form of a plate having two step portions at upper and lower sides or at right and left sides, thereby defining four step portions for each of the dielectric strips 508 to 510, specifically two step portions between the end face of the dielectric strip 508 (509, 510) and the impedance matching member, and another step portions which are formed in the impedance matching member.

The high-frequency band in the present invention corresponds to a microwave band and a millimeter wave band ranging from in the order of 10 GHz to in the order to 100 GHz, and the NRD guide S5 according to the fifth embodiment is suitably used in a high-frequency band, for example, above 30 GHz, particularly above 50 GHz, and further above 70 GHz.

The NRD guide S5 according to the fifth embodiment is used in a wireless LAN or a millimeter wave radar installed in an automotive vehicle with a high-frequency diode such as a Gunn diode incorporated thereinto as a high frequency generating device. In such a millimeter wave radar, a millimeter wave is projected to an obstacle and other automotive vehicles present around an automotive vehicle in which this radar is installed, the reflected wave is combined with the original millimeter wave to obtain a beat signal (intermediate-frequency signal), and distances to the obstacle and other automotive vehicles and their moving speeds are measured by analyzing this beat signal.

Since the electromagnetic waves are converged and, thus, difficult to diffuse or radiate by arranging the impedance matching members 512 to 514 at the end faces of the suppressors 518 to 520 in the NRD guide S5 according to the fifth embodiment, an insertion loss and an isolation characteristic of a high-frequency signal are further improved in a high-frequency band, and a band range is significantly extended.

In the case that the dielectric strips 505 to 507 of the NRD guide S5 are made of, e.g., ceramics, each of them may be comprised of a plurality of strip sections as in the first embodiment shown in FIG. 1 and the end faces of the respective strip sections may be opposed to each other at a spacing equal to or shorter than $\lambda/8$ ($\lambda$ is a wavelength of a high-frequency signal to be transmitted). This can reduce conversion of electromagnetic waves of the LSM mode into those of the LSE mode and enables an easy fabrication of a dielectric strip having even a complicated shape formed by linear and curved portions. In other words, if the dielectric strips 505 to 507 are each formed by a plurality of strip sections, the bend loss can be reduced even if the dielectric strips 505 to 507 include curved portions.

Figure 18A:
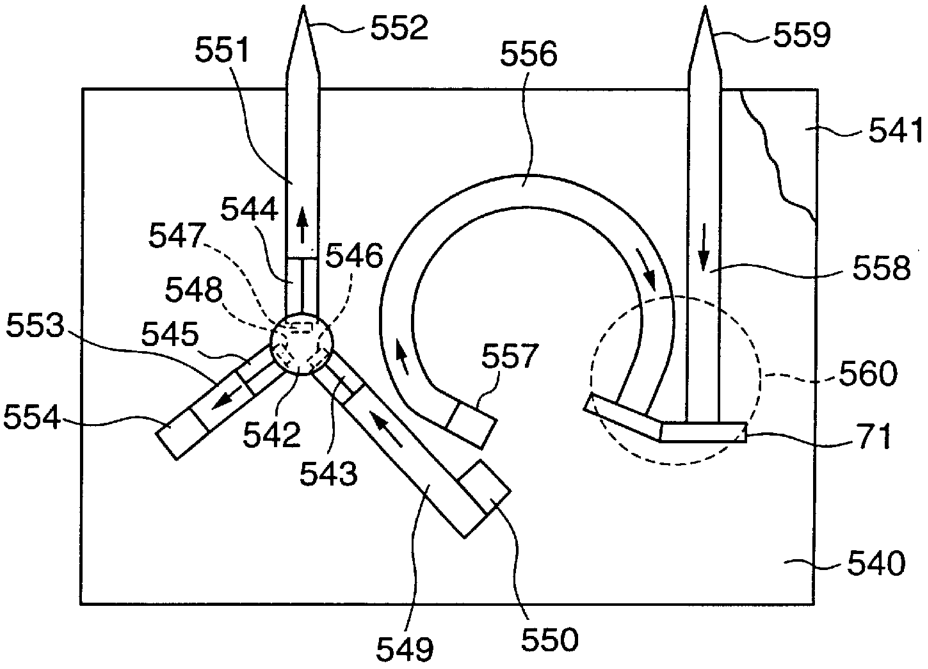
FIG. 18A is a plan view of a millimeter wave radar module in which the NRD guide shown in FIGS. 15 and 16 is used.
Figure 19:
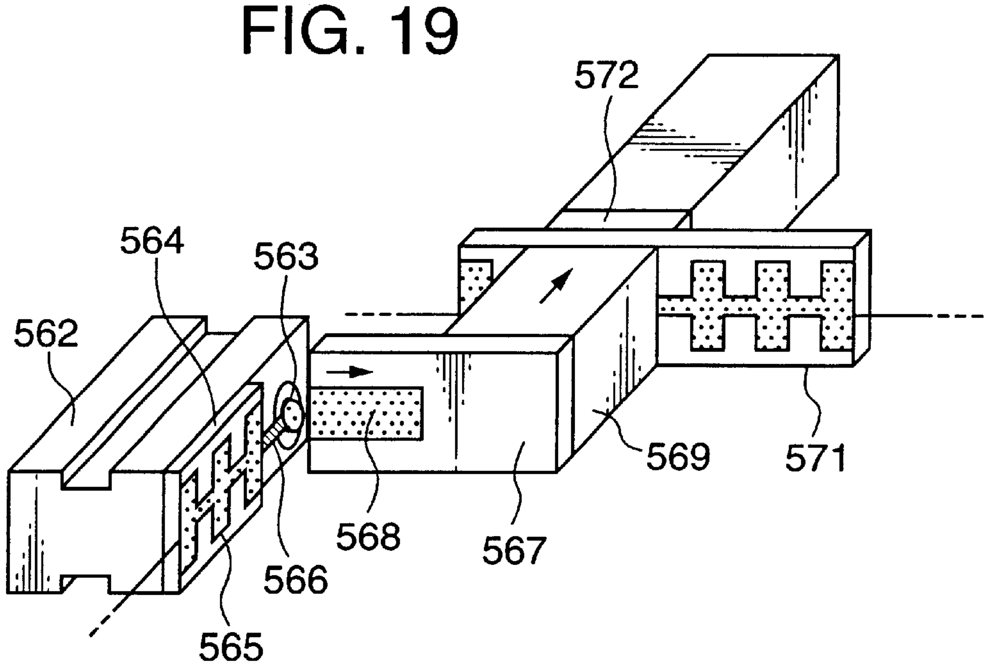
FIG. 19 is a perspective view showing a millimeter wave signal oscillator of voltage control type used in the millimeter wave radar modules shown in FIG. 17A or 18.
Figure 20:
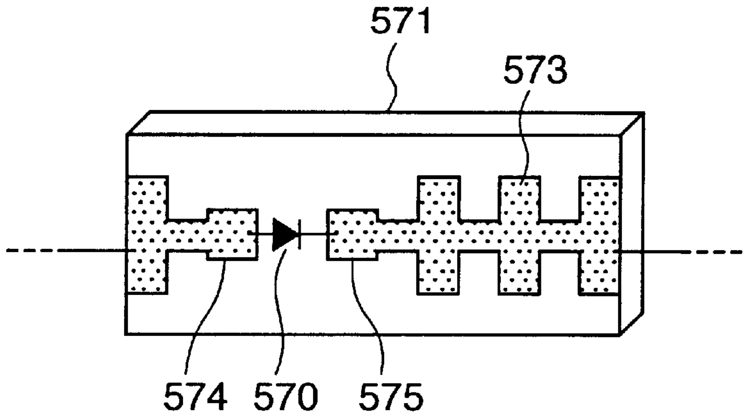
FIG. 20 is a perspective view of a circuit board on which a varactor diode is provided for the millimeter wave signal oscillator shown in FIG. 19.

Next, a millimeter wave radar module as a millimeter wave transmitting/receiving apparatus to which the NRD guide S5 is applied is described. FIGS. 17 to 20 show millimeter wave radar modules according to the embodiment of the invention, wherein FIG. 17A is a plan view of a millimeter wave radar module having an integrated transmitting/receiving antenna, FIG. 18A is a plan view of a millimeter wave radar module having independent transmitting antenna and receiving antenna, FIG. 19 is a perspective view showing a millimeter wave signal oscillator, and FIG. 20 is a perspective view of a circuit board on which a variable-capacitance diode (varactor diode) for the millimeter wave signal oscillator is provided.

Figure 17A:
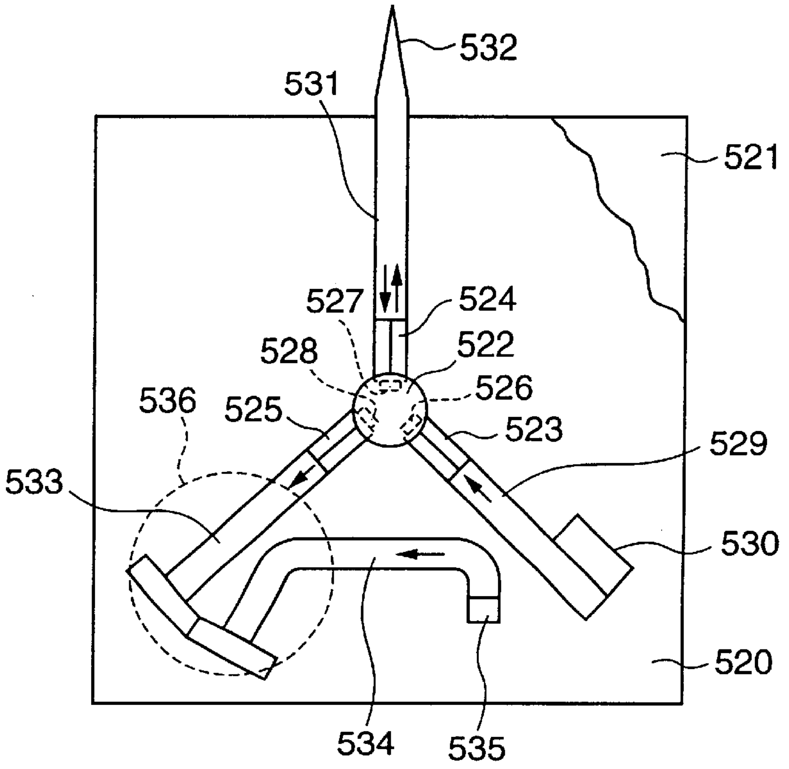
FIG. 17A is a plan view of a millimeter wave radar module in which the NRD guide shown in FIGS. 15 and 16 is used.

Identified by 520, 521 in FIG. 17A are a pair of vertically arranged parallel plate conductors which are constructed similar to the parallel plate conductors 501, 502 shown in FIG. 16. Various devices to be described later are inserted between the pair of parallel plate conductors 520, 521. It should be noted that the upper parallel plate conductor 521 is partly cut away in order to make an entire construction visible.

Identified by 522 is a circulator made of two ferrite disks which are ferromagnetic plates vertically opposed to each other and having first, second and third connecting portions (none of them is shown) each having one end thereof connected with a corresponding one of first, second and third suppressors 523, 525 formed similar to the suppressors 518 to 520 shown in FIG. 15. In other words, the first suppressor 523 is connected with the first connecting portion of the circulator 522, the second suppressor 524 is connected with the second connecting portion thereof and the third suppressor 525 is connected with the third connecting portion thereof.

An impedance matching member 526 is provided at a side of the first suppressor 523 toward the circulator 522; an impedance matching member 527 is provided at a side of the second suppressor 524 toward the circulator 522; and an impedance matching member 528 is provided at a side of the third suppressor 525 toward the circulator 522. The impedance matching members 526 to 528 are formed similar to the impedance matching members 512 to 514 shown in FIG. 15.

Identified by 529 is a first dielectric strip having one end thereof connected with the other end of the first suppressor 523. The first dielectric strip 529 is, adapted to transmit a millimeter wave signal and is formed similar to the dielectric strips 505 to 507 shown in FIG. 15. Identified by 530 is a millimeter wave oscillator which is provided at the other end of the first dielectric strip 529. The millimeter wave signal oscillator 530 outputs a frequency-modulated millimeter wave signal to be transmitted by cyclically controlling the bias voltage of a variable-capacitance diode disposed in vicinity of a high-frequency diode (high-frequency generating device) to have a triangular wave, a sine wave or other wave such that a bias voltage applying direction coincides with a direction of an electric field of a high-frequency signal.

Identified by 531 is a second dielectric strip having one end thereof connected with the other end of the second suppressor 524. The second dielectric strip 531 is adapted to transmit a millimeter wave signal and is formed similar to the dielectric strips 505 to 507 shown in FIG. 15. The leading end of the second dielectric strip 531 is tapered to form a transmitting/receiving antenna 532.

Identified by 533 is a third dielectric strip having one end thereof connected with the other end of the third suppressor 525. The third dielectric strip 533 is formed similar to the dielectric strips 505 to 507 shown in FIG. 15. The third dielectric strip 533 transmits a radio wave received by the transmitting/receiving antenna 532 and outputted from the third connecting portion of the circulator 522 via the second dielectric strip 531 to a mixer 536 to be described later.

Identified by 534 is a fourth dielectric strip for transmitting part of the millimeter wave signal to the mixer 536 by being coupled to the first dielectric strip 529 in such a manner that one end thereof is arranged in vicinity of the first dielectric strip 529 for electromagnetic coupling or one end thereof is joined with the first dielectric strip 529. Identified by 535 is a nonreflective termination (terminator) provided at one end of the fourth dielectric strip 534 opposite from the mixer 536. The mixer 536 mixes part of the millimeter wave signal with the received wave to generate an intermediate-frequency signal by electromagnetically coupling or joining an intermediate position of the third dielectric strip 533 and that of the fourth dielectric strip 534.

Figure 17B:
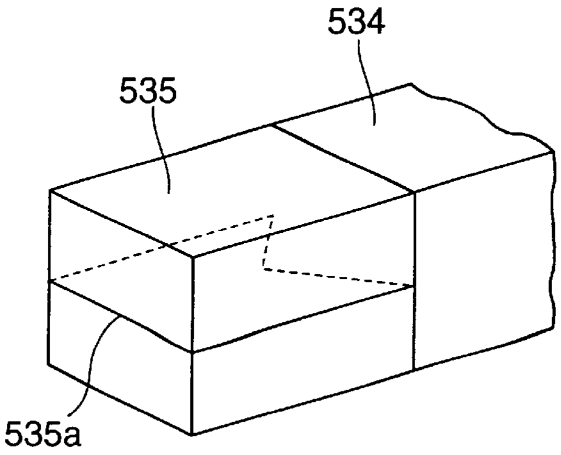
FIG. 17B is a perspective view of a nonreflective termination in the millimeter wave radar module shown in FIG. 17A.

The nonreflective termination 535 is provided with a resistance film 535*a* therein, as shown in FIG. 17B. The resistance film 535*a* is formed along a plane separating the nonreflective termination 535 into an upper half and a lower half and parallel with the pair of parallel plate conductors 520, 521. Further, the resistance film 535*a* may be formed on side surfaces or end surface of the nonreflective termination 535. The resistance film 535*a* is made of an NiCr alloy or resin containing conductive particles such as carbon particles. The nonreflective termination 535 provided with the resistance film 535*a* may be integrally formed with the fourth dielectric strip 534 by simultaneous sintering.

As is clear from the above description, the NRD guide S5 is substantially constructed by arranging the circulator 522, the first to third suppressors 523, 524, 525, and the first to third dielectric strips 529, 531, 533 between the pair of parallel plate conductors 520, 521.

In the construction of FIG. 17A, a frequency control can be executed by providing a switch constructed similar to the one shown in FIG. 20 in an intermediate position of the first dielectric strip 529. A switch shown in FIG. 20 is constructed such that a second choke-type bias supply strip 573 is formed on one principle plane of a circuit board 571 and a PIN diode or Schottky barrier diode of beam lead type is mounted in an intermediate position of the strip 573 by soldering.

Another embodiment of the millimeter wave radar module as an inventive millimeter wave transmitting/receiving apparatus to which the NRD guide S5 is applied is of the type shown in FIG. 18A having independent transmitting antenna and receiving antenna. Identified by 540, 541 in FIG. 18A are a pair of vertically arranged parallel plate conductors which are constructed similar to the parallel plate conductors 501, 502 shown in FIG. 16. It should be noted that the upper parallel plate conductor 541 is partly cut away in order to make an entire construction visible.

Identified by 542 is a circulator made of two ferrite disks which are ferromagnetic plates vertically opposed to each other and having first, second and third connecting portions (none of them is shown) each having one end thereof connected with a corresponding one of first, second and third suppressors 543, 545 formed similar to the suppressors 518 to 520 shown in FIG. 15. In other words, the first suppressor 543 is connected with the first connecting portion of the circulator 542, the second suppressor 544 is connected with the second connecting portion thereof and the third suppressor 545 is connected with the third connecting portion thereof.

An impedance matching member 546 is provided at a side of the first suppressor 543 toward the circulator 542; an impedance matching member 547 is provided at a side of the second suppressor 544 toward the circulator 542; and an impedance matching member 548 is provided at a side of the third suppressor 545 toward the circulator 542. The impedance matching members 546 to 548 are formed similar to the impedance matching members 512 to 514 shown in FIG. 15.

Identified by 549 is a first dielectric strip having one end thereof connected with the other end of the first suppressor 543. The first dielectric strip 549 is adapted to transmit a millimeter wave signal and is formed similar to the dielectric strips 505 to 507 shown in FIG. 15. Identified by 550 is a millimeter wave oscillator which is provided at the other end of the first dielectric strip 549. The millimeter wave signal oscillator 550 outputs a frequency-modulated millimeter wave signal to be transmitted by cyclically controlling a bias voltage of a variable-capacitance diode disposed in vicinity of a high-frequency diode (high-frequency generating device) to have a triangular wave, a sine wave or other wave such that a bias voltage applying direction coincides with a direction of an electric field of a high-frequency signal.

Identified by 551 is a second dielectric strip having one end thereof connected with the other end of the second suppressor 544. The second dielectric strip 551 is adapted to transmit a millimeter wave signal and is formed similar to the dielectric strips 505 to 507 shown in FIG. 15. The leading end of the second dielectric strip 551 is tapered to form a transmitting antenna 552.

Identified by 553 is a third dielectric strip having one end thereof connected with the other end of the third suppressor 545. The third dielectric strip 553 is adapted to transmit a millimeter wave signal and is formed similar to the dielectric strips 505 to 507 shown in FIG. 15. At the leading end of the third dielectric strip 553 is provided a nonreflective termination 554 for attenuating a millimeter wave signal to be transmitted.

As is clear from the above description, the NRD guide S5 is substantially constructed by arranging the circulator 542, the first to third suppressors 543, 544, 545, and the first to third dielectric strips 549, 551, 553 between the pair of parallel plate conductors 540, 541.

Identified by 556 is a fourth dielectric strip for transmitting part of the millimeter wave signal to a mixer 560 to be described later by being coupled to the first dielectric strip 549 in such a manner that one end thereof is arranged in vicinity of the first dielectric strip 549 for electromagnetic coupling or one end thereof is joined with the first dielectric strip 549. Identified by 557 is a nonreflective termination provided at one end of the fourth dielectric strip 556 opposite from the mixer 560. Identified by 558 is a fifth dielectric strip formed at its leading end with a receiving antenna 559 by, e.g., tapering. The fifth dielectric strip 558 transmits a radio wave received by the receiving antenna 559 to the mixer 560. The mixer 560 mixes part of the millimeter wave signal with the received wave to generate an intermediate-frequency signal by electromagnetically coupling or joining an intermediate position of the fourth dielectric strip 556 and that of the fifth dielectric strip 558.

Figure 18B:
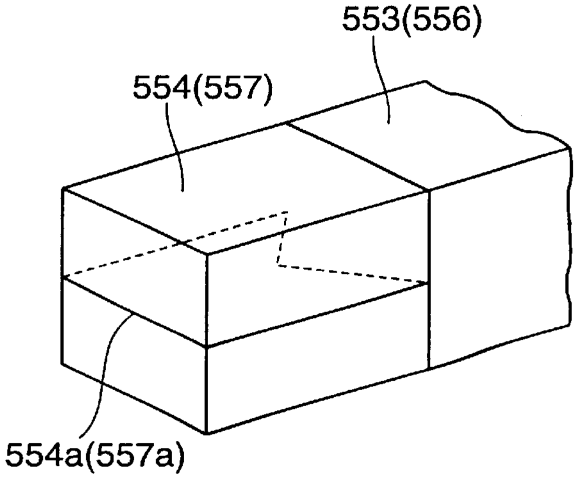
FIG. 18B is a perspective view of a nonreflective termination in the millimeter wave radar module shown in FIG. 18A.

The nonreflective termination 554 (557) is provided with a resistance film 554*a* (557*a*) therein, as shown in FIG. 18B. The resistance film 554*a* (557*a*) is formed along a plane separating the nonreflective termination 554 (557) into an upper half and a lower half and parallel with the pair of parallel plate conductors 540, 541. Further, the resistance film 554*a* (557*a*) may be formed on side surfaces or end surface of the nonreflective termination 554 (557). The resistance film 554*a* (557*a*) is made of an NiCr alloy or resin containing conductive particles such as carbon particles. The nonreflective termination 554 (557) provided with the resistance film 554*a* (557*a*) may be integrally formed with the third dielectric strip 553 (556) by simultaneous sintering.

In the construction of FIG. 18A, a frequency control can be executed by providing a switch constructed similar to the one shown in FIG. 20 in an intermediate position of the first dielectric strip 549. The switch shown in FIG. 20 is constructed such that the second choke-type bias supply strip 573 is formed on one principle plane of the circuit board 571 and a PIN diode or Schottky barrier diode of beam lead type is mounted in an intermediate position of the strip 573 by soldering.

The construction of the millimeter wave signal oscillators 530, 550 used in the millimeter wave radar module shown in FIGS. 17 and 18 are shown in FIGS. 19 and 20. Identified by 562 in FIGS. 19 and 20 is a metallic member such as a metallic block for mounting a Gunn diode 563. The Gunn diode 563 is one type of the high-frequency diodes for oscillating a millimeter wave signal and is mounted on one side surface of the metallic member 562. Identified by 564 is a circuit board on which the choke-type bias supply strip 565, which functions as a low-pass filter, is formed to supply a bias voltage to the Gunn diode 563 and prevent leak of a high-frequency signal. Identified by 566 is a strip conductor such as a metallic foil ribbon for connecting the choke-type bias supply strip 565 and an upper conductor of the Gunn diode 563.

Identified by 567 is a metal strip resonator formed by providing a metal strip 568 for resonance on a dielectric substrate, and by 569 a dielectric waveguide for leading the high-frequency signal resonated by the metal strip 567 to the outside of the millimeter wave signal oscillator. A circuit board 571 carrying a varactor diode 570 which is used for frequency modulation and is one type of the variable-capacitance diodes is provided in an intermediate position of the dielectric waveguide 569. A bias voltage applying direction of the varactor diode 570 is a direction (direction of electric field) perpendicular to the transmission direction of the high-frequency signal and parallel to the principle planes of the parallel plate conductors 520, 521, 540, 541. Further, the bias voltage applying direction of the varactor diode 570 coincides with a direction of an electric field of a high-frequency signal of the $LSM_{01}$ mode transmitting in the dielectric waveguide 569, so that the bias voltage is controlled to change an electrostatic capacitance of the varactor diode 570 by electromagnetically coupling the high-frequency signal and the varactor diode 570, thereby controlling the frequency of the high-frequency signal. Identified by 572 is a dielectric plate having a high relative dielectric constant used for the impedance matching between the varactor diode 570 and the dielectric waveguide 569.

As shown in FIG. 20, a second choke-type bias supply strip 573 having the varactor diode 570 of beam lead type mounted in its intermediate position is formed on one principle plane of the circuit board 571. Further, connection electrodes 574, 575 are formed at portions of the second chock-type bias supply strip 573 connected with the varactor diode 570.

In this construction, the high-frequency signal oscillated by the Gunn diode 563 is led to the dielectric waveguide 569 via the metal strip resonator 567. Subsequently, part of the high-frequency signal is reflected by the varactor diode 570 to return to the Gunn diode 563. This reflection signal changes as the electrostatic capacitance of the varactor diode 570 changes, thereby changing an oscillating frequency.

The millimeter wave radar modules shown in FIGS. 17 and 18 adopt the FMCW (frequency modulation continuous waves) system, whose operation principle is as follows. An input signal representing a change of voltage amplitude with time in the form of a triangular wave, sine wave or other wave is inputted to a MODIN terminal for modulated signal input of the millimeter wave signal oscillator, and an output signal thereof is frequency-modulated so that deviation of an output frequency of the millimeter wave signal oscillator is represented by a triangular wave, sine wave or other wave. In the case that the output signal (transmitted wave) is radiated via the transmitting/receiving antenna 532 or the transmitting antenna 552, a reflected wave (received wave) returns with a time lag resulting from a time required for the radio to propagate back and forth if a target is present in front of the transmitting/receiving antenna 532 or the transmitting antenna 552. At this time, a frequency difference between the transmitted wave and the received wave is outputted to an IFOUT terminal at the output side of the mixer 536 or 560.

A distance to the target can be calculated in accordance with following equation by analyzing a frequency component of the output frequency of the IFOUT terminal or the like:

$$Fif=4R\cdot fm\cdot \Delta f/c$$

(Fif: IF output frequency, R: distance, fm: modulating frequency, Δf: frequency deviation range, c: velocity of light).

In the millimeter wave signal oscillators 530, 550 of the millimeter wave radar modules according to the embodiment of the invention, the choke-type bias supply strip 565 and the strip conductor 566 are made of, e.g., Cu, Al, Au, Ag, W, Ti, Ni, Cr, Pd, Pt. Particularly, Cu, Ag are preferable because of a satisfactory electric conductivity, a small transmission loss and a large oscillation output.

The strip conductor 566 is electromagnetically coupled to the metallic member 562 at a specified spacing from the outer surface of the metallic member 562 and bridges the choke-type bias supply strip 565 and the Gunn diode 563. More specifically, one end of the strip conductor 566 is connected with one end of the choke-type bias supply strip 565 by, e.g., soldering, the other end thereof is connected with an upper conductor of the Gunn diode 563 by, e.g., soldering, and an intermediate portion thereof extends in the air.

The metallic member 562 is sufficient to be a metallic conductor since it also acts as an electric ground for the Gunn diode 563, and the material therefor is not particularly restricted provided that it is a metallic (including alloys) conductor. The metallic member 562 may be made of, e.g., brass (Cu-Zn alloy), Al, Cu, SUS (stainless steel), Ag, Au, Pt. Alternatively, the metallic member 562 may be a metallic block entirely made of a metal, ceramics or plastic block having its outer surfaces entirely or partly coated with metal plating, or an insulating substrate having its outer surfaces entirely or partly coated with a conductive resin material.

The millimeter wave radar module as a millimeter wave transmitting/receiving apparatus according to the embodiment of the invention has further improved transmission loss and isolation characteristic of a millimeter wave signal in a high-frequency band having a wider range. As a result, in the case that this millimeter wave transmitting/receiving apparatus is applied to a millimeter wave radar, a detection distance can be increased (type of FIG. 17A). Further, the transmission loss and isolation characteristic of a high-frequency signal are further improved in a high-frequency band having a wider range, and the millimeter wave signal to be transmitted is not introduced to the mixer via the circulator. As a result, noise of the received signal is reduced and a detection distance is increased. Thus, the detection distance of the millimeter wave radar can be further increased (type of FIG. 18A).

Examples of the inventive NRD guide S5 provided with the circulator are described below.

EXAMPLE 8

The NRD guide S5 provided with the circulator shown in FIGS. 15 and 16 was constructed as follows. Two aluminum plates having a thickness of 6 mm as parallel plate conductors were arranged at a spacing of 1.8 mm, and three dielectric strips 505 to 507 having a rectangular cross section of 1.8 mm (height)×0.8 mm (width) and made of cordierite ceramics having a relative dielectric constant of 4.8 were radially arranged at even intervals of 120° such that the suppressors 518 to 520 at the leading ends of the dielectric strips 505 to 507 were connected with two ferrite disks 503, 504. It should be noted that the suppressors 518 to 520 were formed by providing the strip conductors 515 to 517 made of a copper foil and having a λ/4 choke pattern inside the suppressors 518 to 520.

At this time, the dielectric strips 505 to 507 were arranged such that upper and lower surfaces of the suppressors 518 to 520 were in flush with the principle planes of the two ferrite disks 503, 504. More specifically, the two ferrite disks 503, 504 were arranged to face the inner surfaces of the respective parallel plate conductors; the stepped portions 585 to 587 were so formed at the upper and lower ends of the impedance matching members 512 to 514 as to correspond to the upper and lower surfaces of the suppressors 518 to 520 (stepped portions 585 to 587 have a height corresponding to the thickness of the ferrite disks 503, 504); the impedance matching members 512 to 514 were held between the two ferrite disks 503, 504 by engaging the two ferrite disks 503, 504 with the stepped portions 585 to 587. Further, the upper and lower principle planes of the ferrite disks 503, 504 and those of the dielectric strips 505 to 507 were held in contact with the inner surfaces of the parallel plate conductors.

The ferrite disks 503, 504 had a diameter of 2.0 mm and a thickness of 0.25 mm, and magnets were provided above and below the ferrite disks 503, 504 for applying a d.c. (direct current) magnetic field of about 355500 A/m. Specifically, a round recess having a diameter of 12.5 mm and a depth of 5 mm was formed in a position of each parallel plate conductor corresponding to the ferrite disk 503, 504 outside concentrically with the ferrite disk 503, 504, and a magnet having a diameter of 12.5 mm and a thickness of 5 mm was placed in each recess. Further, the impedance matching members 512 to 514 were made of an aluminaceramics having a relative dielectric constant of 9.7, a cross section thereof along a plane perpendicular to a transmission direction had a height of 1.3 mm and a width of 0.8 mm, and a dimension (thickness) thereof in the transmission direction was 0.1 mm. Therefore, the height of the stepped portions 585 to 587 was 0.25 mm.

Figure 21:
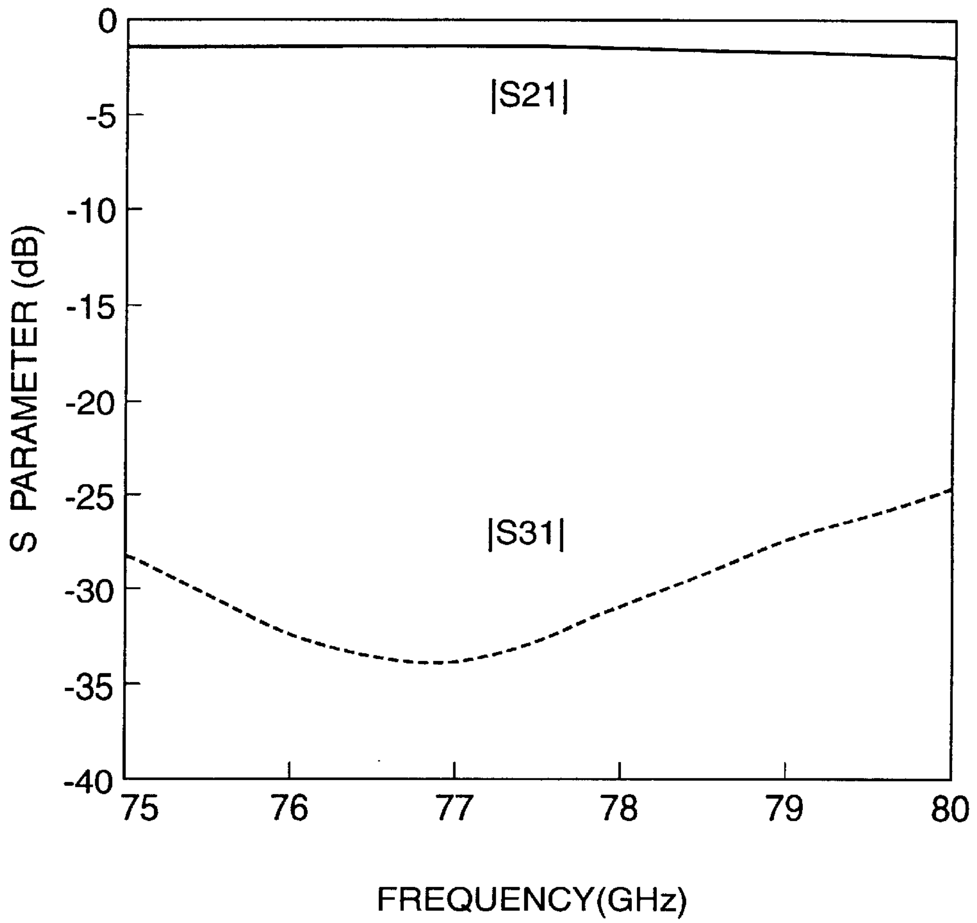
FIG. 21 is a graph showing measurement results of a transmission characteristic |S21| and an isolation |S31| of a high-frequency signal for the NRD guide shown in FIGS. 15 and 16.
Figure 39:
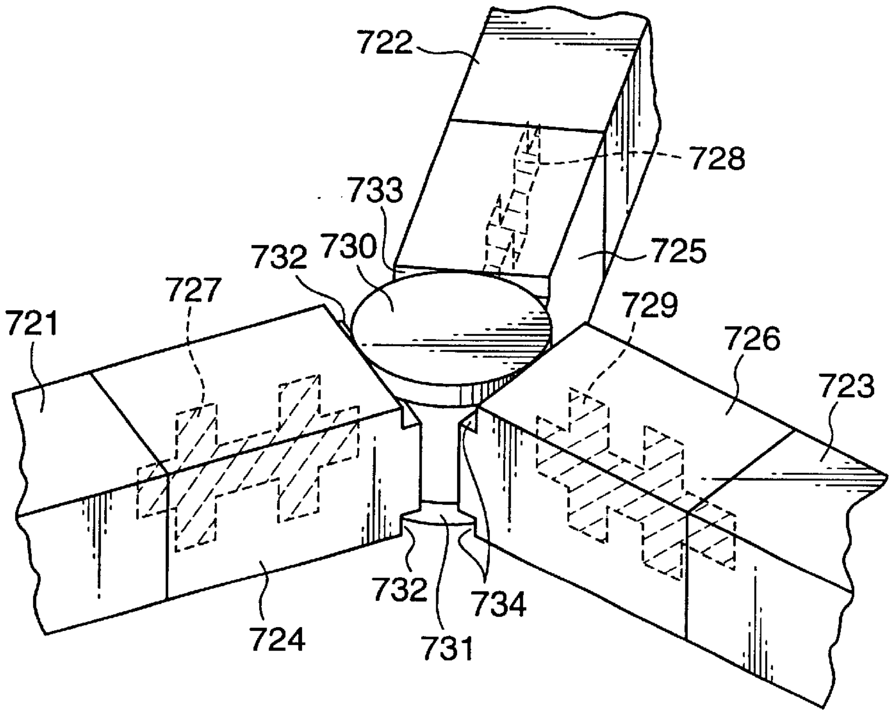
PRIOR ART FIG. 39
FIG. 39 is a perspective view showing an essential portion of a further conventional NRD guide.
Figure 40:
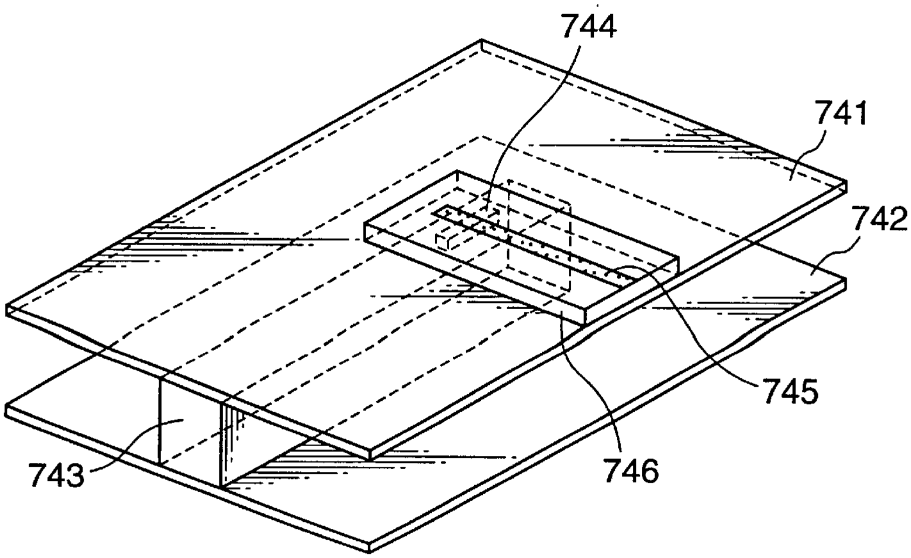
PRIOR ART FIG. 40
FIG. 40 is a perspective view showing a still further conventional NRD guide.

A transmission characteristic |S21| and an isolation characteristic |S31| of a high-frequency signal in the NRD guide S5 thus constructed were measured in a high-frequency band of 75 to 80 GHz using a spectrum analyzer. The measurement result is shown in FIG. 21. Further, a conventional NRD guide shown in FIG. 39 was fabricated as in Example 7 except that the stepped portions 732 to 734 were formed by cutting off the upper and lower ends of the leading end of the suppressors 724 to 726, and a transmission characteristic |S21| and an isolation characteristic |S31| thereof were similarly measured. The measurement result is shown in FIG. 22.

As is clear from FIGS. 21 and 22, the transmission characteristic |S21| in FIG. 21 shows a small loss of about −1 to −1.5 dB over the entire band and the isolation characteristic |S31| in FIG. 21 is satisfactory over a wide range while being at highest about −35 dB and at lowest about −25 dB in the NRD guide S5. On the other hand, the transmission characteristic |S21| in FIG. 22 is about −2 to −2.5 dB over the entire band and the isolation characteristic |S31| in FIG. 22 is at highest about −20 dB and at lowest about −19 dB: i.e., both characteristics were poor in the comparative example shown in FIG. 22.

Since the parallel plate conductors are formed so that the arithmetic average roughness Ra of their inner surfaces satisfies $0.1\ \mu m \leqq Ra \leqq 50\ \mu m$ as described above, the NRD guide S5 according to the fifth embodiment of the invention has an excellent durability and can effectively suppress the transmission loss of high-frequency signals because the dielectric strip is strongly secured to the inner surfaces of the parallel plate conductors.

Further, in the NRD guide S5, the two ferrite plates are opposed to inner surfaces of the parallel plate conductors, and a plurality of dielectric strips for transmitting a high-frequency signal which are substantially radially arranged around the two ferrite plates are connected with the suppressors provided at the leading ends of the respective dielectric strips for blocking electromagnetic waves of the LSE mode via the impedance matching members having a relative dielectric constant different from that of the dielectric strips and provided at the leading ends of the suppressors. Accordingly, the electromagnetic waves are converged by the impedance matching members having a relative dielectric constant larger than that of the dielectric strip and become difficult to reflect. Thus, the insertion loss and isolation loss of the high-frequency signal in a high-frequency band having a wider range can be further improved. Further, since it is not necessary to control the width of the dielectric waveguide in order to reduce a transmission loss, and the transmission characteristic can be improved by the impedance matching members, the NRD guide S5 can be easily fabricated with an excellent operability and suitable for mass production.

Preferably, the stepped portions having a height substantially equal to the thickness of the two ferrite plates are formed at the upper and lower ends of the impedance matching members, and the two ferrite plates are connected with the impedance matching members at the stepped portions while holding the impedance matching members therebetween. Then, it is not necessary to provide a dielectric spacer or the like for holding the ferrite plates, the suppressors and the ferrite plates can be positioned with an improved precision. Thus, the circulator can be assembled with an improved repeatability, making it difficult for the two ferrite plates to become eccentric with respect to each other. As a result, a stable circulator characteristic can be repeatedly obtained. Further, the NRD guide S5 can be easily fabricated and suitable for mass production.

The millimeter wave radar module as an inventive millimeter wave transmitting/receiving apparatus can have improved transmission loss and isolation characteristic of a high-frequency signal in a high-frequency band having a wider range by applying the construction of the NRD guide S5 thereto, with the result that a detection distance can be increased in the case of application to a millimeter wave radar or the like. Further, the millimeter wave radar module having independent transmitting and receiving antennas as an inventive millimeter wave transmitting/receiving apparatus can have improved transmission loss and isolation characteristic of a high-frequency signal in a high-frequency band having a wider range and eliminate a possibility of introducing the millimeter wave signal to be transmitted into the mixer via the circulator by applying the construction of the NRD guide S5 thereto. Accordingly, in the case of application to a millimeter wave radar, noise of the received signal is reduced and a detection distance is increased. This results in an excellent transmission characteristic of a millimeter wave signal, which further increases a detection distance.

Figure 23:
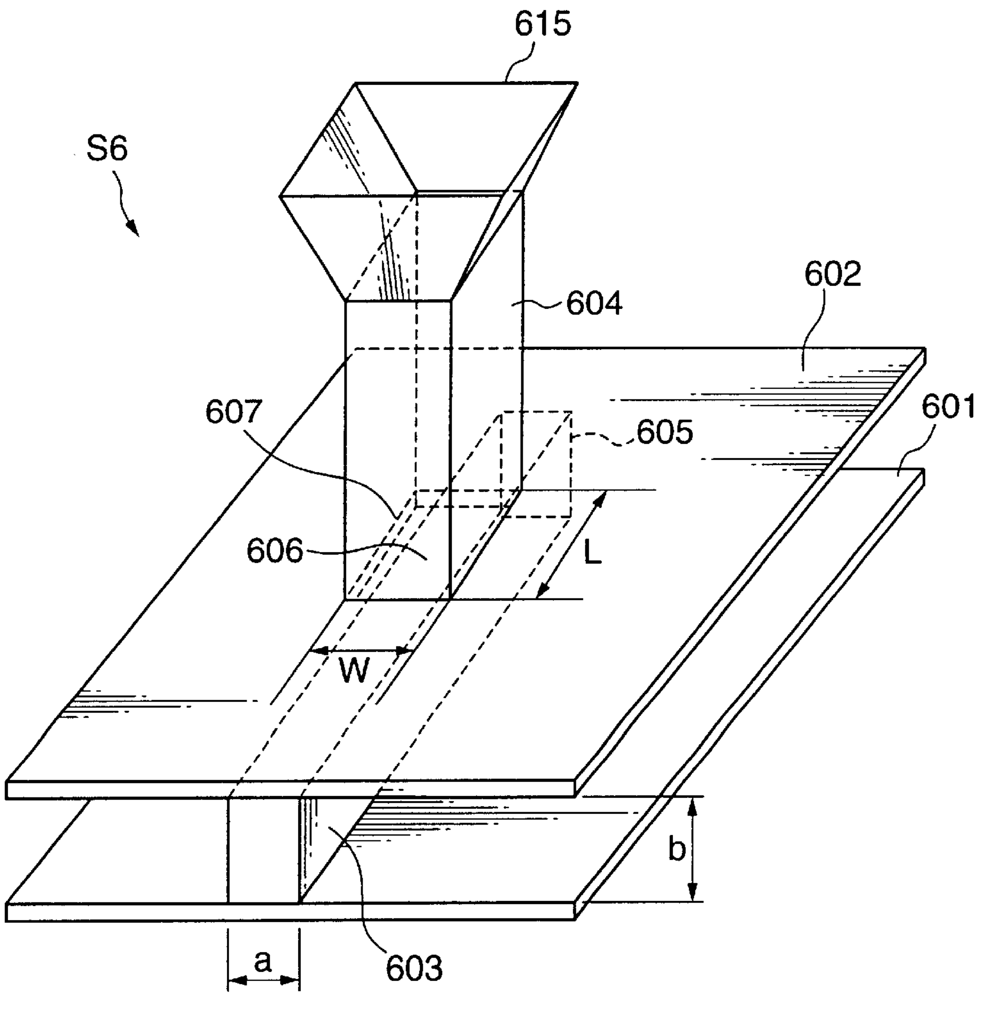
FIG. 23 is a perspective view showing a NRD guide according to a sixth embodiment of the invention in which a metallic waveguide is connected with a dielectric strip in a direction perpendicular to principle planes of parallel plate conductors.
Figure 24:
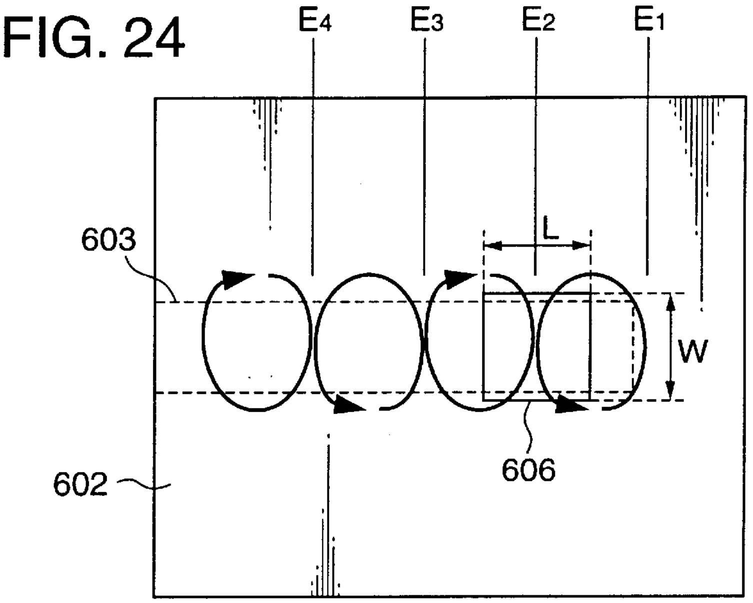
FIG. 24 is a plan view showing an electric field distribution of the dielectric strip in the NRD guide.

FIG. 23 is a perspective view showing an NRD guide according to a sixth embodiment of the invention. An NRD guide S6 according to the sixth embodiment is mainly designed to solve the problems in the prior art. In FIG. 23, the NRD guide S6 is constructed by arranging a dielectric strip 603 having a rectangular cross section of axb between a pair of parallel plate conductors 601, 602 vertically opposed to each other at a spacing which is equal to or shorter than half the wavelength of a high-frequency signal to be transmitted, and connecting a metallic waveguide 604 with the dielectric strip 603. An open termination 605 is formed at one end of the dielectric strip 603. In the NRD guide thus constructed, electric fields of standing waves of the LSM mode as shown in FIG. 24 are created. It should be noted that the wavelength here is a wavelength in the air (free space) at an operating frequency.

The respective parallel plate conductors 601, 602 are formed of conductive plates made of, e.g., Cu, Al, Fe, Ag, Au, Pt, SUS (Stainless Steel), brass (Cu-Zn alloy) since they need to have a high electric conductivity and an excellent processability. Alternatively, they may be formed of insulating plates made of ceramics, resin or like material having a conductive layer made of the above metallic materials formed on its outer surface. Further, the surfaces (inner surfaces) of the parallel plate conductors 601, 602 facing the dielectric strip 603 are ground so that an arithmetic average roughness Ra thereof satisfies $0.1\ \mu m \leqq Ra \leqq 50\ \mu m$.

This arithmetic average roughness Ra is the same as the one defined in the first embodiment, and the range thereof is set as above for the same reason mentioned in the first embodiment. The arithmetic average roughness Ra satisfies preferably $0.3\ \mu m \leqq Ra \leqq 25\ \mu m$, and more preferably $0.4\ \mu m \leqq Ra \leqq 10\ \mu m$.

The upper parallel plate conductor 602 is formed with an opening 606 in a position corresponding to any position where the electric fields of standing waves are strong, i.e., E1, E2, E3, E4 of FIG. 24 in order to connect the dielectric strip 603 and the metallic waveguide 604. Position E1 is located near the open termination 605 of the dielectric strip 603, whereas positions E2(m=1). E3(m=2), E4(m=3) are located in positions corresponding to distances, which are m/2 (m is a positive integer) of a guide wavelength, from the open termination 605. The opening 606 where the dielectric strip 603 and the metallic waveguide 604 are connected is preferably formed in position E2, E3 or E4 in view of a transmission loss, and more preferably in position E2 in view of a transmission loss and miniaturization.

The dielectric strip 603 and the metallic waveguide 604 of the NRD guide S6 are connected via the opening 606 formed in the parallel plate conductor 602, such that directions of these electric fields coincide. Specifically, as shown in FIG. 23, an open termination 607 at one end of the metallic waveguide 604 is connected via the opening 606 such that a direction (L-direction) of longer sides of the quadrilateral (rectangular) cross section of the metallic waveguide 604 is parallel to a transmission direction of a high-frequency signal in the dielectric strip 603. Another connecting construction is, as in an NRD guide S6*a* shown in FIG. 25, such that a metallic waveguide 604 having a closed termination 608 at one end and an open termination 609 at the other end is used, an opening 610 is formed in a position spaced from an end face of the closed termination 608 by n/2+1/4 (n is zero or a positive integer) of a guide wavelength of the metallic waveguide 604, and the metallic waveguide 604 and the dielectric strip 603 are connected such that the opening 606 of the parallel plate conductor 602 and an opening 610 formed in the metallic waveguide 604 are substantially in agreement. It should be noted that the openings 606, 610 have substantially the same shape.

Figure 25:
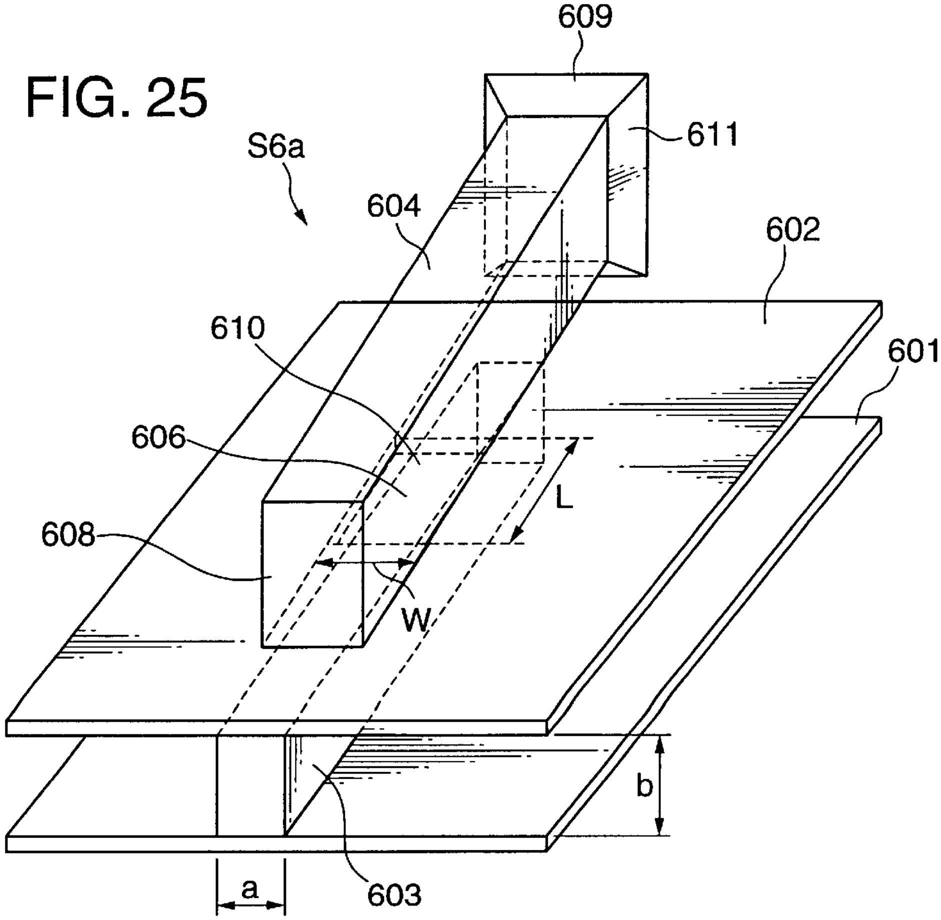
FIG. 25 is a perspective view showing another construction of the NRD guide according to the sixth embodiment of the invention in which the metallic waveguide is connected with the dielectric strip in a direction parallel to the principle planes of the parallel plate conductors.

In the construction of FIG. 25, the opening 610 of the metallic waveguide 604 is preferably formed such that its center is spaced by three fourths of the guide wavelength of the metallic waveguide 604 from the end face of the termination 608 of the metallic waveguide 604. In this case, a connection loss can be minimized and electromagnetic waves propagate in the metallic waveguide 604 only in a direction toward the open termination 609 to thereby minimize a transmission loss by connecting the metallic waveguide 604 in a position close to its closed termination 608 where the intensity of the electric field is at maximum. It should be noted that the electromagnetic field is likely to disturb in the position spaced from the end face of the closed termination 608 by a fourth of the guide wavelength of the metallic waveguide 604, and is stable in the position spaced from the end face of the closed termination 608 by three fourths of the guide wavelength of the metallic waveguide 604.

The opening 606 formed in the parallel plate conductor 602 is preferably in the form of a quadrilateral such as a rectangle having a length (L) equal to or shorter than half the guide wavelength of the dielectric strip 603 and a width (W) substantially same as that of the dielectric strip 603 as shown in FIG. 23. The opening 606 having such a rectangular shape has a small connection loss and a satisfactory processability. Instead of being quadrilateral, the opening 606 may be circular or oblong.

Figure 26:
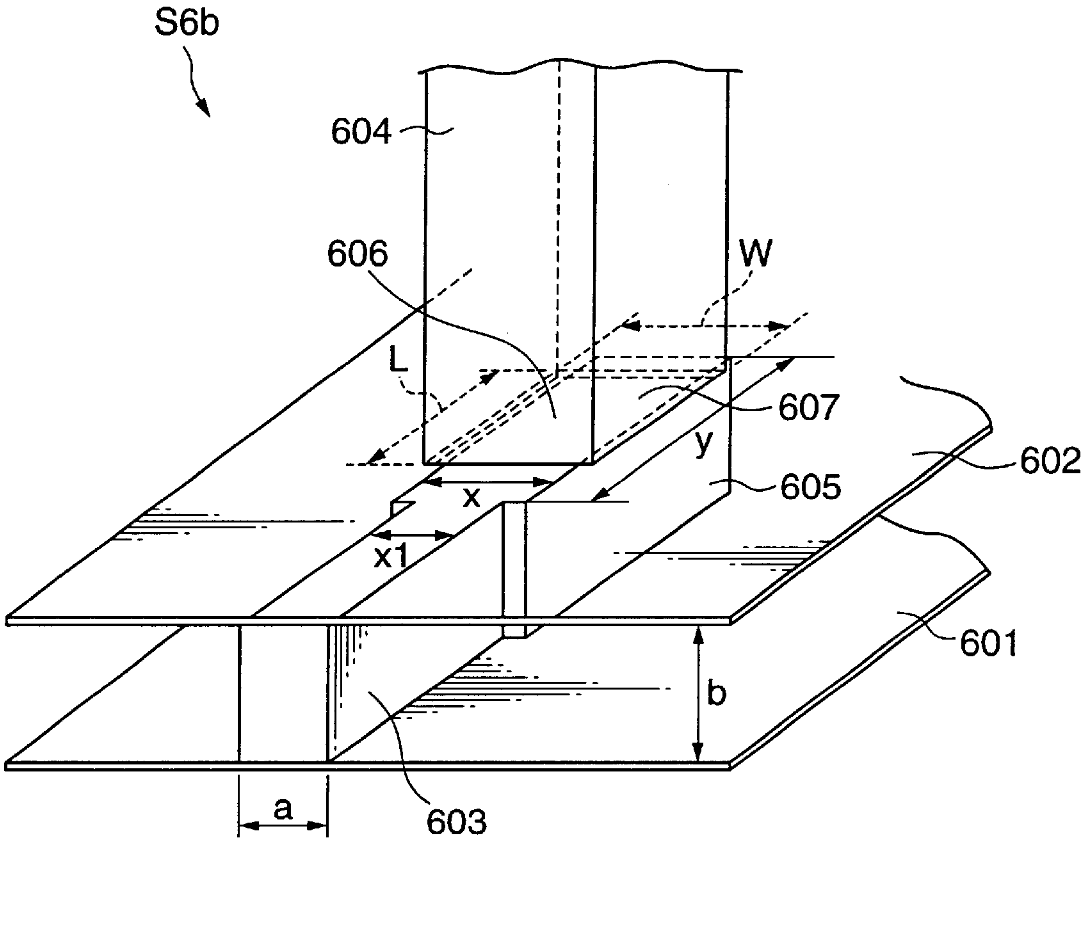
FIG. 26 is a partial perspective view showing a construction of the NRD guide shown in FIG. 23 in which an open termination of the dielectric strip is widened.

Further, as in an NRD guide S6*b* shown in FIG. 26, the dielectric strip 603 is preferably formed wider in an area extending from a portion corresponding to the opening 606 of the parallel plate conductor 602 to the open termination 605 than the other portion. In this case, a guide wavelength is shortened in the widened portion of the dielectric strip 603, with the result that a portion where the intensity of the electric field is at maximum is shifted in such a direction as to shorten the dielectric strip 603, enabling miniaturization of the dielectric strip 603. Denoted at x, x1 are the width of the widened portion and that of the narrow portion of the dielectric strip 603, respectively. It is preferable to satisfy $1 \leqq x/x1 \leqq 2$. If $x/x1<1$, the guide wavelength of the dielectric strip 603 is elongated, leading to a larger size of the NRD guide. If $2<x/x1$, reflection of the high-frequency signal or the like is likely to occur at the portion where the width of the dielectric strip 603 is changed, thereby increasing the transmission loss.

Even if the area extending from the portion corresponding to the opening 606 to the open termination 605 is formed of a dielectric having a larger dielectric constant instead of forming the widened portion of the dielectric strip 603 as above, the same effects can be obtained.

Further, as shown in FIG. 25, a horn antenna 611 having a gradually widening opening may be preferably formed at the open termination 609 at the other end of the metallic waveguide 604. By taking such a construction, the open termination 609 of the metallic waveguide 604 can be used also as antenna. As compared to a case where another antenna member is provided, the connection loss by a connecting portion with the antenna member is smaller. Further, this construction can be applied to a millimeter wave radar system installed in an automotive vehicle or the like having a high-efficiency transmission characteristic by enabling transmission and reception of a high-frequency signal to and from the outside.

Figure 27:
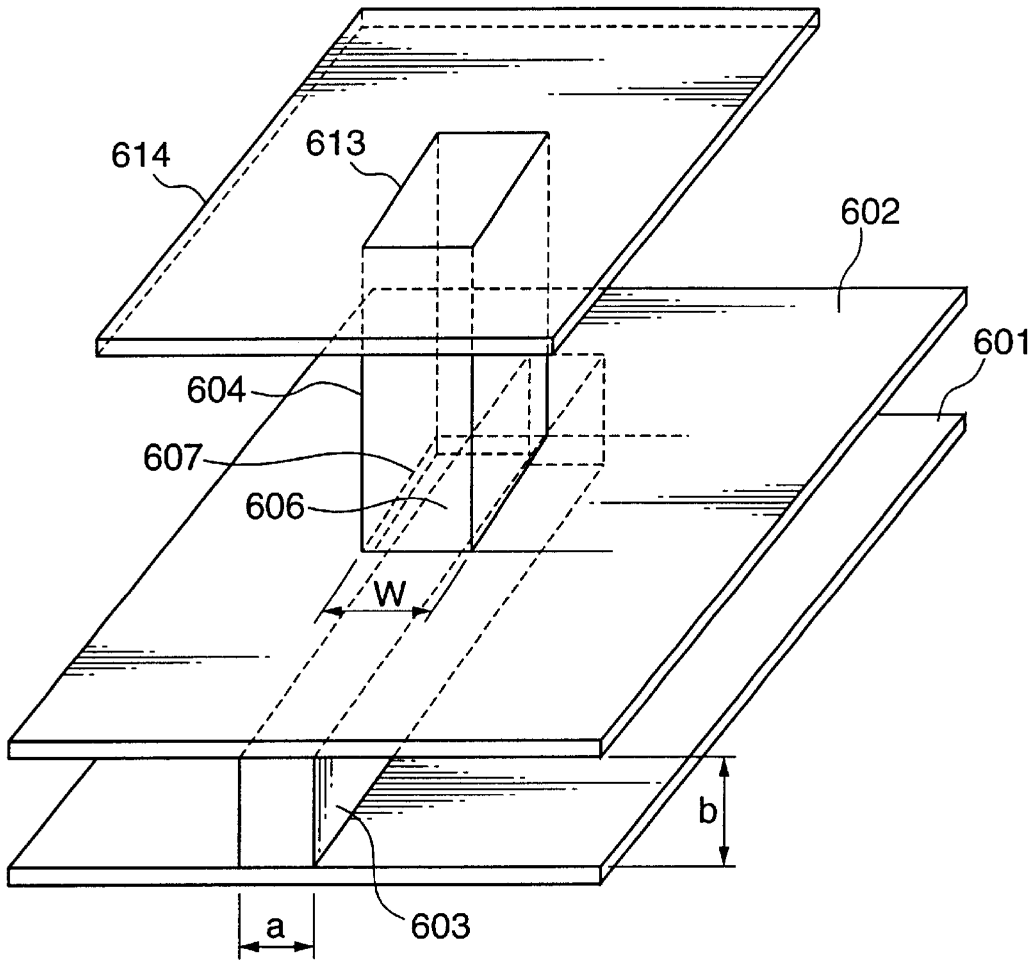
FIG. 27 is a perspective view showing still another construction of the NRD guide according to the sixth embodiment of the invention in which the metallic waveguide having an antenna member provided at its other end is connected with the dielectric strip in a direction perpendicular to the principle planes of the parallel plate conductors.

Further, as shown in FIG. 27, it is preferable to provide an antenna member 614 such as a flat antenna at an open termination 613 at the other end of the metallic waveguide 604. In this case, the connection loss of the antenna member 614 is slightly larger than the case of FIG. 25. However, transmission and reception of a high-frequency signal to and from the outside are enabled by providing the antenna member at an open termination 613, and this construction can be applied to a millimeter wave radar system installed in an automotive vehicle or the like having a high-efficiency transmission characteristic.

In this embodiment, open antennas which can be provided at the metallic waveguide 604 include a horn antenna and a laminated type open antenna, and flat antennas include a patch antenna, a slot antenna, a print dipole antenna. Particularly, flat antennas are preferable in view of miniaturization of a millimeter wave integrated circuit in a millimeter wave band. Various other antennas can be used for this purpose provided that they belong to the above category.

The metallic waveguide 604 may be made of Cu, Al, Fe, Ag, Au, Pt, SUS (Stainless Steel), brass (Cu-Zn alloy) or like conductive material or formed of a conductive material obtained by forming a conductive layer of the above metallic material on the outer surface of an insulating material made of ceramics, a resin or the like. These conducive materials are preferable in view of a high electric conductivity and an excellent processability.

The dielectric strip 503 is preferably made of a resin dielectric material such as Teflon, polystyrene or ceramic such as a cordierite ($2MgO.2Al_2O_3.5SiO_2$) ceramics, alumina ($Al_2O_3$) ceramics, glass ceramics. This is because these materials can suppress the transmission loss in a high-frequency band.

The high-frequency band in this embodiment corresponds to a microwave band and a millimeter wave band ranging from in the order of 10 GHz to in the order to 100 GHz, for example, above 30 GHz, particularly above 50 GHz, and further above 70 GHz.

The NRD guide S6 according to the sixth embodiment is used in a wireless LAN or a millimeter wave radar installed in an automotive vehicle with a high-frequency diode such as a Gunn diode incorporated thereinto as a high frequency generating device. For example, a millimeter wave is projected to an obstacle and other automotive vehicles present around an automotive vehicle in which this radar is installed, the reflected wave is combined with the original millimeter wave to obtain a beat signal (intermediate-frequency signal), and distances to the obstacle and other automotive vehicles and their moving speeds are measured by analyzing this beat signal.

According to the sixth embodiment, the dielectric strip and the metallic waveguide can be connected with a small connection loss, and the NRD guide and the millimeter wave integrated circuit or the like into which the NRD guide is incorporated can be miniaturized.

In the case that the dielectric strip 603 of the NRD guide S6 is made of, e.g., ceramics, it may be comprised of a plurality of strip sections as in the first embodiment shown in FIG. 1 and the end faces of the respective strip sections may be opposed to each other at a spacing equal to or shorter than $\lambda/8$ ($\lambda$ is a wavelength of a high-frequency signal to be transmitted). This can reduce conversion of electromagnetic waves of the LSM mode into those of the LSE mode and enables an easy fabrication of a dielectric strip having even a complicated shape formed by linear and curved portions. In other words, if the dielectric strip 603 is formed by a plurality of strip sections, a bend loss can be reduced even if the dielectric strip 603 includes a curved portion.

Figure 29A:
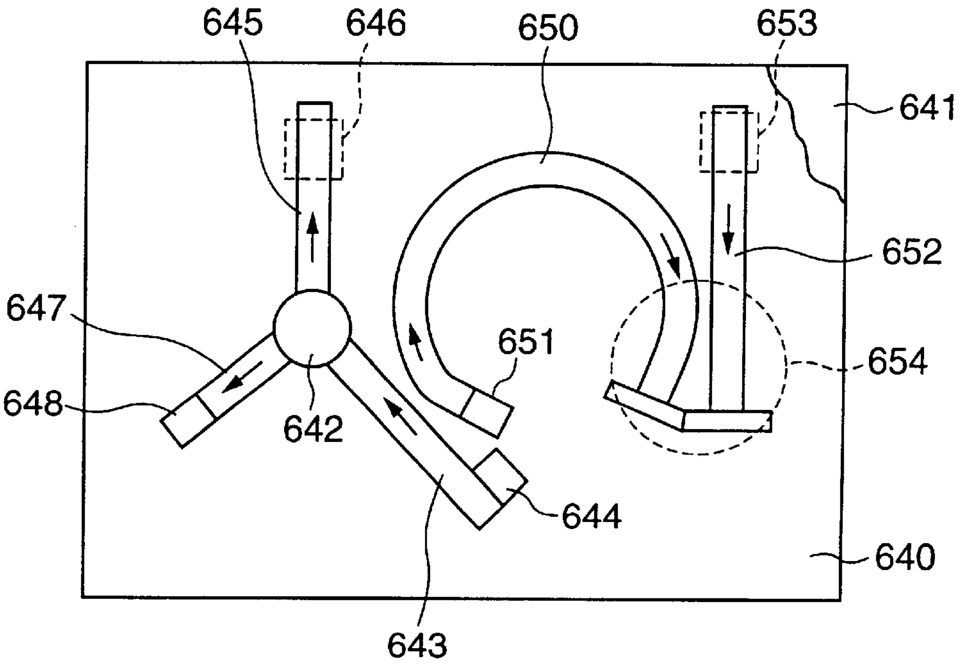
FIG. 29A is a plan view of a millimeter wave radar module in which the NRD guide shown in FIG. 23, 25 or 26 is used.
Figure 30:
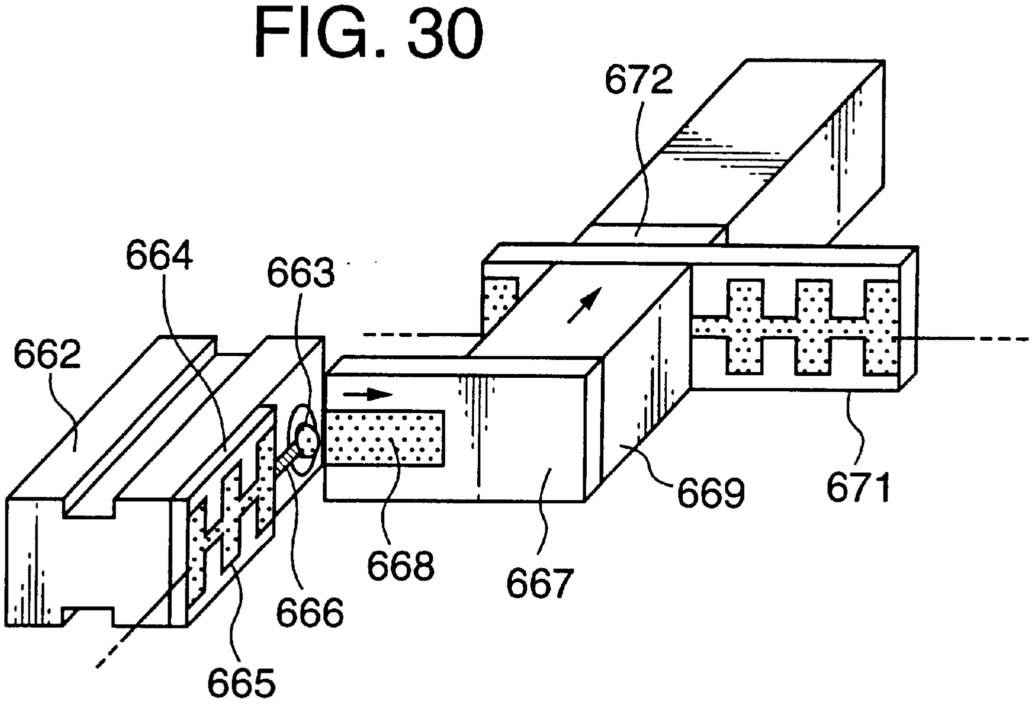
FIG. 30 is a perspective view showing a millimeter wave signal oscillator used in the millimeter wave radar module shown in FIG. 28A or 29.
Figure 31:
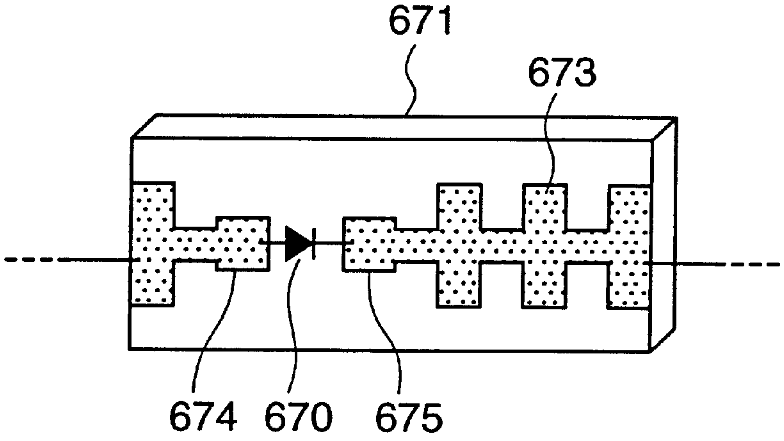
FIG. 31 is a perspective view of a circuit board on which a variable-capacitance diode is provided for the millimeter wave signal oscillator shown in FIG. 30.

Next, a millimeter wave radar module as a millimeter wave transmitting/receiving apparatus to which the NRD guide S6 is applied is described. FIGS. 28 to 31 show millimeter wave radar modules according to the embodiment of the invention, wherein FIG. 28A is a plan view of a millimeter wave radar module having an integrated transmitting/receiving antenna, FIG. 29A is a plan view of a millimeter wave radar module having independent transmitting antenna and receiving antenna, FIG. 30 is a perspective view showing a millimeter wave signal oscillator, and FIG. 31 is a perspective view of a circuit board on which a variable-capacitance diode (varactor diode) for the millimeter wave signal oscillator is provided.

Figure 28A:
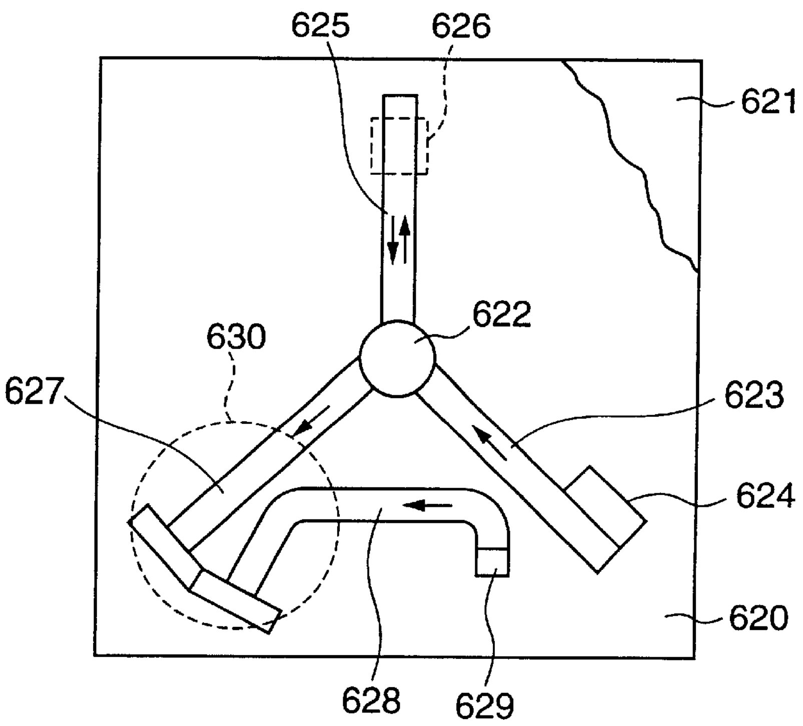
FIG. 28A is a plan view of a millimeter wave radar module in which the NRD guide shown in FIG. 23, 25 or 26 is used.

Identified by 620, 621 in FIG. 28A are a pair of vertically arranged parallel plate conductors which are constructed similar to the parallel plate conductors 601, 602 shown in FIG. 23. It should be noted that the upper parallel plate conductor 621 is partly cut away in order to make an entire construction visible.

Identified by 622 is a circulator made of two ferrite disks which are ferromagnetic plates vertically opposed to each other while being held in contact with the inner surfaces of the parallel plate conductors 601, 602 and having first, second and third connecting portions (none of them is shown).

Identified by 623 is a first dielectric strip having one end thereof connected with the first connecting portion of the circulator 622. The first dielectric strip 623 is adapted to transmit a millimeter wave signal and is formed similar to the dielectric strip 603 shown in FIG. 23. Identified by 624 is a millimeter wave oscillator which is provided at the other end of the first dielectric strip 623. The millimeter wave signal oscillator 624 outputs a frequency-modulated millimeter wave signal to be transmitted by cyclically controlling a bias voltage of a variable-capacitance diode disposed in vicinity of a high-frequency diode (high-frequency generating device) to have a triangular wave, a sine wave or other wave such that a bias voltage applying direction coincides with a direction of an electric field of a high-frequency signal.

Identified by 625 is a second dielectric strip having one end thereof connected with the second connecting portion of the circulator 622. The second dielectric strip 625 is adapted to transmit a millimeter wave signal and is formed similar to the dielectric strip 603 shown in FIG. 23. The second dielectric strip 625 has a transmitting/receiving antenna 626 at its leading end. This transmitting/receiving antenna 626 is to be connected with an open termination of a metallic waveguide similar to the metallic waveguide 604 shown in FIG. 23 as described later.

Identified by 627 is a third dielectric strip having one end thereof connected with the third connecting portion of the circulator 622. The third dielectric strip 627 is formed similar to the dielectric strip 603 shown in FIG. 23. The third dielectric strip 627 transmits a radio wave received by the transmitting/receiving antenna 626 and outputted from the third connecting portion of the circulator 622 via the second dielectric strip 625 to a mixer 630 to be described later.

Identified by 628 is a fourth dielectric strip for transmitting part of the millimeter wave signal to the mixer 630 by being coupled to the first dielectric strip 623 in such a manner that one end thereof is arranged in vicinity of the first dielectric strip 623 for electromagnetic coupling or one end thereof is joined with the first dielectric strip 623. Identified by 629 is a nonreflective termination (terminator) provided at one end of the fourth dielectric strip 628 opposite from the mixer 630. The mixer 630 mixes part of the millimeter wave signal with the received wave to generate an intermediate-frequency signal by electromagnetically coupling or joining an intermediate position of the third dielectric strip 627 and that of the fourth dielectric strip 628. It may be appreciated to provide a suppressor between the circulator 622 and each of the dielectric strips 623, 625, and 627.

Figure 28B:
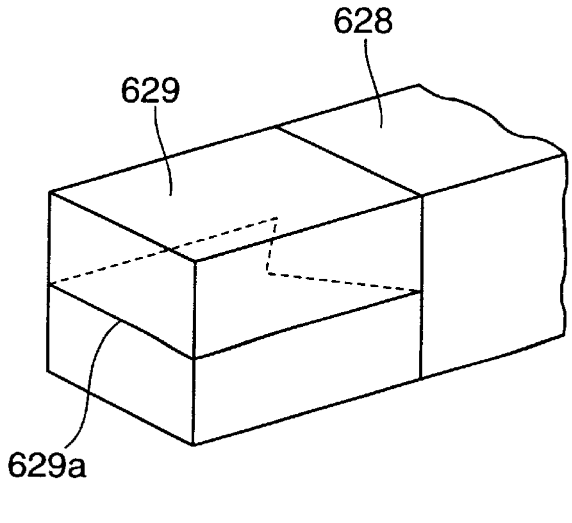
FIG. 28B is a perspective view of a nonreflective termination in the millimeter wave radar module shown in FIG. 28A.

The nonreflective termination 629 is provided with a resistance film 629*a* therein, as shown in FIG. 28B. The resistance film 629*a* is formed along a plane separating the nonreflective termination 629 into an upper half and a lower half and parallel with the pair of parallel plate conductors 620, 621. Further, the resistance film 629*a* may be formed on side surfaces or end surface of the nonreflective termination 629. The resistance film 629*a* is made of an NiCr alloy or resin containing conductive particles such as carbon particles. The nonreflective termination 629 provided with the resistance film 629*a* may be integrally formed with the fourth dielectric strip 628 by simultaneous sintering.

The above various parts are arranged between the parallel plate conductors 620, 621 spaced apart by a distance equal to or shorter than half the wavelength of the millimeter wave signal. At least one of the parallel plate conductors 620, 621 is formed with an opening in a position corresponding to a position where the electric field of a standing wave of the LSM mode is at maximum. The open termination at the other end of the metallic waveguide formed similar to the metallic waveguide 604 shown in FIG. 23 and having the transmitting/receiving antenna 626 provided at one end thereof is connected with this opening. The constructions of the metallic waveguide and the transmitting/receiving antenna and the connecting construction of the metallic waveguide and the transmitting/receiving antenna are similar to those described above. In other words, the NRD guide S6 is substantially constructed by arranging the second dielectric strip 625 and the transmitting/receiving antenna 626 between the pair of parallel plate conductors 620, 621.

In the construction of FIG. 28A, a frequency control can be executed by providing a switch constructed similar to the one shown in FIG. 31 in an intermediate position of the first dielectric strip 623. A switch shown in FIG. 31 is constructed such that a choke-type bias supply strip 673 is formed on one principle plane of a circuit board 671 and a PIN diode or Schottky barrier diode of beam lead type is mounted in an intermediate position of the strip 673 by soldering.

Another embodiment of the millimeter wave radar module as an inventive millimeter wave transmitting/receiving apparatus to which the NRD guide S6 is applied is of the type shown in FIG. 29A having independent transmitting antenna and receiving antenna. Identified by 640, 641 in FIG. 29A are a pair of vertically arranged parallel plate conductors which are constructed similar to the parallel plate conductors 601, 602 shown in FIG. 23. It should be noted that the upper parallel plate conductor 641 is partly cut away in order to make an entire construction visible.

Identified by 642 is a circulator made of two ferrite disks which are ferromagnetic plates vertically opposed to each other and having first, second and third connecting portions (none of them is shown).

Identified by 643 is a first dielectric strip having one end thereof connected with the first connecting portion of the circulator 642. The first dielectric strip 643 is adapted to transmit a millimeter wave signal and is formed similar to the dielectric strip 603 shown in FIG. 23. Identified by 644 is a millimeter wave oscillator which is provided at the other end of the first dielectric strip 643. The millimeter wave signal oscillator 644 outputs a frequency-modulated millimeter wave signal to be transmitted by cyclically controlling a bias voltage of a variable-capacitance diode disposed in vicinity of a high-frequency diode (high-frequency generating device) to have a triangular wave, a sine wave o r other wave such that a bias voltage applying direction coincides with a direction of an electric field of a high-frequency signal.

Identified by 645 is a second dielectric strip having one end thereof connected with the second connecting portion of the circulator 642. The second dielectric strip 645 is adapted to transmit a millimeter wave signal and is formed similar to the dielectric strip 603 shown in FIG. 23. The second dielectric strip 645 has a transmitting/receiving antenna 646 at its leading end. This transmitting/receiving antenna 646 is to be connected with an open termination of a metallic waveguide similar to the metallic waveguide 604 shown in FIG. 23 as described later.

Identified by 647 is a third dielectric strip having one end thereof connected with the third connecting portion of the circulator 642. The third dielectric strip 647 is formed similar to the dielectric strip 603 shown in FIG. 23. The third dielectric strip 647 transmits a radio wave received by the transmitting/receiving antenna 646 is provided at its leading end with a nonreflective termination 648 for attenuating a millimeter wave signal to be transmitted.

Identified by 650 is a fourth dielectric strip for transmitting part of the millimeter wave signal to the mixer 654 by being coupled to the first dielectric strip 643 in such a manner that one end thereof is arranged in vicinity of the first dielectric strip 643 for electromagnetic coupling or one end thereof is joined with the first dielectric strip 643. Identified by 651 is a nonreflective termination provided at one end of the fourth dielectric strip 650 opposite from the mixer 654. Identified by 652 is a fifth dielectric strip formed at its leading end with a receiving antenna 653. The fifth dielectric strip 652 transmits a radio wave received by the receiving antenna 653 to the mixer 654. The receiving antenna 653 is to be connected with an open termination of a metallic waveguide similar to the metallic waveguide 604 shown in FIG. 23 as described later.

Figure 29B:
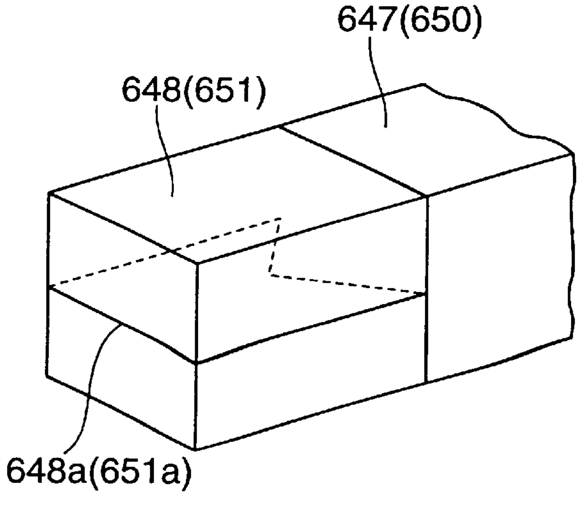
FIG. 29B is a perspective view of a nonreflective termination in the millimeter wave radar module shown in FIG. 29A.

The nonreflective termination 648 (651) is provided with a resistance film 648*a* (651*a*) therein, as shown in FIG. 29B. The resistance film 648*a* (651*a*) is formed along a plane separating the nonreflective termination 648 (651) into an upper half and a lower half and parallel with the pair of parallel plate conductors 640, 641. Further, the resistance film 648$a$ (651$a$) may be formed on side surfaces or end surface of the nonreflective termination 648 (651). The resistance film 648$a$ (651$a$) is made of an NiCr alloy or resin containing conductive particles such as carbon particles. The nonreflective termination 648 (651) provided with the resistance film 648$a$ (651$a$) may be integrally formed with the third dielectric strip 647 (650) by simultaneous sintering.

The mixer 654 mixes part of the millimeter wave signal with the received wave to generate an intermediate-frequency signal by electromagnetically coupling or joining an intermediate position of the fourth dielectric strip 650 and that of the fifth dielectric strip 652. It may be appreciated to provide a suppressor between the circulator 642 and each of the dielectric strips 643, 645, and 647.

The above various parts are arranged between the parallel plate conductors 640, 641 spaced apart by a distance equal to or shorter than half the wavelength of the millimeter wave signal. At least one of the parallel plate conductors 640, 641 is formed with openings in positions corresponding to a position where the electric field of a standing wave of the LSM mode transmitting in the second dielectric strip 645 is at maximum and a position where the electric field of a standing wave of the LSM mode transmitting in the fifth dielectric strip 652 is at maximum. The open termination at the other end of the metallic waveguide formed similar to the metallic waveguide 604 shown in FIG. 23 and having the transmitting antenna 646 or the receiving antenna 653 provided at one end thereof is connected with these openings. The constructions of the metallic waveguide and the transmitting and receiving antennas and the connecting construction of the metallic waveguide and the second and fifth dielectric strips are similar to those described above. In other words, the NRD guide S6 is substantially constructed by arranging the second and fifth dielectric strips 645, 652 and the transmitting and receiving antennas 646, 653 between the pair of parallel plate conductors 640, 641.

In the construction of FIG. 29A, the transmitting antenna 646 may be connected with the leading end of the first dielectric strip 643 by deleting the circulator 642. In this case, part of the received wave is likely to enter the millimeter wave signal oscillator, thereby causing a noise although the construction can be made smaller. Thus, the construction of FIG. 29A is more preferable. In the construction of FIG. 29A, a frequency control can be executed by providing a switch constructed similar to the one shown in FIG. 31 in an intermediate position of the first dielectric strip 643. The switch shown in FIG. 31 is constructed such that the second choke-type bias supply strip 673 is formed on one principle plane of the circuit board 671 and a PIN diode or Schottky barrier diode of beam lead type is mounted in an intermediate position of the strip 673 by soldering.

The construction of the millimeter wave signal oscillators 624, 644 used in the millimeter wave radar module shown in FIGS. 28 and 29 are shown in FIGS. 30 and 31. Identified by 662 in FIGS. 19 and 20 is a metallic member such as a metallic block for mounting a Gunn diode 663. The Gunn diode 663 is one type of the high-frequency diodes for oscillating a millimeter wave signal and is mounted on one side surface of the metallic member 662. Identified by 664 is a circuit board on which the choke-type bias supply strip 665, which functions as a low-pass filter is formed to supply a bias voltage to the Gunn diode 663 and prevent leak of a high-frequency signal. Identified by 666 is a strip conductor such as a metallic foil ribbon for connecting the choke-type bias supply strip 665 and an upper conductor of the Gunn diode 663.

Identified by 667 is a metal strip resonator formed by providing a metal strip 668 for resonance on a dielectric substrate, and by 669 a dielectric waveguide for leading the high-frequency signal resonated by the metal strip 667 to the outside of the millimeter wave signal oscillator. The circuit board 671 carrying a varactor diode 670 which is used for frequency modulation and is one type of the variable-capacitance diodes is provided in an intermediate position of the dielectric waveguide 669. A bias voltage applying direction of the varactor diode 670 is a direction (direction of electric field) perpendicular to the transmission direction of the high-frequency signal and parallel to the principle planes of the parallel plate conductors 620, 621, 640, 641. Further, the bias voltage applying direction of the varactor diode 670 coincides with a direction of an electric field of a high-frequency signal of the $LSM_{01}$ mode transmitting in the dielectric waveguide 669, so that the bias voltage is controlled to change an electrostatic capacitance of the varactor diode 670 by electromagnetically coupling the high-frequency signal and the varactor diode 670, thereby controlling the frequency of the high-frequency signal. Identified by 672 is a dielectric plate having a high relative dielectric constant used for the impedance matching between the varactor diode 670 and the dielectric waveguide 669.

As shown in FIG. 31, the second choke-type bias supply strip 673 having the varactor diode 670 of beam lead type mounted in its intermediate position is formed on one principle plane of the circuit board 671. Further, connection electrodes 674, 675 are formed at portions of the second chock-type bias supply strip 673 connected with the varactor diode 670.

In this construction, the high-frequency signal oscillated by the Gunn diode 663 is led to the dielectric waveguide 669 via the metal strip resonator 667. Subsequently, part of the high-frequency signal is reflected by the varactor diode 670 to return to the Gunn diode 663. This reflection signal changes as the electrostatic capacitance of the varactor diode 670 changes, thereby changing an oscillating frequency.

The millimeter wave radar modules shown in FIGS. 28 and 29 adopt the FMCW (frequency modulation continuous waves) system, whose operation principle is as follows. An input signal representing a change of voltage amplitude with time in the form of a triangular wave, sine wave or other wave is inputted to a MODIN terminal for modulated signal input of the millimeter wave signal oscillator, and an output signal thereof is frequency-modulated so that deviation of an output frequency of the millimeter wave signal oscillator is represented by a triangular wave, sine wave or other wave. In the case that the output signal (transmitted wave) is radiated via the transmitting/receiving antenna 626 or the transmitting antenna 646, a reflected wave (received wave) returns with a time lag resulting from a time required for the radio wave to propagate back and forth if a target is present in front of the transmitting/receiving antenna 626 or the transmitting antenna 646. At this time, a frequency difference between the transmitted wave and the received wave is outputted to an IFOUT terminal at the output side of the mixer 630 or 654.

A distance to the target can be calculated in accordance with following equation by analyzing a frequency component of the output frequency of the IFOUT terminal or the like:

$$Fif=4R\cdot fm\cdot \Delta f/c$$

(Fif: IF output frequency, R: distance, fm: modulating frequency, Δf: frequency deviation range, c: velocity of light).

In the millimeter wave signal oscillators 624, 644 of the millimeter wave radar modules according to the embodiment of the invention, the choke-type bias supply strip 665 and the strip conductor 666 are made of, e.g., Cu, Al, Au. Ag, W, Ti, Ni, Cr, Pd, Pt. Particularly, Cu, Ag are preferable because of a satisfactory electric conductivity, a small transmission loss and a large oscillation output.

The strip conductor 666 is electromagnetically coupled to the metallic member 662 at a specified spacing from the outer surface of the metallic member 662 and bridges the choke-type bias supply strip 665 and the Gunn diode 663. More specifically, one end of the strip conductor 666 is connected with one end of the choke-type bias supply strip 665 by, e.g., soldering, the other end thereof is connected with an upper conductor of the Gunn diode 663 by, e.g., soldering, and an intermediate portion thereof extends in the air.

The metallic member 662 is sufficient to be a metallic conductor since it also acts as an electric ground for the Gunn diode 663, and the material therefor is not particularly restricted provided that it is a metallic (including alloys) conductor. The metallic member 662 may be made of, e.g., brass (Cu-Zn alloy), Al, Cu, SUS (stainless steel), Ag, Au, Pt. Alternatively, the metallic member 662 may be a metallic block entirely made of a metal, ceramics or plastic block having its outer surfaces entirely or partly coated with metal plating, or an insulating substrate having its outer surfaces entirely or partly coated with a conductive resin material.

The millimeter wave radar module as a millimeter wave transmitting/receiving apparatus according to the embodiment of the invention has an improved transmission, and can increase a detection distance when being applied to a millimeter wave radar (type of FIG. 28A). Further, the millimeter wave signal to be transmitted is not introduced to the mixer via the circulator. As a result, noise of the received signal is reduced and a detection distance is increased. Thus, the detection distance of the millimeter wave radar can be further increased (type of FIG. 29A).

Examples of the inventive NRD guide S6 provided with a circulator are described below.

EXAMPLE 9

The NRD guide S6 provided with a metallic waveguide shown in FIG. 23 was constructed as follows. Two aluminum plates having a thickness of 6 mm as parallel plate conductors 601, 602 were arranged at a spacing of 1.8 mm, and the dielectric strip 603 having a rectangular cross section of 1.8 mm (height)×0.8 mm (width) and made of cordierite ceramics having a relative dielectric constant of 4.8 was arranged between the aluminum plates, thereby fabricating a main body of the NRD guide S6. The rectangular opening 606 having a width (w) of 1.27 mm and a length (L) of 2.54 mm and having a center located in a position distanced from the open termination 605 of the dielectric strip 603 by 2.5 mm was formed in one of the aluminum plates.

Figure 32:
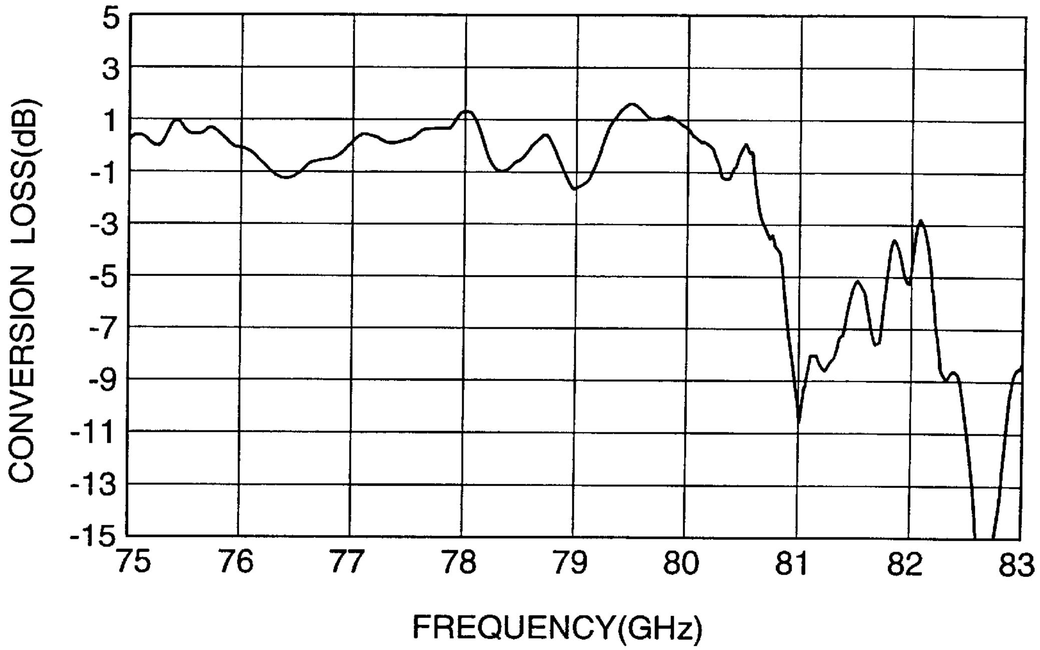
FIG. 32 is a graph showing a high-frequency signal transmission characteristic of the NRD guide shown in FIG. 23.

Subsequently, the metallic waveguide 604 having the same cross section as the shape of the opening 606 and made of a gold-plated brass was connected with the opening 606. A conversion loss (connection loss; S21) from the LSE mode to the TE mode was measured for this connecting construction using a network analyzer. At this time, the connection loss S21 was also measured for an NRD guide in which the open termination 605 of the dielectric strip 603 was gradually widened toward the end, the widened portion was caused to project out from the parallel plate conductors 601, 602 to spatially couple and transmit a high-frequency signal to the metallic waveguide having a rectangular horn and provided outside. The measurement result is shown in FIG. 32. As is clear from a graph of FIG. 32, it was found out that a satisfactory conversion characteristic having a transmission characteristic of about −2 dB or higher at about 75 to 80 GHz was exhibited, and Example 9 enables a connection with low connection loss and insertion loss.

EXAMPLE 10

The open termination 605 of the dielectric strip 603 was widened as shown in FIG. 26. Assuming that x=1.0 mm, y=3.2 mm, the rectangular opening 606 having a width (w) of 1.27 mm and a length (L) of 2.54 mm and having a center located in a position distanced from the open termination 605 by 1.9 mm in the longitudinal direction (transmission direction of a high-frequency signal) of the dielectric strip 603 was formed in the parallel plate conductor 602.

Figure 33:
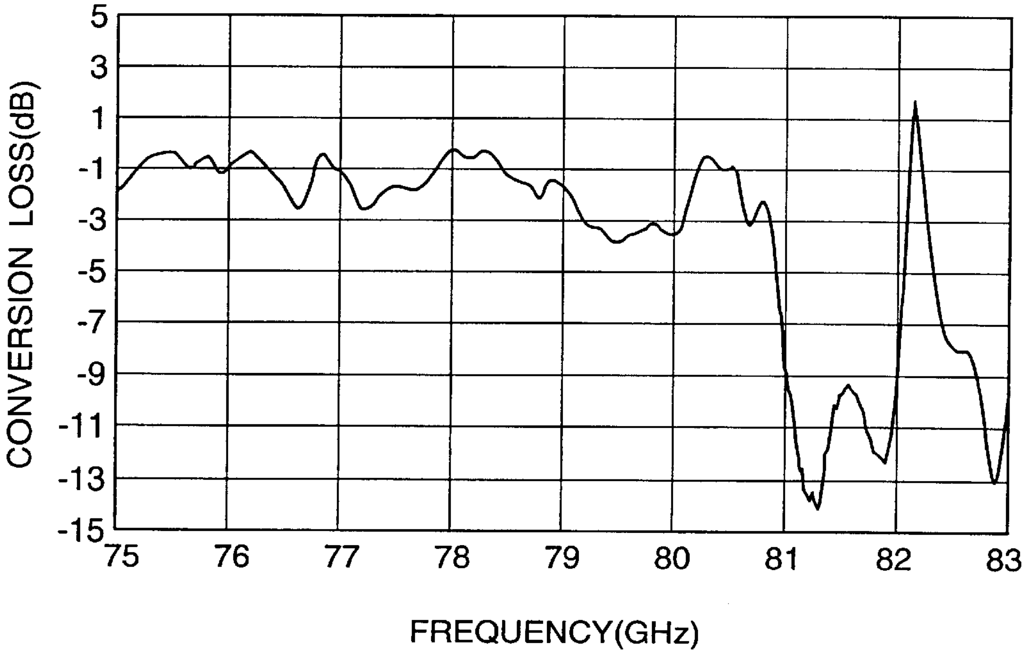
FIG. 33 is a graph showing a high-frequency signal transmission characteristic of the NRD guide shown in FIG. 26.
Figure 34:
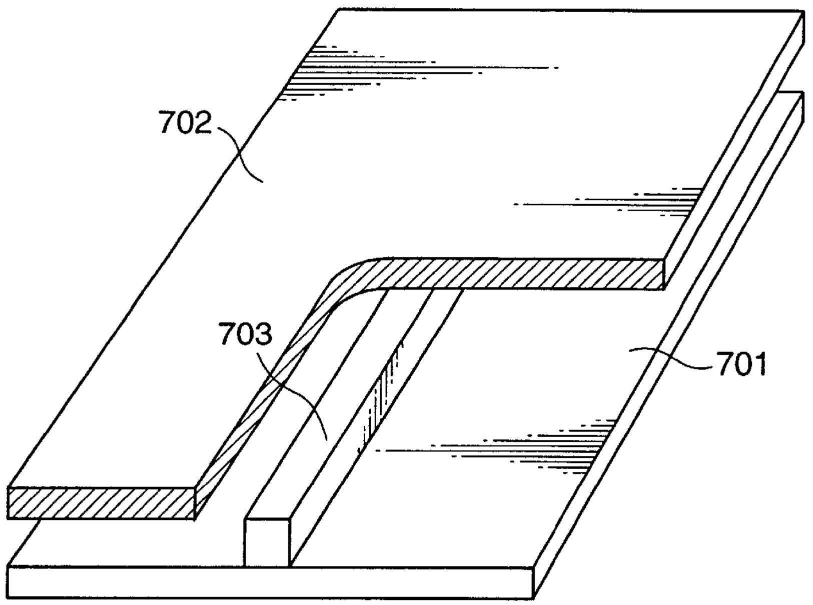
PRIOR ART FIG. 34
FIG. 34 is a perspective view showing an inside of a conventional NRD guide.
Figure 35:
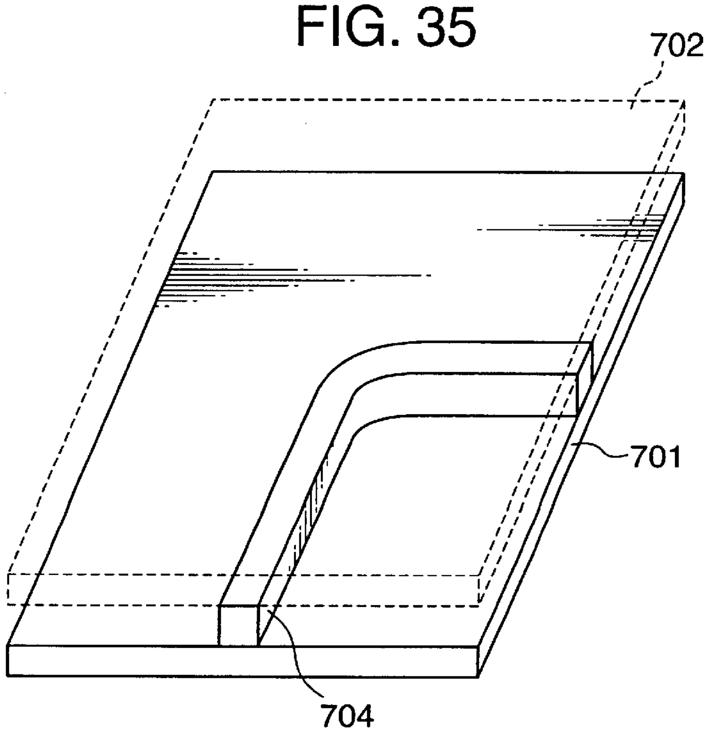
PRIOR ART FIG. 35
FIG. 35 is a perspective view showing an inside of another conventional NRD guide.
Figure 36:
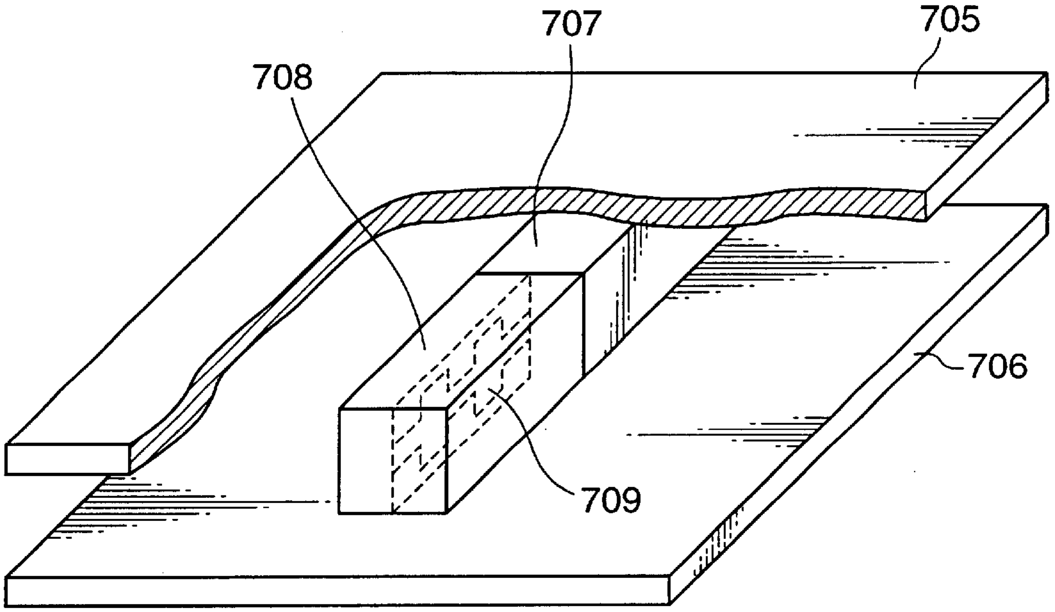
PRIOR ART FIG. 36
FIG. 36 is a perspective view showing an inside of still another conventional NRD guide.

A conversion characteristic was estimated as in Example 9, and the estimation result is shown in FIG. 33. As shown in FIG. 33, it was found out that a satisfactory conversion characteristic having a transmission characteristic of about −2 dB or higher at about 75 to 80 GHz was exhibited, a connection with low connection loss and insertion loss was possible, and the NRD guide S6 can be made smaller by shortening the dielectric strip 603.

Since the parallel plate conductors are formed so that the arithmetic average roughness Ra of their inner surfaces satisfies $0.1\ \mu m \leqq Ra \leqq 50\ \mu m$ as described above, the NRD guides S6, S6*a*, S6*b* according to the sixth embodiment of the invention have an excellent durability and can effectively suppress the transmission loss of high-frequency signals because the dielectric strip is strongly secured to the inner surfaces of the parallel plate conductors.

Further, in the NRD guide S6, at least one of the parallel plate conductors is formed with the opening in a position corresponding where the electric field of the standing wave of the LSM mode transmitting in the dielectric strip is at maximum, and the open termination at one end of the metallic waveguide is connected with this opening. Accordingly, the dielectric strip and the metallic waveguide can be connected with a small connection loss, and the NRD guide and a millimeter wave integrated circuit or the like into which the NRD guide is incorporated can be miniaturized.

Further, in the NRD guide S6*a*, at least one of the parallel plate conductors formed with the opening in a position corresponding to where the electric field of the standing wave of the LSM mode transmitting in the dielectric strip is at maximum, and the metallic waveguide having the closed termination at one end and the open termination at the other end and formed with an opening in a position which is distanced from the closed termination by n/2+1/4 (n is zero or a positive integer) of a guide wavelength are so connected as to join the opening of the parallel plate conductor with that of the metallic waveguide. Thus, the metallic waveguide can be firmly arranged by improving its connection strength, and the entire NRD guide can be thinned so as to be used in a narrow space by being vertically placed. Further, a connection loss can be minimized, and electromagnetic waves propagate only in a direction toward the open termination in the metallic waveguide, resulting in a minimized transmission loss.

Further, in the NRD guide S6*b*, the dielectric strip is widened in an area extending from the portion corresponding to the opening of the parallel plate conductor to the open termination than the other portion. Accordingly, the NRD guide S6*b* can be made smaller by shortening the dielectric strip, and the guide wavelength is shortened at the widened portion of the dielectric strip, with the result that a portion where the intensity of the electric field is at maximum is shifted in such a direction as to shorten the dielectric strip 603, enabling miniaturization of the dielectric strip 603.

Further preferably, transmission and reception of a high-frequency signal as a radio wave are enabled by providing the open antenna or flat antenna at the open termination at the other end of the metallic waveguide. Thus, the NRD guide can be applied to a millimeter wave radar system installed in an automotive vehicle or the like having a high-efficiency transmission characteristic. In the case of forming the open termination into a horn antenna whose opening gradually widens, the open termination at the other end of the metallic waveguide can be also used as an antenna, and a connection loss by a connecting portion with the antenna member is smaller as compared to a case where another antenna member is provided.

The millimeter wave radar module as an inventive millimeter wave transmitting/receiving apparatus can have an improved transmission loss by applying the construction of the NRD guide S6 thereto, with the result that a detection distance of the millimeter wave radar can be increased. Further, the millimeter wave radar module having independent transmitting and receiving antennas according to the embodiment of the invention has no possibility that a millimeter wave signal to be transmitted should be introduced to the mixer via the circulator. Accordingly, noise of the received signal is reduced and a detection distance is increased. This results in an excellent transmission characteristic of a millimeter wave signal, which further increases a detection distance.

As described above, an inventive NRD guide comprises the pair of parallel plate conductors opposed to each other at a spacing equal to or shorter than half the wavelength of the high-frequency signal to be transmitted and having opposing inner surfaces whose arithmetic average roughness Ra satisfies $0.1\ \mu m \leqq Ra \leqq 50\ \mu m$, and the dielectric strip arranged between the pair of parallel plate conductors while being held in contact with the respective inner surfaces of the parallel plate conductors.

In the NRD guide, since the inner surfaces have a suitable unevenness, the dielectric strip is strongly secured to the inner surfaces by the anchor effect to exhibit an excellent durability. Further, current paths on the inner surfaces can be shortened to reduce a surface resistance, with the result that the transmission loss of the high-frequency signal can be effectively suppressed.

Preferably, the dielectric strip may include a plurality of strip unit sections and formed by connecting the plurality of strip unit sections one after another such that end faces thereof are opposed to each other at a spacing equal to or shorter than ⅛ of the wavelength of the high-frequency signal.

By successively connecting the plurality of strip unit members (strip sections) at specified intervals, a dielectric strip having a complicated shape can be easily formed by linear and curved portions. Further, the dielectric strip is unlikely to be influenced by a stress created from a difference in thermal expansion between the parallel plate conductors and the dielectric strip resulting from an atmospheric temperature change and a stress created by an external impact. Thus, an NRD guide which has a higher degree of freedom and a smaller size and is inexpensive can be constructed.

Preferably, the dielectric strip may be made of ceramics containing a multiple oxide of Mg, Al, Si as a main component and having a Q-value of 1000 or larger in a frequency range of 50 to 90 GHz.

Since the dielectric strip made of ceramics having a relative dielectric constant lower than a conventionally used aluminaceramics or like material is used, conversion of the electromagnetic waves of the LSM mode into those of the LSE mode can be reduced to suppress a loss of the high-frequency signal. Thus, using the ceramics containing a multiple oxide of Mg, Al, Si as a main component, a dielectric strip which has a smaller transmission loss and a high geometry precision and is inexpensive can be formed. Since the relative dielectric constant of the dielectric strip is higher than those of resin materials such as Teflon, even if a supporting jig, a circuit board, and the like are made of these resin material and are provided in vicinity of the dielectric strip, the dielectric strip is unlikely to be influenced thereby.

Preferably, a mole ratio composition formula of the multiple oxide may be expressed by $xMgO.yAl_2O_3.zSiO_2$ where x=10 to 40 mole percent, y=10 to 40 mole percent, z=20 to 80 mole percent, and x+y+z=100 mole percent.

With such a multiple oxide, a NRD guide which has an even smaller transmission loss and a higher geometry precision and is more inexpensive can be fabricated.

Preferably, the dielectric strip may be joined with at least one of the parallel plate conductors by a solder.

The pair of parallel plate conductors and the dielectric strip can be more precisely positioned by joining them by the solder, thereby improving the heat resistance and durability reliability of the NRD guide.

Preferably, the dielectric strip may be made of ceramics, a glass or glass ceramics. This enables joining by the solder, thereby improving the heat resistance and durability reliability of the NRD guide.

Preferably, the dielectric strip may have a metallic layer formed on its outer surface to be joined with the parallel plate conductor by the solder. This facilitates joining of the dielectric strip by the solder.

Preferably, the solder may contain at one element selected from the group consisting of Au, Ti, Sn, Pb. This facilitates joining of the dielectric strip by the solder.

Preferably, the metallic layer may be formed of a metallic foil. This facilitates formation of the metallic layer and joining of the dielectric strip by the solder.

Preferably, the suppressor for attenuating electromagnetic waves of unnecessary modes which is obtained by integrally forming a conductive layer inside the ceramics dielectric strip by simultaneous sintering may be connected with one end of the dielectric strip between the pair of parallel plate conductors. With such a construction, the dimensional precision and positional precision of the conductive layers can be improved, and the suppressor having a stable function can be constructed.

Preferably, the ceramic dielectric strip may be made of glass ceramics and the conductive layer is made of a low-resistance metallic conductor. This facilitates formation of the metallic layer and can construct the suppressor having a stable function.

Preferably, the suppressor for attenuating electromagnetic waves of unnecessary modes may be provided at one end of the dielectric strip between the pair of parallel plate conductors, and formed by providing a plurality of conducive layers at specified intervals in a plane parallel to a transmission direction of the high-frequency signal inside the end of the dielectric strip.

With this construction, resonance of the unnecessary modes do not occur by separating the conductive layers from each other. As a result, the unnecessary modes such as the LSE mode can be effectively attenuated. Further, since the conductive layers are formed thinner as compared with conductive pins or the like, reflection by the conductive layers of the LSM mode or the like which is a transmission mode is unlikely to occur and, therefore, the transmission loss can be reduced.

Preferably, a dimension of each conductive layer along the transmission direction may be equal to or shorter than half the wavelength of a TEM mode electromagnetic wave of the high-frequency signal, and a thickness thereof is 0.1 mm or smaller.

With such conductive layers, electromagnetic waves of the LSE mode and other unnecessary modes can be effectively attenuated, and a transmission loss by the conductive layers of the LSM mode which is a transmission mode can be significantly reduced.

Preferably, a circulator made of two ferromagnetic plates opposed to each other in the same direction as the pair of parallel plate conductors being spaced apart may be provided between the pair of parallel plate conductors, the dielectric strips includes a plurality of dielectric strips substantially radially arranged with respect to the circulator, suppressors for blocking electromagnetic waves of unnecessary modes are provided at the leading ends of the respective dielectric strips toward the circulator, and impedance matching members having a relative dielectric constant different from that of the respective dielectric strips are arranged at the leading ends of the respective suppressors toward the circulator.

With this construction, by providing the impedance matching members having a relative dielectric constant different from that of the dielectric strip, electromagnetic waves are becoming difficult to reflect. As a result, the insertion loss and isolation characteristic of the high-frequency signal in a high-frequency band are further improved to significantly widen a range of the band.

Preferably, the impedance matching members may be formed at their sides toward the respective parallel plate conductors with stepped portions having a height substantially equal to the thickness of the respective ferromagnetic plates forming the circulator, and the impedance matching members and the circulator are connected by holding the impedance matching members by the two ferromagnetic plates at the stepped portions.

With this construction, the suppressor and the ferromagnetic plates are positioned with an improved precision, the circulator can be assembled with an improved repeatability, and the two ferromagnetic plates are unlikely to become eccentric with respect to each other. This enables a circulator characteristic to be stably obtained with a good repeatability and simplifies production, presenting a suitable mass-productivity.

Preferably, there may be further provided a metallic waveguide connected with the dielectric strip by having an open termination connected with an opening formed in at least one of parallel plate conductors in a position corresponding to where an electric field of a standing wave of LSM mode transmitting in the dielectric strip is at maximum. With this arrangement, the dielectric strip and the metallic waveguide can be connected to reduce a connection loss and a transmission loss, and can be made smaller.

Preferably, at least one of the pair of parallel plate conductors may be formed with an opening in a position corresponding to where an electric field of a standing wave of LSM mode transmitting in the dielectric strip is at maximum, and a metallic waveguide having a closed termination at one end and an open termination at the other end and formed with an opening in a position which is distanced from the closed termination by n/2+1/4 (n is zero or a positive integer) of a guide wavelength is connected with the dielectric strip by coupling the opening of the parallel plate conductor to that of the metallic waveguide.

With this construction, the side surfaces of the metallic waveguide can be placed in parallel to the surfaces of the parallel plate conductors, with the result that the metallic waveguide can be firmly placed by improving its connection strength, and the entire NRD guide can be made thinner. Thus, the NRD guide can be arranged in a narrow space by being vertically placed. Further, by connecting the metallic waveguide in a position closest to its closed termination where the intensity of the electric field is at maximum, a connection loss can be minimized, and electromagnetic waves propagate only in a direction toward the open termination in the metallic waveguide. As a result, a transmission loss can also be minimized.

Preferably, the dielectric strip may be widened in an area extending from a portion corresponding to the opening of the parallel plate conductor to the open termination than an other portion.

Then, the dielectric strip can be made smaller by shortening its length. Further, since a guide wavelength is shortened in the widened portion of the dielectric strip, a portion where the intensity of the electric field is at maximum is shifted in such a direction as to shorten the dielectric strip, enabling further miniaturization of the dielectric strip.

Preferably, an open antenna or flat antenna may be provided at the open termination of the metallic waveguide which is not coupled to the opening of the parallel plate conductor. Such an antenna enables transmission and reception of the high-frequency signal as a radio wave to and from the outside. Thus, the NRD guide can be applied to a millimeter wave radar system installed in an automotive vehicle or the like having a high-efficiency transmission characteristic.

An inventive millimeter wave transmitting/receiving apparatus comprises a pair of parallel plate conductors opposed to each other at a spacing equal to or shorter than half the wavelength of the high-frequency signal to be transmitted; the circulator made of two ferromagnetic plates provided between the pair of parallel plate conductors and opposed to each other in the same direction as the pair of parallel plate conductors are spaced apart; the first dielectric strip arranged between the pair of parallel plate conductors; the millimeter wave signal oscillator provided at one end of the first dielectric strip for outputting a millimeter wave signal to be transmitted; the second dielectric strip connected with the one end of the first dielectric strip and radially arranged with respect to the circulator between the pair of parallel plate conductors; the third dielectric strip radially arranged with respect to the circulator between the pair of parallel plate conductors and having the transmitting/receiving antenna at its leading end; the fourth dielectric strip radially arranged with respect to the circulator between the pair of parallel plate conductors; the first, second, third and fourth suppressors arranged between the one end of the first dielectric strip and the millimeter wave signal oscillator and between the second, third and fourth dielectric strips and the circulator, and formed by arranging a plurality of conductive layers at specified intervals in a plane parallel to the transmission direction of the high-frequency signal inside the ends of the respective dielectric strips; and the mixer for mixing part of the millimeter wave signal outputted from the millimeter wave signal oscillator and a radio wave received by the transmitting/receiving antenna to generate an intermediate-frequency signal by coupling the intermediate position of the first dielectric strip and that of the fourth dielectric strip to each other.

With this construction, the electromagnetic waves of the LSE mode or the like which is an unnecessary mode can be effectively attenuated, and the transmission loss of the electromagnetic waves of the LSM mode which is a transmission mode is reduced. Further, since part of the transmitted wave is introduced to the mixer via the circulator to a reduced degree, an excellent transmission characteristic of the millimeter wave signal is obtained and noise of the received wave is reduced to increase a detection distance in the case that this millimeter wave transmitting/receiving apparatus is applied to a millimeter wave radar or the like.

Preferably, in the above millimeter wave transmitting/receiving apparatus, the dimension of each conductive layer of the suppressor along the transmission direction may be equal to or shorter than half the wavelength of the TEM mode electromagnetic wave of the high-frequency signal, and the thickness thereof is 0.1 mm or smaller.

With such conductive layers, electromagnetic waves of the unnecessary modes such as the LSE mode can be effectively attenuated, and the transmission loss by the conductive layers of the LSM mode which is a transmission mode can be significantly reduced.

Another inventive millimeter wave transmitting/receiving apparatus comprises a pair of parallel plate conductors opposed to each other at a spacing equal to or shorter than half the wavelength of the high-frequency signal to be transmitted; the circulator made of two ferromagnetic plates provided between the pair of parallel plate conductors and opposed to each other in the same direction as the pair of parallel plate conductors are spaced apart; the first dielectric strip radially arranged with respect to the circulator between the pair of parallel plate conductors; the millimeter wave signal oscillator provided at one end of the first dielectric strip for outputting a millimeter wave signal to be transmitted; a second dielectric strip radially arranged with respect to the circulator between the pair of parallel plate conductors and having a transmitting antenna at its leading end; the third dielectric strip radially arranged with respect to the circulator between the pair of parallel plate conductors; first, second, third and fourth suppressors arranged between one end of the first dielectric strip and the millimeter wave signal oscillator and between the first, second and third dielectric strips and the circulator, and formed by arranging a plurality of conductive layers at specified intervals in a plane parallel to the transmission direction of the high-frequency signal inside the ends of the respective dielectric strips; the fourth dielectric strip having one end connected with the first or second dielectric strip between the pair of parallel plate conductors for transmitting part of the millimeter wave signal outputted from the millimeter wave signal oscillator; the fifth dielectric strip arranged between the pair of parallel plate conductors and having the receiving antenna at its leading end; and the mixer for mixing part of the millimeter wave signal outputted from the millimeter wave signal oscillator and a radio wave received by the receiving antenna to generate an intermediate-frequency signal by coupling the intermediate position of the fourth dielectric strip and that of the fifth dielectric strip to each other.

With this construction, the electromagnetic waves of the LSE mode or the like which is an unnecessary mode can be effectively attenuated, and the transmission loss of the electromagnetic waves of the LSM mode or the like is reduced. Further, the millimeter wave signal received by the transmitting antenna is not introduced to the millimeter wave signal oscillator. Accordingly, an excellent transmission characteristic of the millimeter wave signal is obtained and noise caused by oscillation is reduced to increase a detection distance in the case that this millimeter wave transmitting/receiving apparatus is applied to a millimeter wave radar module.

Preferably, in the above millimeter wave transmitting/receiving apparatus, the dimension of each conductive layer of the suppressor along the transmission direction may be equal to or shorter than half the wavelength of the TEM mode electromagnetic wave of the high-frequency signal, and the thickness thereof is 0.1 mm or smaller. With such conductive layers, electromagnetic waves of the unnecessary modes such as the LSE mode can be effectively attenuated, and the transmission loss by the conductive layers of the LSM mode which is a transmission mode can be significantly reduced.

Further another inventive millimeter wave transmitting/receiving apparatus comprises a pair of parallel plate conductors opposed to each other at a spacing equal to or shorter than half the wavelength of a millimeter wave signal to be transmitted; a circulator made of two ferromagnetic plates provided between the pair of parallel plate conductors and opposed to each other in the same direction as the pair of parallel plate conductors being spaced apart; a first dielectric strip radially arranged with respect to the circulator between the pair of parallel plate conductors; a millimeter wave signal oscillator provided at one end of the second dielectric strip for outputting the millimeter wave signal to be transmitted; a second dielectric strip radially arranged with respect to the circulator between the pair of parallel plate conductors, and having a transmitting/receiving antenna at it leading end; a third dielectric strip radially arranged with respect to the circulator between the pair of parallel plate conductors; a fourth dielectric strip radially arranged with respect to the circulator between the pair of parallel plate conductors, and having one end connected with the first dielectric strip; first, second and third suppressors arranged between the first, second and third dielectric strips and the circulator for suppressing electromagnetic waves of unnecessary modes; first, second and third impedance matching members arranged at the end faces of the first, second and third suppressors toward the circulator and having a relative dielectric constant different from that of the first, second and third dielectric strips; and a mixer for mixing part of the millimeter wave signal outputted from the millimeter wave signal oscillator and having transmitted in the fourth dielectric strip and a radio wave received by the transmitting/receiving antenna to generate an intermediate-frequency signal and transmitted in the third dielectric strip by coupling an intermediate position of the third dielectric strip and that of the fourth dielectric strip to each other.

With this construction, the transmission loss and isolation characteristic of the millimeter wave signal in a high-frequency band having a wide range are further improved, with the result that a detection distance can be increased in the case that this millimeter wave transmitting/receiving apparatus is applied to a millimeter wave radar or the like.

Preferably, in the above millimeter wave transmitting/receiving apparatus, the impedance matching members may be formed at their sides toward the respective parallel plate conductors with stepped portions having a height substantially equal to the thickness of the respective ferromagnetic plates forming the circulator, and the impedance matching members and the circulator are connected by holding the impedance matching members by the two ferromagnetic plates at the stepped portions.

With this construction, the suppressor and the ferromagnetic plates are positioned with an improved precision, the circulator can be assembled with an improved repeatability, and the two ferromagnetic plates are unlikely to become eccentric with respect to each other. This enables a circulator characteristic to be stably obtained with a good repeatability and simplifies production, presenting a suitable mass-productivity.

Still another inventive millimeter wave transmitting/receiving apparatus comprises a pair of parallel plate conductors opposed to each other at a spacing equal to or shorter than half the wavelength of the millimeter wave signal to be transmitted; the circulator made of two ferromagnetic plates provided between the pair of parallel plate conductors and opposed to each other in the same direction as the pair of parallel plate conductors are spaced apart; the first dielectric strip radially arranged with respect to the circulator between the pair of parallel plate conductors; the millimeter wave signal oscillator provided at one end of the first dielectric strip for outputting the millimeter wave signal to be transmitted; the second dielectric strip radially arranged with respect to the circulator between the pair of parallel plate conductors and having the transmitting antenna at its leading end; the third dielectric strip radially arranged with respect to the circulator between the pair of parallel plate conductors; the first, second and third suppressors arranged between the first, second, and third dielectric strips and the circulator for suppressing electromagnetic waves of unnecessary modes; the first, second and third impedance matching members arranged at the end faces of the first, second and third suppressors toward the circulator and having a relative dielectric constant different from that of the second, third and fourth dielectric strips; the fourth dielectric strip having one end connected with the first dielectric strip between the pair of parallel plate conductors for transmitting part of the millimeter wave signal outputted from the millimeter wave signal oscillator; the fifth dielectric strip arranged between the pair of parallel plate conductors and having the receiving antenna at its leading end; and the mixer for mixing part of the millimeter wave signal outputted from the millimeter wave signal oscillator and a radio wave received by the receiving antenna to generate an intermediate-frequency signal by coupling the intermediate position of the fourth dielectric strip and that of the fifth dielectric strip to each other.

With this construction, the transmission loss and isolation characteristic of the millimeter wave signal in a high-frequency band having a wide range are further improved. Further, the millimeter wave signal to be transmitted is not introduced to the mixer via the circulator. Accordingly, noise of the received signal is reduced to increase a detection distance, and an excellent transmission characteristic of the millimeter wave signal further increases the detection distance of a millimeter wave radar in the case that this millimeter wave transmitting/receiving apparatus is applied to a millimeter wave radar module.

Preferably, in the above millimeter wave transmitting/receiving apparatus, the impedance matching members may be formed at their sides toward the respective parallel plate conductors with stepped portions having a height substantially equal to the thickness of the respective ferromagnetic plates forming the circulator, and the impedance matching members and the circulator are connected by holding the impedance matching members by the two ferromagnetic plates at the stepped portions.

With this construction, the suppressor and the ferromagnetic plates are positioned with an improved precision, the circulator can be assembled with an improved repeatability, and the two ferromagnetic plates are unlikely to become eccentric with respect to each other. This enables a circulator characteristic to be stably obtained with a good repeatability and simplifies production, presenting a suitable mass-productivity.

Further another inventive millimeter wave transmitting/receiving apparatus comprises a pair of parallel plate conductors opposed to each other at a spacing equal to or shorter than half the wavelength of a millimeter wave signal to be transmitted; a circulator made of two ferromagnetic plates provided between the pair of parallel plate conductors and opposed to each other in the same direction as the pair of parallel plate conductors being spaced apart; a first dielectric strip radially arranged with respect to the circulator between the pair of parallel plate conductors; a millimeter wave signal oscillator provided at one end of the first dielectric strip for outputting the millimeter wave signal to be transmitted; a second dielectric strip radially arranged with respect to the circulator between the pair of parallel plate conductors; a third dielectric strip radially arranged with respect to the circulator between the pair of parallel plate conductors; a fourth dielectric strip radially arranged with respect to the circulator between the pair of parallel plate conductors; a metallic waveguide having an open termination at one end connected with an opening formed in at least one of the pair of parallel plate conductors in a position corresponding to where the electric field of a standing wave of LSM mode transmitting in the third dielectric strip is at maximum while having an open termination at the other end provided with a transmitting/receiving antenna; a mixer for mixing part of the millimeter wave signal from the millimeter wave signal oscillator having transmitted in the fourth dielectric strip and a radio wave having transmitted in the third dielectric strip and received by the transmitting/receiving antenna to generate an intermediate-frequency signal by coupling an intermediate position of the third dielectric strip and that of the fourth dielectric strip to each other.

With this construction, an excellent transmission characteristic of the millimeter wave signal can be obtained, which in turn increases a detection distance of a millimeter wave radar.

Still further inventive millimeter wave transmitting/receiving apparatus comprises a pair of parallel plate conductors opposed to each other at a spacing equal to or shorter than half the wavelength of a millimeter wave signal to be transmitted; a circulator made of two ferromagnetic plates provided between the pair of parallel plate conductors and opposed to each other in the same direction as the pair of parallel plate conductors being spaced apart; a first dielectric strip radially arranged with respect to the circulator between the pair of parallel plate conductors; a millimeter wave signal oscillator provided at one end of the second dielectric strip for outputting the millimeter wave signal to be transmitted; a second dielectric strip radially arranged with respect to the circulator between the pair of parallel plate conductors; a third dielectric strip radially arranged with respect to the circulator between the pair of parallel plate conductors; a fourth dielectric strip having one end connected with the first dielectric strip between the pair of parallel plate conductors for transmitting part of the millimeter wave signal outputted from the millimeter wave signal oscillator; a fifth dielectric strip arranged between the pair of parallel plate conductors; a first metallic waveguide having an open termination at one end connected with an opening formed in at least one of the pair of parallel plate conductors in a position corresponding to where the electric field of a standing wave of LSM mode transmitting in the second dielectric strip is at maximum while having an open termination at the other end provided with a transmitting antenna; a second metallic waveguide having an open termination at one end connected with an opening formed in at least one of the pair of parallel plate conductors in a position corresponding to where the electric field of a standing wave of LSM mode transmitting in the fifth dielectric strip is at maximum while having an open termination at the other end provided with a receiving antenna; and a mixer for mixing part of the millimeter wave signal outputted from the millimeter wave signal oscillator and a radio wave received by the receiving antenna to generate an intermediate-frequency signal by coupling an intermediate position of the fourth dielectric strip and that of the fifth dielectric strip to each other.

With this construction, the millimeter wave signal to be transmitted is not introduced to the mixer via the circulator. As a result, noise of the received signal is reduced to increase a detection distance, and an excellent transmission characteristic of the millimeter wave signal further increases the detection distance of a millimeter wave.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. A NRD guide comprising:

a pair of parallel plate conductors opposed to each other at a spacing equal to or shorter than half the wavelength of a high-frequency signal to be transmitted and having opposing inner surfaces whose arithmetic average roughness Ra satisfies 0.1 $\mu$m≦Ra≦50 $\mu$m; and a dielectric strip arranged between the pair of parallel plate conductors and held in contact with the respective inner surfaces of the parallel plate conductors.

2. A NRD guide comprising:

a pair of parallel plate conductors opposed to each other at a spacing equal to or shorter than half the wavelength of a high-frequency signal to be transmitted and having opposing inner surfaces whose arithmetic average roughness Ra satisfies 0.1 $\mu$m≦Ra≦50 $\mu$m; and a dielectric strip arranged between the pair of parallel plate conductors and held in contact with the respective inner surfaces of the parallel plate conductors, wherein the dielectric strip includes a plurality of strip unit sections and formed by connecting the plurality of strip unit sections one after another such that end faces thereof are opposed to each other at a spacing equal to or shorter than ⅛ of the wavelength of the high-frequency signal.

3. A NRD guide according to claim 2, wherein the dielectric strip is made of ceramics containing a multiple oxide of Mg, Al, Si as a main component and having a Q-value of 1000 or larger in a frequency range of 50 to 90 GHz.

4. A NRD guide according to claim 3, wherein a mole ratio composition formula of the multiple oxide is expressed by $xMgO.yAl_2O_3.zSiO_2$ where x=10 to 40 mole percent, y=10 to 40 mole percent, z=20 to 80 mole percent, and x+y+z=100 mole percent.

5. A NRD guide according to claim 1, wherein the dielectric strip is joined with at least one of the parallel plate conductors by a solder.

6. A NRD guide according to claim 5, wherein the dielectric strip is made of a material selected from the group consisting of ceramics, a glass, and glass ceramics.

7. A NRD guide according to claim 5, wherein the dielectric strip has a metallic layer formed on its outer surface to be joined with the parallel plate conductor by the solder.

8. A NRD guide according to claim 7, wherein the metallic layer is formed of a metallic foil.

9. A NRD guide according to claim 5, wherein the solder contains at least one element selected from the group consisting of Au, Ti, Su, and Pb.

10. A NRD guide comprising:

a pair of parallel plate conductors opposed to each other at a spacing equal to or shorter than half the wavelength of a high-frequency signal to be transmitted and having opposing inner surfaces whose arithmetic average roughness Ra satisfies 0.1 $\mu$m≦Ra≦50 $\mu$m;

a dielectric strip arranged between the pair of parallel plate conductors and held in contact with the respective inner surfaces of the parallel plate conductors; and a suppressor for attenuating electromagnetic waves of unnecessary modes, the suppressor being obtained by integrally forming a conductive layer inside ceramics dielectric strip by simultaneous sintering, and connected with one end of the dielectric strip between the pair of parallel plate conductors.

11. A NRD guide according to claim 10, wherein the ceramic dielectric strip is made of glass ceramics and the conductive layer is made of a low-resistance metallic conductor.

12. A NRD guide comprising:

a pair of parallel plate conductors opposed to each other at a spacing equal to or shorter than half the wavelength of a high-frequency signal to be transmitted and having opposing inner surfaces whose arithmetic average roughness Ra satisfies 0.1 $\mu$m≦Ra≦50 $\mu$m;

a dielectric strip arranged between the pair of parallel plate conductors and held in contact with the respective inner surfaces of the parallel plate conductors; and a suppressor for attenuating electromagnetic waves of unnecessary modes, the suppressor being provided at one end of the dielectric strip between the pair of parallel plate conductors, and formed by providing a plurality of conducive layers at specified intervals in a plane parallel to a transmission direction of the high-frequency signal inside the end of the dielectric strip.

13. A NRD guide according to claim 12, wherein a dimension of each conductive layer along the transmission direction is equal to or shorter than half the wavelength of a TEM mode electromagnetic wave of the high-frequency signal, and a thickness thereof is 0.1 mm or smaller.

14. A NRD guide comprising:

a pair of parallel plate conductors opposed to each other at a spacing equal to or shorter than half the wavelength of a high-frequency signal to be transmitted and having opposing inner surfaces whose arithmetic average roughness Ra satisfies 0.1 $\mu$m≦Ra≦50 $\mu$m; and a dielectric strip arranged between the flair of parallel plate conductors and held in contact with the respective inner surfaces of the parallel plate conductors, wherein the dielectric strips are substantially radially arranged from a center, farther comprising:

a circulator provided at the center, and made of two ferromagnetic plates opposed to each other in the same direction as the pair of parallel plate conductors between the pair of parallel plate conductors;

suppressors provided at the leading ends of the respective dielectric strips toward the circulator for blocking electromagnetic waves of unnecessary modes; and impedance matching members arranged at the leading ends of the respective suppressors toward the circulator, and having a relative dielectric constant different from that of the respective dielectric strips.

15. A NRD guide according to claim 14, wherein the impedance matching members are formed at their sides toward the respective parallel plate conductors with stepped portions having a height substantially equal to the thickness of the respective ferromagnetic plates forming the circulator, and the impedance matching members and the circulator are connected by holding the impedance matching members by the two ferromagnetic plates at the stepped portions.

16. A NRD guide comprising:

a pair of parallel plate conductors opposed to each other at a spacing equal to or shorter than half the wavelength of a high-frequency signal to be transmitted and having opposing inner surfaces whose arithmetic average roughness Ra satisfies 0.1 $\mu$m≦Ra≦50 $\mu$m;

a dielectric strip arranged between the pair of parallel plate conductors and held in contact with the respective inner surfaces of the parallel plate conductors; and a metallic waveguide connected with the dielectric strip by having an open termination connected with an opening formed in at least one of parallel plate conductors in a position corresponding to where the electric field of a standing wave of LSM mode transmitting in the dielectric strip is at maximum.

17. A NRD guide according to claim 16, wherein the dielectric strip is widened in an area extending from a portion corresponding to the opening of the parallel plate conductor to the open termination than an other portion.

18. A NRD guide according to claim 16, wherein an open antenna or flat antenna is provided at the open termination of the metallic waveguide which is not coupled to the opening of the parallel plate conductor.

19. A NRD guide comprising:

a pair of parallel plate conductors opposed to each other at a spacing equal to or shorter than half the wavelength of a high-frequency signal to be transmitted and having opposing inner surfaces whose arithmetic average roughness Ra satisfies 0.1 $\mu$m≦Ra≦50 $\mu$m; and a dielectric strip arranged between the pair of parallel plate conductors and held in contact with the respective inner surfaces of the parallel plate conductors, wherein at least one of the pair of parallel plate conductors is formed with an opening in a position corresponding to where the electric field of a standing wave of LSM mode transmitting in the dielectric strip is at maximum, and a metallic waveguide having a closed termination at one end and an open termination at the other end and formed with an opening in a position which is distanced from the closed termination by n/2+1/4 (n is zero or a positive integer) of a guide wavelength is connected with the dielectric strip by coupling the opening of the parallel plate conductor to that of the metallic waveguide.

20. A NRD guide according to claim 19, wherein the dielectric strip is widened in an area extending from a portion corresponding to the opening of the parallel plate conductor to the open termination than an other portion.

21. A NRD guide according to claim 19, wherein an open antenna or flat antenna is provided at the open termination of the metallic waveguide which is not coupled to the opening of the parallel plate conductor.

* * * * *